US007617128B2

(12) United States Patent
Greak

(10) Patent No.: US 7,617,128 B2
(45) Date of Patent: Nov. 10, 2009

(54) ONLINE TRANSACTION HOSTING APPARATUS AND SYSTEM

(75) Inventor: Garret C. Greak, Lubbock, TX (US)

(73) Assignee: Revolutionary E-Commerce Systems, Inc., Lubbock, TX (US)

( * ) Notice: Subject to any disclaimer, the term of this patent is extended or adjusted under 35 U.S.C. 154(b) by 222 days.

(21) Appl. No.: 10/867,974

(22) Filed: Jun. 15, 2004

(65) Prior Publication Data
US 2005/0289039 A1    Dec. 29, 2005

(51) Int. Cl.
*G06Q 30/00*    (2006.01)
(52) U.S. Cl. .......................................... 705/26; 705/27
(58) Field of Classification Search ................. 705/26, 705/27
See application file for complete search history.

(56) References Cited

U.S. PATENT DOCUMENTS

| | | | |
|---|---|---|---|
| 4,799,156 | A | 1/1989 | Shavit et al. |
| 6,085,169 | A | 7/2000 | Walker et al. |
| 6,101,484 | A | 8/2000 | Halbert et al. |
| 6,108,639 | A | 8/2000 | Walker et al. |
| 6,131,087 | A | 10/2000 | Luke et al. |
| 6,240,396 | B1 | 5/2001 | Walker et al. |
| 6,260,024 | B1 | 7/2001 | Shkedy |
| 6,266,651 | B1 | 7/2001 | Woolston |
| 6,356,878 | B1 | 3/2002 | Walker et al. |
| 6,598,026 | B1 | 7/2003 | Ojha et al. |
| 6,873,968 | B2 * | 3/2005 | Ehrlich et al. .................. 705/26 |
| 2001/0032116 | A1 | 10/2001 | Hyatt |
| 2001/0032163 | A1 | 10/2001 | Fertik et al. |
| 2001/0039524 | A1 * | 11/2001 | Harrison et al. ............... 705/35 |
| 2002/0065731 | A1 * | 5/2002 | Schloss ........................ 705/26 |
| 2002/0082974 | A1 * | 6/2002 | Berstis ........................ 705/37 |

(Continued)

OTHER PUBLICATIONS auction insurance1, "Yahoo! auctions experiances 400 percent growth in past year; online auction service celebrates two-year anniversary as a key player in competitive category with new and expanded services", Business wire, Oct., 16, 2000.*

(Continued)

*Primary Examiner*—Mark Fadok
(74) *Attorney, Agent, or Firm*—Pate Pierce & Baird

(57) ABSTRACT

An invention is disclosed relating to an apparatus and method for hosting transactions over a network such as the Internet. Sellers post offers to sell under a listing belonging to an organized database of listings. Likewise, buyers post offers to buy. A matching module selects offers to sell and matches them to offers to buy based on a predefined criteria. Before posting offers to sell or buy, buyers and sellers may be presented with data concerning the market for the product that is the subject of the offer. A sale is consummated between the buyer and seller of the matched offer to buy and offer to sell. Consummation may include assessing the risk of fraud posed by the matched buyer and matched seller. Fees may be charged to the matched buyer, the matched seller, or both as insurance against fraud. Payment may be made by the buyer directly to the seller or to a host hosting the apparatus and method for conducting the transaction. Payment is forwarded to the seller by the host upon confirmation by the buyer that a product has been received in good order. An automated, or partially automated, dispute resolution process may resolve disputed transactions.

12 Claims, 32 Drawing Sheets

U.S. PATENT DOCUMENTS

| | | | |
|---|---|---|---|
| 2002/0091612 A1* | 7/2002 | Greene et al. | 705/37 |
| 2002/0138308 A1* | 9/2002 | Harada et al. | 705/4 |
| 2002/0178014 A1* | 11/2002 | Alexander | 705/1 |
| 2003/0004855 A1* | 1/2003 | Dutta et al. | 705/37 |
| 2003/0041007 A1 | 2/2003 | Grey et al. | |
| 2003/0135421 A1* | 7/2003 | Cales et al. | 705/26 |
| 2003/0182222 A1* | 9/2003 | Rotman et al. | 705/37 |
| 2003/0200151 A1 | 10/2003 | Ellenson et al. | |
| 2003/0229565 A1 | 12/2003 | Reddi et al. | |
| 2003/0233278 A1* | 12/2003 | Marshall | 705/14 |
| 2004/0019562 A1* | 1/2004 | Viberg | 705/40 |
| 2004/0039696 A1* | 2/2004 | Harmon et al. | 705/40 |
| 2005/0114223 A1* | 5/2005 | Schneider | 705/26 |
| 2005/0261919 A1* | 11/2005 | Kundtz et al. | 705/1 |
| 2005/0289039 A1* | 12/2005 | Greak | 705/37 |

OTHER PUBLICATIONS auction insurance2, "More online auctions turn out to be scams", Star Tribune, Mar. 27, 2000.* auction insurance3, "Netwatcher", The Atlanta Journal, Feb 2, 2002.* auction insurance4, "Net auctions let you click up a bargain", Sun times, Apr. 7, 2002.* auction insurance5, "More online auctions turn out to be scams", Star Tribune, Mar. 27, 2000.* price grabber1, "Pricegrabber.com makes bottom-line costs clear for shoppers", Business wire, Nov 9, 1999.* pricegrabber2, anders, Jason, "Technology journal--m--commerce: bricks vs clicks—think a few taps on a palm pilot will net you a better deal? Think again", Asian Wall Street Journal, Dec 27, 2000.* pricegrabber3, Finney, Michael, "Holiday online", San Francisco Examiner, Dec 4, 2002.* pricegrabber4, "Pricegrabber named fastest growing technology company in Los Angeles by Deloite Technology fast 50 program", Business wire, Sep 22, 2004.* pricegrabber5, http://web.archive.org/web/20021125094518/www.pricegrabber.com/index, dated Nov. 25, 2002.* pricegrabber6, "Online shopping", The Plain Dealer, Nov 17, 2002.*

* cited by examiner

| User Record | 130 |
|---|---|
| User Identifier | 142 |
| Identify Verification Data | 144 |
| Sanction Data | 146 |
| Marketing Data | 148 |
| Transaction Data | 150 |
| Access Data | 152 |
| Authentication Data | 154 |
| Billing Data | 156 |
| Shipment Data | 158 |
| Payment Data | 160 |
| Risk Data | 162 |
| Contribution Data | 164 |
| Reward Data | 165 |
| Modification Data | 166 |
| Listing Privileges | 168 |
| User History | 170 |

FIG. 7

| Purchase Request Record | 132 |
|---|---|
| Request Identifier | 180 |
| Listing Identifier | 182 |
| Pricing Data | 184 |
| Quantity | 186 |
| Classification Data | 188 |
| Descriptive Data | 190 |
| Buyer Identifier | 192 |
| Shipping Data | 194 |
| Billing Data | 196 |
| Priority Data | 198 |

FIG. 8

| Product Record | 134 |
|---|---|
| Offer Identifier | 210 |
| Listing Identifier | 212 |
| Descriptive Data | 214 |
| Review Data | 216 |
| Quantity Data | 218 |
| Pricing Data | 220 |
| Classification Data | 222 |
| Access Data | 224 |
| Seller Identifier | 226 |
| Payment Data | 228 |
| Priority Data | 230 |
| Certification Data | 232 |

FIG. 9

| Market Record | 136 |
|---|---|
| Listing Identifier | 240 |
| Sale Price History | 242 |
| Statistical Analysis | 244 |

FIG. 10

ONLINE TRANSACTION HOSTING
APPARATUS AND SYSTEM

THE FIELD OF THE INVENTION

The invention relates generally to computer systems, and more specifically to software and hardware methods and apparatus for executing commercial data exchange, data basing, and transactions over a network.

BACKGROUND

With the rise in popularity of the Internet, many have attempted to collect, dispense, and store information. Others engage in processes to transact business using the Internet. However, such "online" transactions suffer from many of the same deficiencies as do face-to-face transactions, many relating to lack of independent or objective information. The main difficulties in both current attempts to conduct online transactions and face-to-face transactions arise from the difficulties in locating and contacting a buyer or seller, presenting sufficient objective information, and evaluating the fairness of the terms in a transaction. Online transactions suffer from the additional difficulties arising from their long-distance and anonymous nature. Thus, the ability to make a subjective evaluation of information, especially objective information, is virtually absent.

In online transactions, a buyer is faced with the difficulty in finding a seller. The Internet includes millions of websites. A search for a product will typically include a search of these websites using a search engine. Given the enormous number of websites, a user may need to examine many websites providing hits on key words, and thereby purporting to relate to or provide what a user wants. The reality is a lot of detailed pouring over clutter before finding what it is the user in fact wants.

Furthermore, each website must typically be navigated, with a user moving from webpage to webpage in order to find a product. Ready access to or comparison of the specifications, meaningful characterizations, standard comparisons, and valuation parameters of products, and the terms of sales is even more difficult. Typically, a buyer must be already committed financially, or to the effort of going through multiple steps of filling out forms, providing shipping information, providing financing information, and the like, before actually discovering how much a purchase from a particular online vendor will ultimately cost.

For the seller, the Internet creates enormous difficulties in marketing products. A seller must compete with a host of other websites to be noticed by a buyer. In a some cases, a buyer may be presented with hundreds of links to competing websites presented typically ten to twenty five at a time to the buyer by a search engine. A buyer may typically only look at perhaps the first few groups of links. Accordingly, a seller not placed in the first groups of links by the search engine may never be noticed.

The principal weakness of this process is that factors that may make a seller a more desirable than others do not determine whether the seller will be displayed first to a user. Important factors such as condition, features, price, shipping costs, reliability, and the like must then be evaluated by a conscientious buyer through tedious navigation of the multitude of disparate websites, each displaying what is programmed to promote, and often leaving out equally significant weaknesses or lacks.

In some cases, there may be "bots" or "spiders" that keep track of prices of the same or equivalent products at various on-line vendors, including the price of shipping. However, these also suffer from difficulties. For example, they often (but not always) do not know the availability of the product at the various sites. If sold out at a site, one cannot find out until going to the site. There is often a multitude of sellers, only shown 10 or 20 at a time, which can only be sorted by various rudimentary criteria such as price.

However, the listing of sellers still leaves one bewildered and conflicted because one typically does not want to automatically choose the vendor with the lowest price. It is often a small unknown site that may disappear before delivery of the buyer's order. Accordingly, reliability is far from certain. In some cases there are user-ratings for these various vendors. These are easily manipulated by unscrupulous vendors and still will not protect against those fly-by-night vendors.

The online embodiment of the auction likewise presents many difficulties to a user. In an auction type online transaction, each product, regardless of similarities to others, is listed separately. Furthermore, a conscientious buyer wishing to compare prices must look at each separate listing of products. Comparison is further made difficult by the fact that a buyer may not readily compare prices of products for auction since the final price is only determined when the auction for a product is concluded.

The process of bidding on items in an auction itself introduces difficulties. The emotional aspect of an auction with its competitive and urgent bidding up of the price tends to override prudence and provides no assurances that the price one pays is fair. Furthermore, when there are multiple auctions for the same or very similar products, the buyer often feels compelled to bid in more than one auction. One may end up winning multiple auctions and buying the same product several times.

Another problem with auctions is that of comparing shipping costs across auctions. Yet another problem is the time-sensitive nature of the auction. The transaction is completed according to the seller's timetable and not the buyer's. This limitation is a disservice to the buyer who must often wait several days to see if a purchase will go through.

Both auction-style transactions and "retail"transactions through merchant websites suffer from the uncertainty and potential for fraud. The risk stems from the remoteness and anonymity of the parties to the transaction. A party has no guarantees concerning the integrity of the other party to the transaction. Disputes arising from a transaction must take place over the internet. Not knowing the identity of the other party, one can be hard pressed to enforce any obligation against the other party.

This uncertainty limits many potential buyers to a few major vendor websites, which may or may not have the best prices and overall quality of service. Thus the purchasing process (or the market itself) is inefficient due to the presence of these major vendors who command greater market share despite questionable prices and service.

The remoteness of the transaction also adds uncertainty to the transaction costs of purchasing a product. A conscientious buyer who finds a seemingly low purchase price may find upon consummation of a transaction that the overall costs of the transaction, due to costs of shipping, were in fact less favorable than a buyer thought.

Other unanticipated costs include the cost of fraud to the buyer, seller, or both. For example, a user eventually must bear the cost of a vendor' so called "fraud prevention program." Comparison of overall costs of a transaction may in fact be very difficult to ascertain. A user must proceed through the many steps comprising the process of buying online before ever knowing the overall cost of the transaction.

Another difficulty occasioned by the online nature of the transaction may include the costs of transferring funds. A seller may be required to accommodate various types of funds transfer mechanism, such as various online escrow services, several credit card institutions, checks sent by mail, and the like. The various funds transfer mechanism may also include costs to the seller and create difficulties for the collection of funds owed to the seller.

Additionally, many auction sites allow the seller to limit the payment options. This limitation can inefficiently confine the market place of potential buyers. Sometimes, a buyer may be surprised to discover at the end of the auction that he is not allowed to pay with a credit card.

Another disadvantage of the current state of the art in online auctions is the fact that it is very difficult for a buyer to assess the fair value of a product because of the lack (or poor quality) of market history, comparable product data, comparable price data, lack of tools for price evaluation, or the like.

In view of the foregoing, what is needed is a system of applications and software support that readily provides information collection, processing, presentation, searching, and mathematical or context manipulation and comparison needed by a buyer and a seller. What is further needed is an application that streamlines the process of conducting online transactions. Such an application should allow a buyer and a seller to readily assess the overall cost of a transaction.

It would be an advancement in the art to provide an application that enables disputes to between buyers and sellers to be resolved efficiently. Such an application in hardware, software, or both should assess the risk of fraud or nonperformance for each party to the transaction. The costs to a party to the transaction for such an application should be based on the risk of fraud or nonperformance that the party poses.

It would be a further advancement in the art to provide a system to collect, disseminate, and otherwise provide relevant information to a consumer buying products and sellers marketing products using that system and its software applications standard factors for comparing. Relevant information may include data describing the current market for a product and the quality or functionality of a product. It would be an advancement to invite, collect, and process contributions of such information from users and previous transaction records. Such a system should provide objective evaluation of the accuracy and veracity of contributions from users and display only reliable information to subsequent users.

It would further be an advancement in the art to streamline the information presented to the buyers and sellers to present a market more easily accessible as well as easier to analyze.

BRIEF SUMMARY AND OBJECTS OF THE INVENTION

In view of the foregoing, it is a primary object of the present invention to provide a system, method, and apparatus for hosting transactions online or any other suitable network (e.g. a peer-to-peer network) that provides assurances against fraud and provides accurate information to parties to the transaction regarding the product sold in a transaction as well as the market for the product as well as market analysis tools.

A system of records, data collection and processing, as well as a transaction application are described herein for enabling users to post offers to buy and offers to sell and to obtain information concerning the current market for a product as well as a market history. A buyer may post a purchase request record indicating the product sought, the quantity sought, and the price the buyer is willing to pay. A seller may post a product record indicating the product sold, the quantity for sale, and the price.

Both purchase request records and product records may be organized in a hierarchical structure, such that product records and purchase request records relating to the same product may be readily matched with one another and so a user may readily see what products are on the market or demanded by buyers.

Purchase request records will be matched with product records having the lowest price. Thus, the highest priced purchase request record will be matched with the lowest priced product record. In cases of equally priced purchase request records, or multiple purchase request records that are above the price of a product record, a priority method may be used to resolve the tie, such as for example the first in time posted may be given priority for both buyer and seller.

Shipping costs and funds transfer costs may be standardized to reduce uncertainty for a buyer. In some embodiments a standardized shipping cost may be applied regardless of location. In others, shipping costs will be calculated automatically based on the geographic location of buyer and seller. When matching purchase request records with product records, shipping costs may be considered to determine which purchase request record is best matched with which product record.

Records of each user's transactions may be kept in order to evaluate the risk of fraud or nonperformance that each user poses. The transaction costs to a user may reflect the risk that user poses. Thus, fees may in part insurance against non performance. Other factors such as purchase of insurance, posting of funds for guaranteeing transactions, or the like, may reduce the cost of insuring a transaction.

The process of consummating a sale between a matched purchase request record and a product record may proceed by notifying the buyer of the match, verifying receipt of funds from the buyer by the host, notifying the seller of the receipt of funds by the host, verifying the receipt of the product by a user, and releasing of funds by the host to the seller. Other steps are disclosed that may ameliorate the effects of nonperformance.

An automated, or partially automated, dispute resolution process may be used to facilitate failed transactions. A history of a disputed transaction and the histories of the parties to the transaction may be presented to a host in a readily interpreted form. An arbiter may input a decision and thereby set in motion automatic processing to implement the arbiters decision. After each transaction the user history of each buyer will be updated to indicate the outcome of the transaction for purposes of evaluating the risk the user (whether buyer or seller) poses and for deciding disputes involving the user.

Purchase request records and product records may be kept in a database with information helpful to buyers of products. An apparatus and method may be provided to enable users to contribute to and correct information within the database. Contributions may be weighted and compared to determine which contribution shall be included in the database and how it will be used statistically. Factors weighted may include the number of contributions made by a user, and the reliability of the user's previous contributions information or comments.

An application in accordance with a system, method, or an apparatus described below may be used as part of various databasing, networking, communication, and business process, which may include obtaining arbitration consent from all users, maintaining the interpartes anonymity of users of the system even while establishing control. The sum of the effect at providing host assurances of performance, evaluating user risk, assigning or otherwise linking fees charged to a user to the risk that the user poses, marketing host products, streamlining transaction costs, and hosting user funds.

Incentives may be awarded to those users of the system who recruit others to use services on the system or otherwise engage the transaction application. A recruiter may be rewarded for the actions of recruits that benefit the host of the system by using services such as conducting transactions, contributing information, and recruiting other users.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 7 is a schematic block diagram of one embodiment of a user record, in accordance with the invention;

FIG. 8 is a schematic block diagram of one embodiment of a purchase request record, in accordance with the invention;

FIG. 9 is a schematic block diagram of one embodiment of a product record, in accordance with the invention;

FIG. 10 is a schematic block diagram of one embodiment of a market record, in accordance with the invention;

DETAILED DESCRIPTION OF THE PREFERRED EMBODIMENTS

It will be readily understood that the components of the present invention, as generally described and illustrated in the Figures herein, may be arranged and designed in a wide variety of different configurations. Thus, the following more detailed description of the embodiments of the system and method of the present invention, as represented in FIGS. 1 through 41, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout. Those of ordinary skill in the art will, of course, appreciate that various modifications to the details illustrated in the schematic diagrams of FIGS. 1-41 may easily be made without departing from the essential characteristics of the invention. Thus, the following description is intended only as an example, and simply illustrates certain presently preferred embodiments consistent with the invention as claimed herein.

Figure 1:
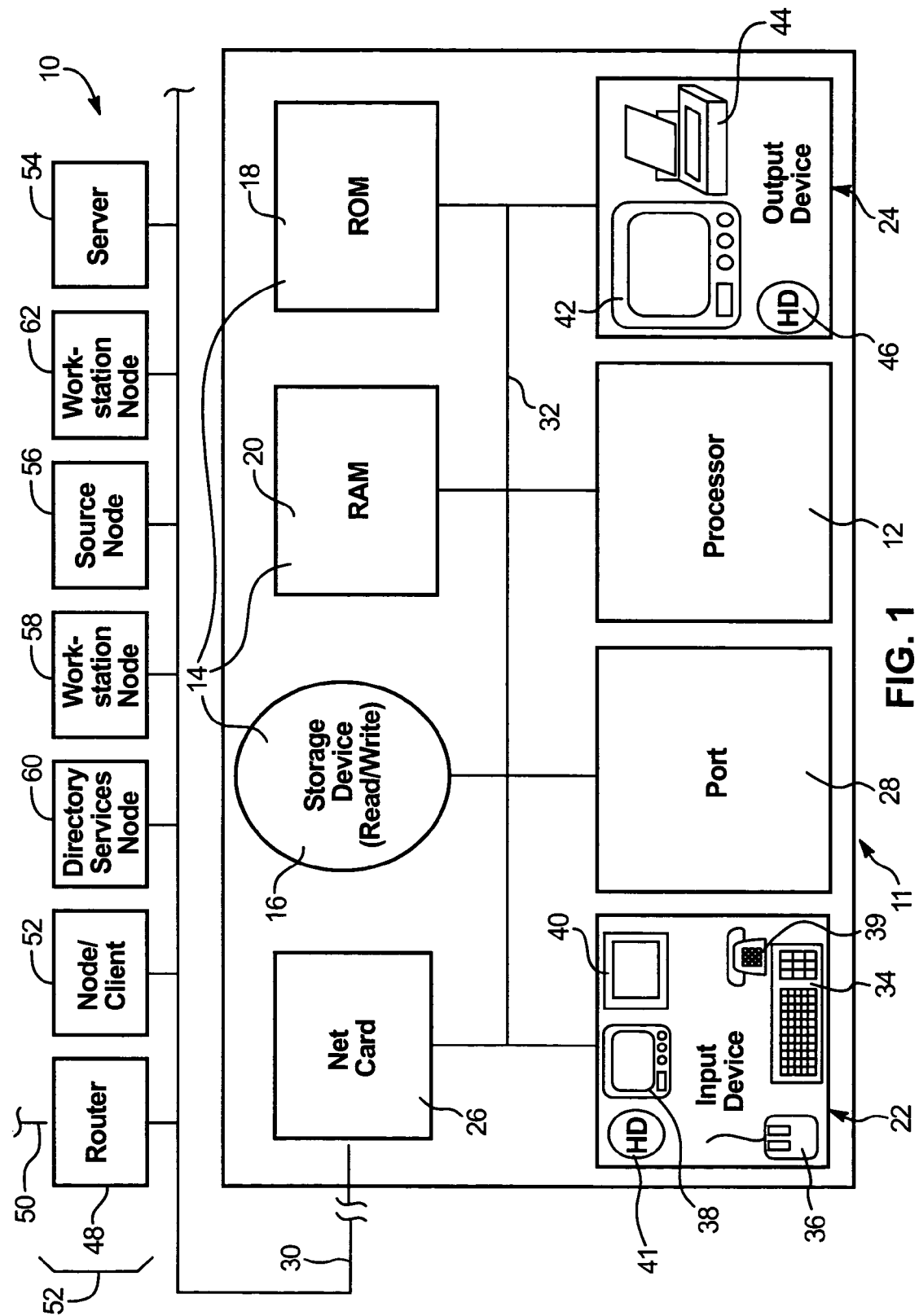
FIG. 1 is a schematic block diagram of one architecture for a hardware suite suitable for implementing an apparatus in accordance with the invention.

Referring to FIG. 1, an apparatus 10 may include a node 11 (client 11, computer 11) containing a processor 12 or CPU 12. The CPU 12 may be operably connected to a memory device 14. A memory device 14 may include one or more devices such as a hard drive 16 or non-volatile storage device 16, a read-only memory 18 (ROM) and a random-access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (e.g. interface card), or like device 26, or port 28 may be provided for connecting to outside devices, such as the network 30.

Internally, a bus 32 (system bus 32) may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like.

Similarly, a scanner 40 may be used to receive graphical inputs which may or may not be translated to other character formats. A hard drive 41 or other memory device 14 may be used as an input device whether resident within the node 11 or some other node 52 (e.g., 52, 58, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internet work. The individual nodes 52 may have various communication capabilities.

In certain embodiments, a minimum of logical capability may be available in any node 52. Note that any of the individual nodes 52 may be referred to, as they may all together, as a node 52 or nodes 52.

A network 30 or connected networks 50 may include one or more servers 54. Servers may be used to manage, store, communicate, transfer, access, update, and the like, any number of files for a network 30 or connected networks 50. Typically, a server 54 may be accessed by all nodes 11, 52 on a network 30 or connected networks 50. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components of the apparatus 10 may need to communicate data with one another. A communication link may exist, in general, between any pair of devices or components.

By the expression "nodes" 52 is meant any one or all of the nodes 48, 52, 54, 56, 58, 60, 62, 11. Thus, any one of the nodes 52 may include any or all of the component parts illustrated in the node 11.

The directory services node 60 provides the directory services as known in the art. Accordingly, the directory services node 60 hosts the software and data structures required for providing directory services to the nodes 52 in the network 30 and may do so for other nodes 52 in other networks 50.

The directory services node 60 may typically be a server 54 in a network. However, it may be installed in any node 52. To support directory services, a directory services node 52 may typically include a network card 26 for connecting to the network 30, a processor 12 for processing software commands in the directory services executables, a memory device 14 for operational memory as well as a non-volatile storage device 16 such as a hard drive 16. Typically, an input device 22 and an output device 24 are provided for user interaction with the directory services node 60. In general, any number of workstation nodes 58, 62 may exist in a network 30, within some practical limit. Any network 30, 50 may be part of, and connect to the Internet 72.

Figure 2:
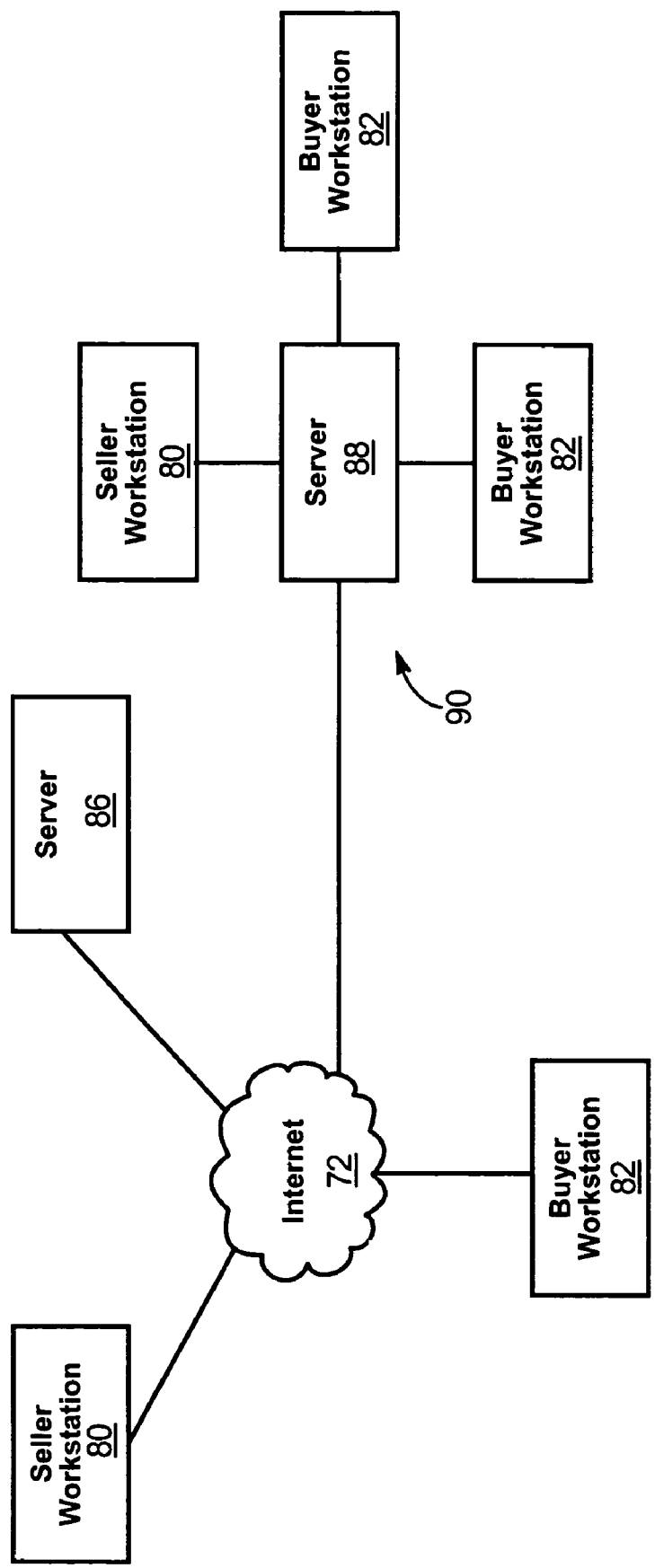
FIG. 2 is a schematic block diagram of various configurations of users and servers accessing an apparatus and method in accordance with the invention over the Internet.

Referring now to FIG. 2 while continuing to refer generally to FIG. 1, a system 10 in accordance with the invention may include a plurality of seller workstations 80 and buyer workstations 82. The workstations 84 may connect to a network 30 embodied as the internet 72. A host server 86 may likewise connect to the internet 72. The workstations 80, 82 and the host server 86 may be embodied as a node 11. Various alternative configurations of host server 86 and workstations 80, 82 are possible. For example a workstation 80, 82 may connect to a proxy server 88, firewall 88, or like device, via a local area network 90. A proxy server 88 may then connect to the internet 72. It will be noted that the distinction between a seller workstation 80 and a buyer workstation 82 is based only on how the workstation is being used at any particular moment. Just as a user may be both a buyer and a seller by turns, so may the same network node 11 be both a buyer workstation 82 and a seller workstation 80.

Figure 3:
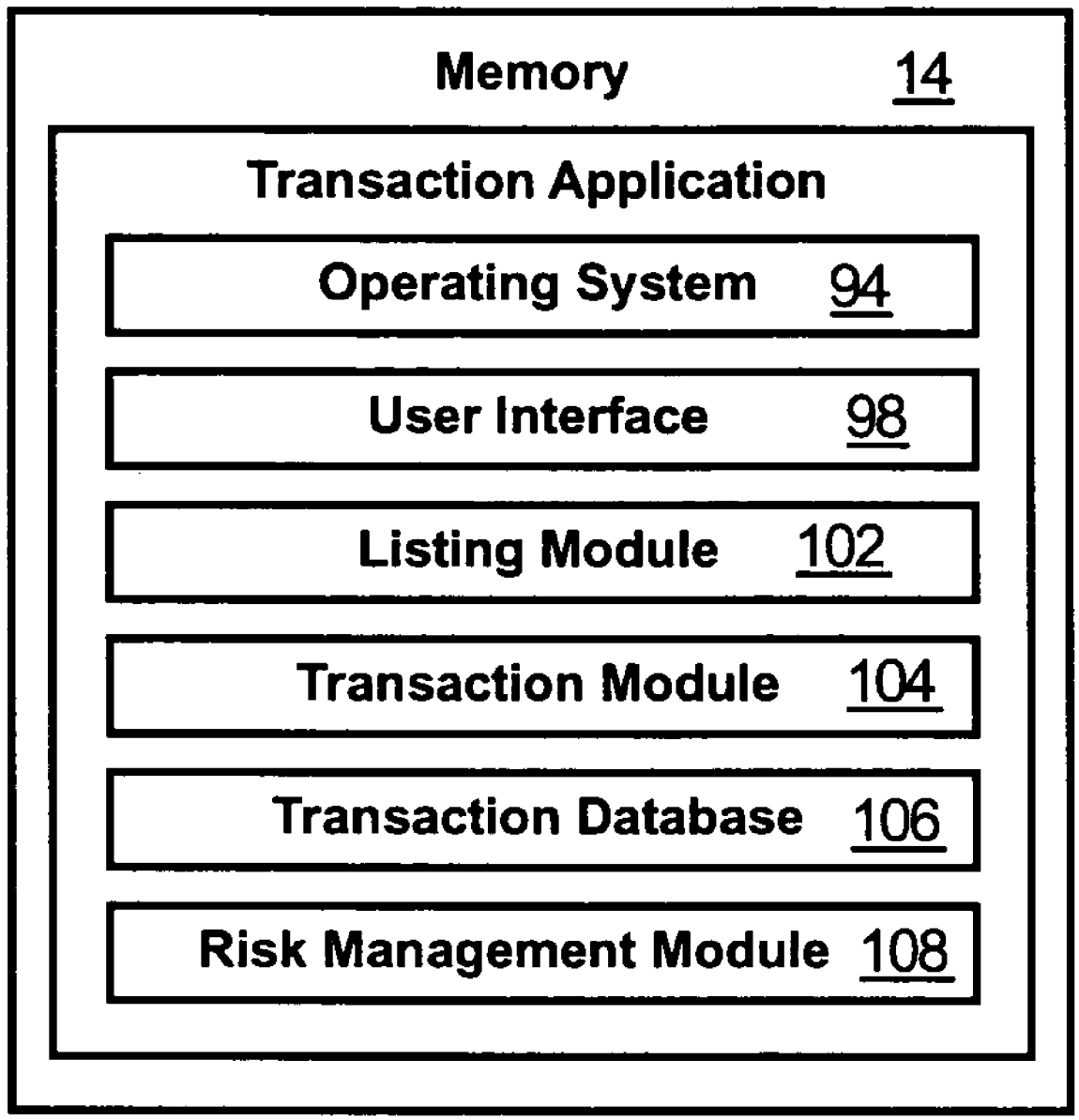
FIG. 3 is a schematic block diagram of one embodiment of a transaction application, in accordance with the invention.

Referring to FIG. 3, while continuing to refer to FIGS. 1 and 2, the memory 14 of a host server 86 may include a transaction system 92. The memory 14 may likewise store an operating system 94. An operating system 94 may provide an interface for the transaction system 92 to access the functionality of the node 11 forming the server 86.

It will be noted that the transaction system 92 and the server 86 may be embodied as a single application executed by a single server. Alternatively, the transaction system 92 and server 86 may be embodied as separate applications executing on a plurality of servers 86 to accomplish functions ascribed to the transaction system 92.

The transaction system 92 may include a user interface module 98, a listing module 102, a transaction module 104, a transaction database 106, and a risk management module 108.

The user interface module 98 may be responsible to manage the input and output of information transmitted to and from seller workstations 80 and buyer workstations 82. A listing module 102 may be responsible for providing a classification system of products offered for sale or requests to purchase products. A transaction module 104 may be responsible for communications and processing necessary to consummate a sale of a product by a seller associated with a seller workstation 80 to a buyer associated with a buyer workstation 82. A transaction database 106 may store data relating to the parties a transaction, and records of completed transactions. A risk management module 108 may store and process data relating to the risk associated with a particular transaction or user for use in calculating the cost of a particular transaction.

Figure 4:
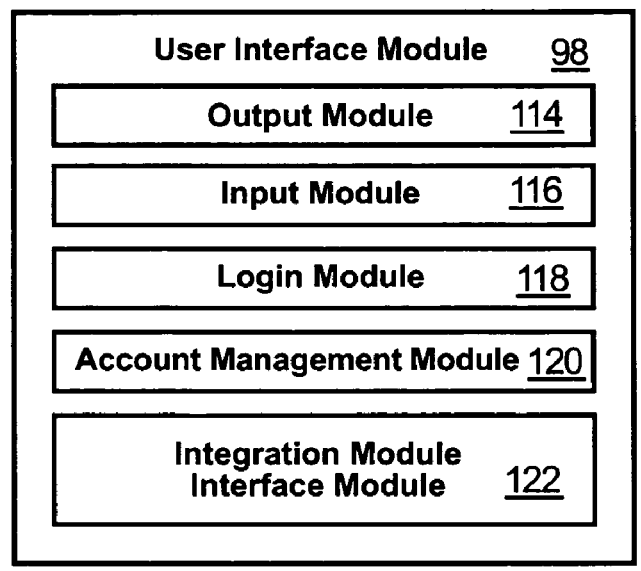
FIG. 4 is a schematic block diagram of one embodiment of a user interface module in accordance with the invention.

Referring to FIG. 4, the user interface module 98 may include an output module 114, an input module 116, a login module 118, an account management module 120, and an integration module interface 122. The output module 114 may transmit information from the transaction system 92 to a workstation 80, 82. Accordingly, other modules making up the transaction system 92 may use the functionality of the output module 114 to transmit information to the workstations 90, 92.

Accordingly the output module 114 may manage the protocols and connection processes necessary to transmit information to a remote computer. In the illustrated embodiment, the output module 114 may transmit information in the form of web pages or the like for display in a web browser, or other software, installed on a workstation 80, 82. The output module 114 may also transmit information in various forms to servers 86 or other nodes 11 on the internet 72.

For example, market data concerning products sold, or offered for sale, or solicited for purchase, using the transaction system 92 may be provided to other entities. For example, something functionally akin to a stock ticker, which reflects a product's most recent sale price, or like information, may be provided to other entities.

The input module 116 may receive information from the workstations 80,82 or from other servers 88 or nodes 11 on the internet 72. The input module 116 may transmit information from the workstations 80, 82 to the various other modules forming the transaction system 92. Accordingly, the input module 116 may manage the protocols and connections necessary to receive information from a remote computer.

The login module 118 may authenticate users associated with workstations 80, 82 seeking access to functionality and information provided by the transaction system 92. Accordingly, a login module 118 may receive authenticating information from a workstation 80, 82, such as a password, username, or the like. The login module may compare such authenticating information with records associated with individual users to verify that a user seeking access is in fact so authorized. The login module may work with the input and output modules 114, 116 as well as with other modules forming the transaction system 92.

An account management module 120 may control the access of a particular user to the functionality of the transaction system 92. Accordingly, the account application module may control what product listings a user may view, how much money a user may spend in transactions using the transaction system 92, or the like. An integration module interface 122 may interface with applications executing on a remote workstation 80, 82 to automate the process of conducting transactions using the transaction system 92.

Figure 5:
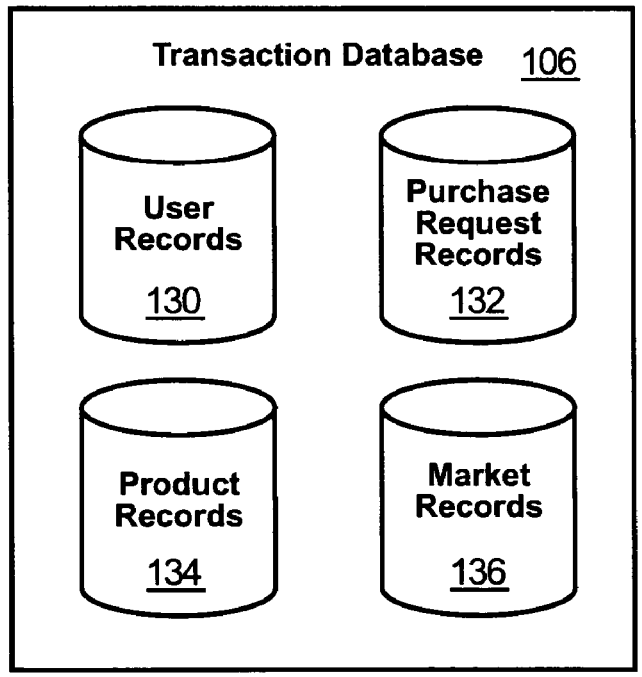
FIG. 5 is a schematic block diagram of one embodiment of a transaction database, in accordance with the invention.

Referring to FIG. 5, while continuing to refer generally to FIGS. 2 and 3, The transaction system 92 may include a transaction database 106. The transaction database 106 may store records relating to parties, products, and transactions associated with the transaction system 92. In the illustrated embodiment, the transaction system 92 includes user records 130, purchase request records 132, product records 134, and market records 136.

Figure 6:
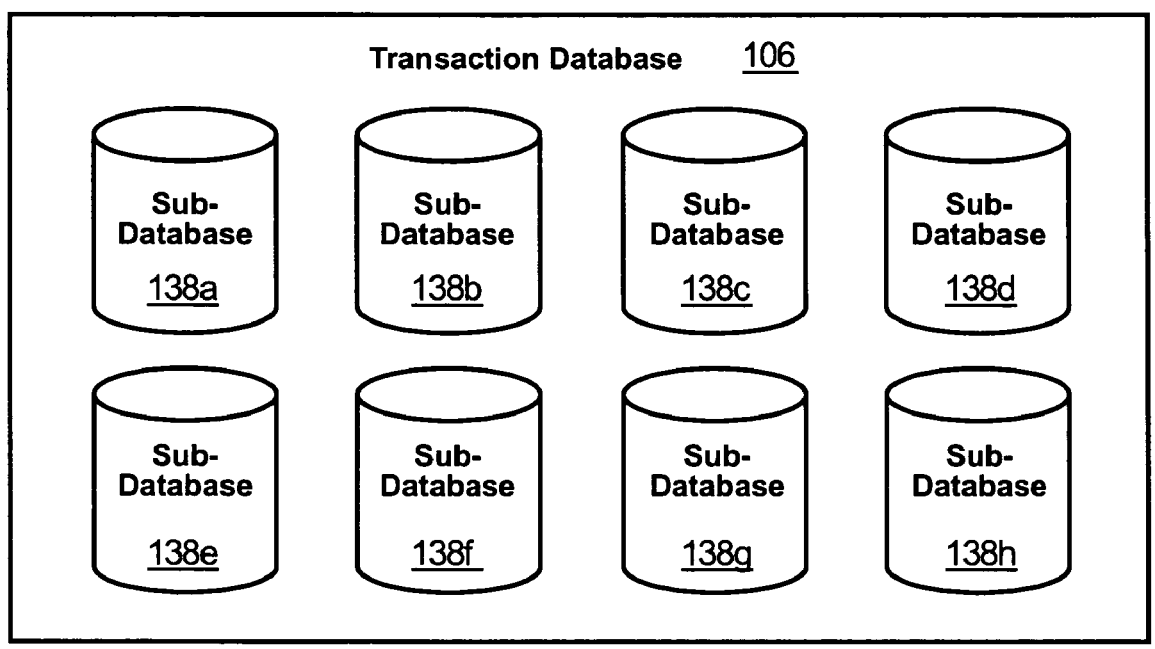
FIG. 6 is a schematic block diagram of an alternative embodiment of a transaction database, in accordance with the invention.

Referring to FIG. 6, in some embodiments, the transaction database 106 may be subdivided into sub databases 138*a*-138*h*. The transaction database 106 may divide purchase request records 132 and product records 134, with their associated market records 136, based on the geographic region of the user posting the record 132, 134, or the demographic community to which the user belongs (e.g. ideological, religious, professional, or other common interest or attribute).

For example, sub databases 138*a*-138*c* may represent records 132, 134, 136 from users within different regions. Likewise, sub databases 138*d*-138*f* may represent records 132, 134, 136 posted by users belonging to distinct communities. A transaction database 106 may also subdivide a database 106 based on the quantity of products offered for sale or offered to buy in a particular record 132, 134. For example, a sub database 138*g* may store products being bought or sold in bulk. A sub database 138*h*, on the other hand may represent products being sold in smaller quantities.

A user interacting with the transaction module 92 may specify which database 13 8*a*-138*h* a user wishes to search and be shown records 132, 134, 136 belonging to the chosen sub database 138*a*-138*h*. It will be noted that the division of the transaction database 106 into sub databases 138*a*-138*h* may be a logical division and records 132, 134, 136 may belong to multiple databases 138*a*-138*h*. That is to say, that a single record 132, 134, 136 may be said to be "in" a sub database 13 8*a*-13 8*h* simply based on the fact that it is somehow linked or otherwise recognized by the transaction system 92 as belonging to the class of records represented by a sub database 138*a*-138*h*. A single record 132, 134, 136 maybe in multiple sub databases 138*a*-138*h*.

Referring to FIG. 7, a user record 130 may include a user identifier 142. A user identifier may uniquely identify a particular user. For example, a user accessing the transaction application will have a user identifier 142 associated therewith. The user will typically access the transaction system 92 through a workstation 80, 82. A user identifier 142 may serve to associate transactions and other events or interactions with the correct user for purposes of accounting for funds and products and for purposes of holding a user accountable for violation of protocols.

A user record 130 may also include identity verification data 144. Identity verification data 144 may serve to verify that a user is who he claims to be. For example, a social security number, driver's license number, or other publicly recorded information may serve as identity verification data 144. Thus, a user who breaches protocols or commits fraud in dealing with the transaction system 92 may be both identified by authorities and prevented from dealing further with the system 92. For example, a user who violates an obligation or protocol in a transaction involving the transaction system 92 may attempt to simply deal with the transaction system 92 using a different name. However, obtaining identity verification data 144 may allow a host associated with a transaction system 92 to prevent this from occurring. A user who has no previous identity may have a high risk associated therewith and thus, be subject to higher transaction costs and security costs.

A user record 130 may include sanction data 146. A user breaching obligations or protocol may be subject to sanctions punishing the user or limiting the user's access to functionality of the transaction system 92. Accordingly, sanction data 146 may include a record or other data indicating to the system 92 or to a host associated with the system 92 that a particular user is subject to a sanction. The sanction data 146 may indicate the type of sanction. Alternatively the sanction data may simply be information indicating a level of severity. The level of severity may then be interpreted by the system 92 to impose the actual sanction. Types of sanctions may include increased fees, a limit on the number of transactions that the user may conduct, a limit on the price of products the user may attempt to sell using the system 92, a requirement for escrow of goods or money, or the like.

A user record 130 may include marketing data 148. Marketing data 148 may include information relating to a particular user's benefit to the host associated with the system 92. For example, a user may recruit other users to conduct business using the system 92. Accordingly, the marketing data 148 may note such information for use by other modules forming the system 92 for the purpose of providing rewards or incentives to a particular user. For example, a user who recruits a number of new users may receive reduced fees for transactions or an incentive payment based on transaction fees charged to the new users.

A user record 130 may include transaction data 150. Transaction data 150 may include information regarding products currently being offered for sale by a user, unfulfilled offers by a user to buy products, transactions currently in progress in which the user is a buyer or seller, and completed transactions in which the user was a buyer or seller.

A user record 130 may include access data 152. Access data 152 may include data indicating a user's permission to access types of data. For example, a user may be an office manager; accordingly, an employer may specify that access data 152 allow the user access only to information regarding office supplies offered for sale by other users using the transaction system 92.

A user record 130 may include authentication data 154. Authentication data 154 may include information used by the login module 118 of the user interface module 98 to verify that a user seeking to access the functionality of the system 92 is authorized to do so. The authentication data 154 may also enable the login module to ensure that a user is who he claims to be. Thus the login module 118 may compare the authentication data 154 with information provided by a user to ensure that the user is the user associated with the user record 130. Security or verification data may include biometrics, such as, finger prints, or voice prints, or trusted agency vouchers, bonds, or the like.

A user record 130 may include billing data 156. In some embodiments a user may be affiliated with a company or other entity. Accordingly, a user may be authorized to make purchases for the company. Billing data 156 may therefore indicate the entity, or some other person associated with the entity whom the host may bill for transaction fees or purchases.

A user record 130 may include shipment data 158. Shipment data 158 may indicate a postal address, or the like, for the shipment of products and information. Shipment data may also be used to calculate shipping costs for a particular transaction. The shipment data 158 may also indicate what method of shipment is to be used.

A user record 130 may include payment data 160. Payment data 160 may include information enabling a host associated with the system 92 to obtain funds from the user associated with the user record 130. For example, payment data 160 may include a credit card number, checking account number, or the like, which a host may use to transfer funds from the user to the host. Payment data 160 may likewise include an account number or the like identifying an account or fund maintained by the host to be drawn upon to pay a user's obligations.

Thus, a user may transfer funds to be held in an account by the host in anticipation of future transactions. As the transactions occur, the host may withdraw funds from the account to pay transaction fees or the purchase price of an article. Such an arrangement may be beneficial by reducing costs relating to collection and funds transfer fees that may arise using other payment methods. Payment data 160 may include data relating to multiple methods of payment. Multiple methods of payment may be listed in order of priority with the highest priority method used first. If the highest priority payment method is not available, the next in priority may be used, and so on for all listed payment methods.

A user record 130 may include risk data 162. Risk data 162 may indicate the level of risk associated with a particular user. For example, risk data 162 may reflect transactions in which a user, acting as a seller, failed to ship a product to the buyer, or where the other party to a transaction complained about the quality of an article or alleges not to have received a product, or the like. Risk data 162 may also reflect transactions where the user, acting as a buyer, failed to acknowledge receipt or claimed to have received a defective product.

Risk data 162 may also reflect a lack of a transaction history associated with a user. For example, a user who has not conducted many successful transactions using the system 92 may be considered to pose some risk of fraud. Accordingly, risk data 162 may indicate that a new user is high risk. Alternatively, a user who has conducted several successful transactions using the system 92 may have risk data 162 indicating that the user is low risk.

Risk data 162 may also associate the risk associated with a user to the price or value of products sold or purchased using the system 92. Thus a user who has conducted many transactions for low price products may have risk data 162 indicating a low risk for low price products. However, if the user has not conducted transactions for high priced articles, the risk data 162 may indicate that the user is still a high risk in transactions involving high priced products. This thwarts attempts to build a record on small transactions alone while planning a large fraudulent one.

Risk data 162 may also indicate whether a user has posted some security or purchased insurance to ameliorate risk associated with the user. Thus, a new user may provide funds to the host to guarantee transactions involving the user. Alternatively, a user may purchase insurance from the host or a third party to guarantee transactions. Accordingly, if a user fails to pay for a product or to ship a product, the host may simply charge the insurance or guarantee funds to pay any user harmed by the failure to pay or ship. Accordingly, risk data 162 may indicate that a user who has provided a guarantee is low risk, without regard to successfully completed transactions. Of course the risk data 162 may reflect the size of the guarantee. Thus, a user who only provides funds or insurance sufficient to guarantee low priced transactions may still have risk data 162 associated therewith indicating that the user is a high risk in high priced transactions.

A user record 130 may include contribution data 164. In some embodiments of the invention, users interacting with an system 92 may be invited to contribute information to, or to correct, a database. Users may also be invited to comment on the accuracy of information in a database. For example, users may be invited to classify products in order to allow subsequent users to easily find a desired product.

Contribution data 164 may indicate whether a user 130 has contributed information or comments to a database. Contribution data 164 may also indicate whether comments and information contributed by the user have been accurate, as compared statistically to data on the same product as judged by other users or by a host associated with an system 92. Contribution data 164 may also indicate the quantity of information. Contribution data 164 may be used to calculate incentives provided to a user to encourage contribution. For example, a user who contributes regularly may receive reduced transactions fees, or monetary payments.

A user record 130 may include modification privileges 166. Modification privileges 166 may indicate a particular user's privilege to modify a database. A modification privilege 166 may be determined based on the accuracy or other measure of reliability of a user's contribution. For example, a user who contributes information of high quality, or information corroborated by other users may, after a certain number of such corroborated contributions, have a modification privilege 166 indicating either that the user may modify the database without corroboration or that the user's contributions are to be weighed more heavily when deciding which of two contributions is correct.

Modification privileges 166 may indicate the nature of data that a user is allowed to modify or contribute toward. For example, products may be listed in a classification hierarchy going from general to specific. Thus, products may be grouped into general categories, subcategories, and listings of specific products. A user may have privileges to modify only specific listings. Alternatively, a user may have privileges to modify general classes of listings. A user who has contributed accurate information in the past may have modification privileges 166 indicating that the user may modify general classes of listings as well as specific listings.

A user record 130 may include listing privileges 168. Listing privileges 168 may indicate the nature of the data that a user is allowed to add to the body of product listings. For example, a user who is an employee at a book publishing company may have listing privileges for the books category of product listings, so the user may create product listings for newly-released books.

The listing privileges 168 are distinguished from the modification privileges 166 by the fact that modification privileges 166 indicate that a user is allowed to modify or contribute more information toward an existing product listing, while listing privileges 168 allow a user to create entirely new product listings. Listing privileges 168 may determine not only whether a user is able to create new product listings, but whether such new listings will be approved automatically.

For example, a new user may not be allowed to create new product listings without the listings' veracity, applicability, and non-redundancy first being checked by a host associated with an application program 92, in order that the host may avoid having spurious, offensive, or duplicative product listings. However, after a user has created several new product listings, the host may decide to increase the user's listing privileges 168. Increasing a user's listing privileges 168 may enable the user to have his or her new listings approved automatically in the future. In a similar fashion, a user who submits spurious listings may have his listing privileges 168 revoked completely.

Listing privileges may also indicate under which listings a user is permitted to post offers to buy and offers to sell. For example, an employee of a book seller may only be permitted to offer books for sale, and be prevented from offering consumer electronics for sale.

A user record 130 may include a user history 170. The user history 170 may include records of past transactions involving a user. The user history 170 may be used to arbitrate disputes between users. For example, an arbiter may evaluate the credibility of a user by examining whether the user has a history of problematic transactions.

Referring to FIG. 8, a purchase request record 132 may include a request identifier 180. A request identifier may uniquely identify an offer to buy a product or quantity or products. For example, a user may make various offers to buy the same product. Accordingly, a request identifier may be used to identify each offer.

A purchase request record 132 may include a listing identifier 182. A listing identifier 182 may uniquely identify a product. A listing identifier 182 may be assigned based on the model number and manufacturer of a product or other information that distinguishes a product from other products. Alternatively, products may be identified in terms of common features or functionality. Accordingly, the listing identifier 182 may uniquely identify a narrow class of goods.

A listing identifier 182 may simply be descriptive in nature. For example, a single listing identifier 182 may be assigned to all twenty Gigabyte hard drives. A listing identifier 182 may also indicate the condition of a product. For example, all new products having a common manufacturer and model number may share one listing identifier 182, whereas used products having the same manufacturer and model number may share a second or other listing identifier 182.

A purchase request record 132 may include pricing data 184. Pricing data may indicate the price at which a buyer is willing to purchase a product. A purchase request record 132 may include a quantity 186. The quantity 186 may indicate the number of a particular product that a buyer seeks to purchase at the price indicated by the pricing data 184.

A purchase request record 132 may include classification data 188. Classification data 188 may include general categories, sub categories, and listings to which a product belongs. Standard products, such as mass produced articles, movies, or the like, may be grouped together in a single listing. In some embodiments, standard products may be grouped under a listing based on whether the product is new or used. Classifications based on use may also be more specific. For example, products may be grouped in a listing based on a length of time of use, the presence or absence of blemishes, or some other metric of condition.

Unique articles may simply be grouped under general categories and subcategories, with each unique article having its own listing. Unique items are distinguished from standard items by the relative rarity of the items or by the size of the market for such items. For example, mass-produced items will generally be in the class of standard items, while hand-made or one-of-a-kind items will generally be in the class of unique items. In general, users will be discouraged from creating a unique item listing when a standard item listing accurately describes the product being offered for sale. Accordingly, classification data 188 may include the general category, subcategory (or subcategories), and listing that a product belongs under. In some embodiments, a unique article may be classifiable in a plurality of subcategories. Accordingly, classification data 188 may indicate a plurality of subcategories under which the article is classified.

A purchase request 132 may include a buyer identifier 192. The buyer identifier 192 may be any data uniquely identifying a user who caused the purchase request 132 to be created. A buyer identifier 132 may be the user identifier 142 of the user record 130 associated with the user causing the creation of the purchase request 132. A buyer identified by the buyer identifier 192 will typically be associated with a buyer workstation 82.

A purchase request 132 may include shipping data 194. Shipping data 194 may include an address or like information sufficient to allow a sender to ship a package to the user identified by the buyer identifier 192. Shipping data 194 may also indicate the shipping method to be used (e.g. air, ground, FEDEX, or other courier).

A purchase request record 132 may include billing data 196. Billing data may indicate a source of funds for the payment of obligations incurred using the system 92. For example, billing data may identify an account that may be drawn upon by a host operating the system 92. Billing data 196 may also identify a person or entity to be contacted to request funds.

For example, where the buyer identified by the buyer identifier 192 is a an employee of a company, the billing data 196 may identify an individual or department within the company, other than the employee identified by the buyer identifier 192, who is to receive requests for funds, and like notices of monetary obligations. Billing data 196 may include specific information concerning the manner of payment. For example, billing data 196 may include a prioritized lists of payment methods, each of which will be tried until a successful payment is made.

Likewise, a user may specify which payment method to be used based on price. Thus a user may instruct that a $50 purchase be paid with a credit card and that a $100 purchase be paid from a checking account. A user may also instruct that the purchase price be divided between payment methods. For example, the first $50 will be paid with a credit card, the next $50 from a checking account, and the next $50 from an account maintained with the host.

A purchase request record 132 may include priority data 198. The priority data 198 may indicate either when the product request record 132 was created, when the purchase request record 132 was last modified, or both. The priority data 198 may be used by a host or the system 92 to determine priority of purchase request records 132. Thus, if two purchase request records 132 offer to buy the same product at the same price, a host or system 92 may determine that the purchase request record 132 that was posted first in time will be matched with a corresponding offer to sell the product first.

The priority data 198 may also indicate some other mechanism for determining priority. Thus, a buyer who has preferred status, due to volume of sales, reliability or other criteria, may have his purchase request records 132 assigned an artificially high or weighted priority. Priority data 198 may include both data indicating a time of creation, modification, or the like, and other data indicating an arbitrary or calculated assignment of priority.

It will be noted that all or part of the data stored in a product record 132 may be required for the operation of the system 92. For example, in some embodiments, the classification data 222, seller identifier 226, and priority data 230, either taken alone, or in a combination of two or more, may serve the function of the offer identifier 210. Furthermore, classification data 232 may sufficiently identify the type of product requested and serve as a listing identifier 212. Alternatively, a listing identifier 212 may replace classification data 188.

It will also be noted, that not all of the data stored in a purchase request record 132 is unique to a particular request. Accordingly, in some embodiments a purchase request record 132 may only contain sufficient information to distinguish the purchase request record 132 from other purchase request records 132 and data linking the purchase request record 132 to data common to all purchase request records 132 for the same product. For example, as discussed below, the listing module 102 may sort and classify purchase request records 132 into listings. The listings may reflect data describing or identifying the type of product included in the listing. Accordingly, simply linking a purchase request record 132 with a listing will enable access to the information stored or reflected by the listing.

Furthermore, such information as the shipping data 194 and billing data 196 may be stored in the user record 130 associated with the buyer identified by the buyer identifier 192. Accordingly, such data may be omitted from the purchase request record 132 and accessed instead by referencing the user record 130 identified by the buyer identifier 192.

Referring to FIG. 9, a product record 134 may include an offer identifier 210. An offer identifier may be data uniquely identifying an offer to sell a particular product, or quantity of products.

A product record 134 may include a listing identifier 212. A listing identifier 212 may uniquely identify a product. A listing identifier 212 may be assigned based on the model number and manufacturer or a product or other information that distinguishes a product from other products.

Alternatively, products may be identified in terms of common functionality. Accordingly, the listing identifier 212 may uniquely identify a narrow class of goods. A listing identifier 212 may simply be descriptive in nature. For example, a single listing identifier 212 may be assigned to all twenty-Gigabyte hard drives or drives near that range. A listing identifier 212 may also indicate the condition of a product. For example, all new products having a common manufacturer and model number may share one listing identifier 212, whereas used products having the same manufacturer and model number may share a second listing identifier 212 or even be subdivided by age, condition, or the like.

A product record 134 may include descriptive data 214. Descriptive data 214 may provide a description unique to a particular offer. For example, descriptive data 214 may describe nonstandard features, defects, or problems a product has. Descriptive data 214 may be embodied as text entered in by a seller causing the creation of the product record 134. Descriptive data 214 may include standardized descriptions. Thus, a product record 134 for a laptop computer may have standardized descriptors such as: no bad pixels/has bad pixels, damaged case/undamaged case. In some embodiments, a seller may be presented with a dialog of possible descriptors and may simply check a box indicating that a descriptor applies.

Using such a system a buyer may then easily search for a product having desired characteristics. Providing standardized descriptors may make searching through product records 134 a simpler process. For example, a buyer may be presented with a dialog indicating the same descriptors that were presented to the seller upon creation. The buyer may then select descriptors that meet the buyer's needs. Using the buyer's inputs, the system 92 may present to the buyer only those product records 134 that meet the buyer's needs.

In some embodiments, unique items that are not mass produced or are not sold in large enough numbers to be sold as part of a class may be sold using the system 92. Accordingly, descriptive data may be any data relevant to a buyer. For example, an antique clock offered for sale may have descriptive data 214 indicating the year of manufacture and manufacturer, as well as operating conditions, any blemishes, or the like.

A product record 134 may include review data 216. Review data 216 may include data or links to data corresponding to opinions of experts or critics concerning the product offered for sale using the product record 134. Review data 216 may also include feedback from consumers who have purchased the product, whether through the use of the system 92 or some other mechanism. Review data 216 may be assembled from users who buy products using the transaction system 92.

For example, a user who buys a product may be sent a solicitation for feedback about the article purchased. Feedback from a user may be in the form of freely written text or in the form of standardized responses to queries. For example, a questionnaire may be tailored to a specific class of products allowing users to give standardized responses to concerns that most frequently arise with respect to a particular product or class of product. Surveys may be generated automatically. For example, the first users to review a product may make comments about the product in the form of freely written text. Subsequent users may be presented with these comments and simply asked to state whether they agree or disagree.

Using standardized forms for feedback may allow for easier compilation of users' responses. Compilation of responses may allow subsequent users to more readily determine the consensus of opinion with regard to a particular product. Thus, a subsequent user may be presented with a summary of responses stating that, for example, 75% of purchasers of this product reported problems with feature Z.

A product record 134 may include quantity data 218. The quantity data 218 may indicate how many units of a product are being offered for sale. The quantity data 218 may also indicate whether or not the quantity must be bought as part of a single transaction, in a minimum amount, or singly. For example, a seller may wish to sell in bulk quantities and be unwilling to bother with small orders. Accordingly the quantity data may reflect that only purchase request records 132 that offer to buy the entire quantity or some minimum quantity should be matched with the product record 134.

A product record 134 may include pricing data 220. The pricing data 220 may indicate the price at which the seller is willing to sell a product. Pricing data 220 may indicate a price corresponding to the number of units bought. For example, pricing data 220 may indicate that a buyer of 100 units may buy at 5 dollars per unit, whereas a buyer of 1 unit must pay 10 dollars. Pricing data 220 may include a schedule mapping quantities to prices. Alternatively, pricing data 220 may include a formula for calculating a price based on a quantity requested.

A product record 134 may include classification data 222. Classification data 222 may serve the same function with respect to the product record 134 as the classification data 188 serves for the purchase request record 132.

A product record 134 may include access data 224. Access data 224 may indicate what class of buyer is allowed to access the product record 134. Thus, for example, access data may indicate an age appropriateness of the product record 134, or other like restriction.

A product record 134 may include a seller identifier 226. A seller identifier 226 may identify a person or other entity seeking to sell the product identified by the product record 134. The seller identifier 226 may be the user identifier 142 from the user record 130 corresponding to the seller of the product.

A product record 134 may include payment data 228. Payment data 228 may include data sufficient to allow a host associated with an system 92 to transfer funds to the seller associated with the product record 134. Payment data 134 may include data sufficient to allow the system 92 to automatically transfer funds to the seller. In instances where the seller is an employee of a company or other entity, payment data 134 may indicate a department or employee of the company, other than the seller, who is to receive the proceeds of transactions using the system 92. Multiple methods of payment may be listed in order of priority with the highest priority method used first. If the highest priority payment method is not available, the next in priority may be used, and so on for all listed payment methods.

A product record 134 may include priority data 230. The priority data 230 may indicate either when the product record 134 was created, when the product record 134 was last modified, or both. The priority data 230 may be used by a host or the system 92 to determine priority of product record 134. Thus, if two product records 134 offer to sell the same product at the same price, a host or system 92 may determine that the product record 134 that was posted first in time will be matched with a corresponding offer to buy the product first. The priority data 230 may also indicate other criteria for determining priority. Thus, a seller who has a preferred status, due to volume of sales, reliability, longevity, or other criteria, may have product records 134 assigned a weighted, high priority. Priority data 230 may include both data indicating a time of creation, modification, or the like, and other data indicating an arbitrary or calculated assignment of priority.

A product record 134 may include certification data 232. Certification data 232 may include standardized or non-standardized certifications for a particular product. For example, certification data may include an appraisal by a qualified expert on a product. Certification data 232 may include, for example, a report. A report issued by a gemologist for a diamond certifying the weight, color, clarity, and cut of the diamond.

It will be noted that the data stored in a product record 134 may not be unique to any particular product record 134. It will be noted that price, a product identifier 212, descriptive data 214, review data 216, classification data 222, access data 224, and certification data may be generic to all product records corresponding to the same product. Accordingly such data may be stored as part of a listing to which all similar product records 134 may be associated, rather than as part of a product record 134.

It will also be noted that such data as payment data 230 may be stored in a user record 130 identified by the seller identifier 226. Accordingly, payment data 230 may not need to be stored as part of a product record 134, but rather accessed by referencing the user record 130 identified by the seller identifier 226.

In some embodiments, the various entries in a purchase request record 132 or product record 134 posted users may be changed in response to an event. Such an event may include, the fulfillment of another product record 134 or purchase request record 132 posted by the same user. Other events may include the change in the market price, postings of product records 134 and purchase request record 132 by other users, withdrawal of the records 132, 134 by other users, and the like.

Any of the data stored within the records 132, 134 may be modified in response to such an event. The data modified may include the pricing data, quantity, listing identifier of the record 132, 134. In some embodiments records 132, 134 may have an expiration date. For example, a record 132, 134 may only be available to be matched during a specified period, after which it will no longer be matched by the matching module 340. Accordingly, the expiration date may also be modified in response to other events taking place involving the transaction system 92.

In some embodiments, a purchase request record 132 may be changed to a product record 134 in response to an event described hereinabove. In a like manner a product record 134 may be changed to a purchase request record 134. In a like manner a product record 134 may be changed to a purchase request record 134 in response to an event described hereinabove.

For example, a user may wish to buy a digital camera, without regard to the specific model. For example, a user may wish to buy either Brand X or Brand Y, both of which are of comparable quality, but also wishes to get a good deal. Accordingly, the user may post multiple purchase request records 132. Where one of the multiple purchase request records 132 is matched, the transaction system 92 may automatically remove the others of the multiple purchase request records 132 as soon as any one of them is matched.

In some embodiments the transaction system 92 may facilitate the posting of multiple purchase request records 132. For example, a user may be enabled to post a purchase request record 132 for all listings within an entire subclass 268 or class 266 of products. Accordingly, the purchase request record 132 would be matched with any product record 134 within that class 266 or subclass 268. In some embodiments the transaction application may create a purchase request record 132 for each listing within the chosen class 266 or subclass 268. Alternatively, the purchase request record may simply identify the class 266 or subclass 268 in lieu of a listing identifier 182.

In another example, a user may wish to change the pricing data 220 of a product record 134 in response to changing market conditions. For example, if demand is strong (e.g. a product sells quickly or many purchase request records 132 for a product have been posted) a seller may wish to increase the asking price. For example a user may post product records 134 for 20 copies of a DVD. A user may specify that if a certain number sell within a certain amount of time, that the price of the remaining DVDs is to be increased automatically by the transaction system 92.

In a like manner, if a certain number are not sold within a specific amount of time, a user may specify that the transaction system 92 is to automatically reduce the price of the unsold DVDs. The increase or reduction may be performed repeatedly as instructed by the user in response to market conditions. Such a system 92 may promote market efficiency by ensuring that the price of each item sold corresponds closely to demand.

The expiration date of a product record 134 may also change in response to other events. For example, a user selling 20 DVDs may be willing to allow the last five to be on the market longer if the first 15 sell quickly. That is to say, a user may recover expenses and have the ability to wait longer in view of prior successful sales in order to get the best possible price.

In another example, a user may post a product record 134 for a bulk quantity of a product and multiple product records 134 for smaller quantities of the same product. A user may instruct the transaction system 92 that as the product records 134 for the smaller quantities are matched, the quantity of products in the bulk product record 134 shall be reduced. In a like manner if the bulk product record 134 is matched, the dependent product records 134 for small quantities may be removed.

In another example, a purchase request record 132 or product record 134 may be created in response to the matching, expiration, or removal of another purchase request record 132 or a product record 134. For example, a user may buy a computer using the transaction system 92, a user may specify that as soon as the purchase request record 134 for the computer is matched, that corresponding product records 132 for the parts of the computer shall be posted.

The abovementioned functionality of providing for dependencies and interaction between records 132, 134 may be facilitated by a user interface allowing a user to automatically post records 132, 134 under related listings. For example, a user may automatically post listings for both a new item and a used item while interacting with a single dialog or web page. A user may be able to post the different prices for the different listings (e.g.$10 new and $5 used).

It will be noted, that the above described method of enabling users to establish dependencies between various purchase request records 132 and product records 134 may be used independently of the transaction process 250 described hereinbelow. For example, a traditional auction site may enable a user to post multiple bids with a condition that if any one bid wins an auction, the other bids are rescinded immediately.

Records corresponding to dependencies (e.g. data interpreted as instructions to be executed in response to events) may be stored as part of a user record 130. In some embodiments, dependencies may be stored as part of the records 132, 134 to which they relate.

Referring to FIG. 10, a market record 136 may be used to store a record of past transactions consummated using the system 92. Market records 136 may also store a record of transactions that did not involve the use of the system 92. A market record 136 may include a listing an identifier 240 indicating the product or class of products to which the market record 136 relates. Market records 136 may be used to present to a buyer or a seller the behavior of market for a particular product. Thus, a buyer may view that the price for which a product has been selling in the recent past is less than the market price of the product in the more distant past. Such data may allow a buyer to conclude that the price for which a product is being offered is a comparatively good one or a bad one according to trend.

A market record 136 may include a sale price history 244 recording the price at which a product has sold in the past. A market record 136 may record sales prices and the dates of consummation for transactions occurring within a specified period. For example, a market record 136 may be updated to include only those transactions that occurred within the past six months or year, with older transactions being expunged from the market record 136. Alternatively, a sales price history 244 may record all transactions that have ever taken place using an system 92 as well as other sales transactions using other mechanism whose sales prices have been input into a market record 136.

A market record 136 may include statistical analysis 244. Statistical analysis 244 may include analysis of sales prices using statistical methods for the purpose of predicting future market behavior or relating the market behavior of one product to the behavior of another.

In some embodiments, statistical analysis 244 will represent an attempt to relate the sales price history of related products to another product. For example, in the realm of computers, many different combinations of components are possible to create an operable computer system. Computers may have different processors, hard drives, motherboards, memory sizes, and other peripherals. Given the wide range of possible combinations of computers, it may be difficult to provide information to a buyer that accurately reflects the price history of a computer.

For example, a computer with the exact specifications as those of a computer offered for sale by a seller may not have ever been sold using the system 92. Alternatively, very few computers having the exact specification may have been sold. Statistical analysis 244 may therefore include an attempt to compile records of sales of computers having diverse specifications. It may thus be a simple matter to determine the contributed value of a feature in assessing what the price of any given computer having any given specifications should sell for.

Statistical analysis 244 may include an equation derived from the sales price histories of items. The system 92 takes as its input the specifications of a product and provides as its output a price. Thus, for example, an equation may take as its input a processor speed, memory size, and hard drive size of a computer product. The equation may reflect how each of these parameters has statistically affected the sales price of computers. Accordingly, the price output by the equation may indicate an estimate of what the market value of the computer should be. The equation may be the result of any data reduction or statistical analysis method known in the art.

Figure 11:
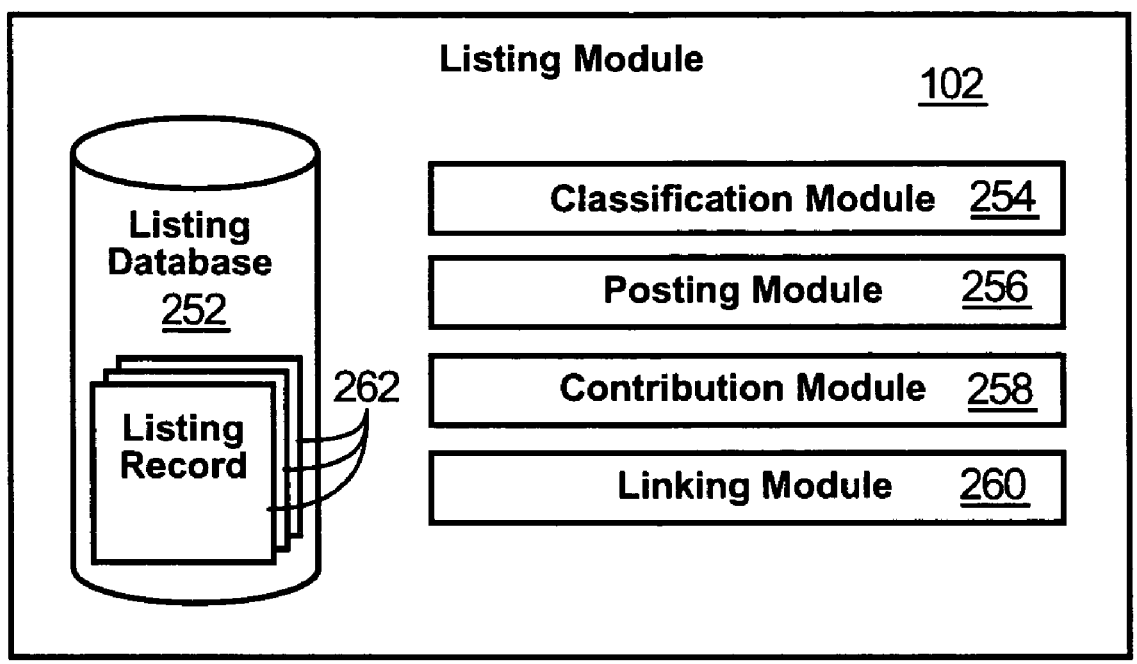
FIG. 11 is a schematic block diagram of one embodiment of a listing module, in accordance with the invention.

Referring to FIG. 11, a listing module 102 may include a listing database 252, a classification module 254, a posting module 256, a contribution module 258, and a linking module 260. The listing module 102 is typically responsible to manage the organization of products offered for sale, or offers to buy products, into a searchable hierarchy. The listing module may also assemble other data relevant to purchasers and sellers of products.

The listing database 252 may include listing records 262 containing data relevant to a product offered for sale using the system 92. A listing record 262 may be created for each "species" of product being offered for sale. Thus, for example, one listing record 262 may be created for all XYZ models of a certain brand of digital camera sold using the system 92.

A listing record 262 may also be created for unique items not likely to be offered for sale frequently. Thus, a listing record 262 for a unique item may represent the actual item offered for sale rather than a species of item offered for sale. In some embodiments, a listing record 262 may be created for each unit of a product offered for sale, unique or otherwise.

Figure 12:
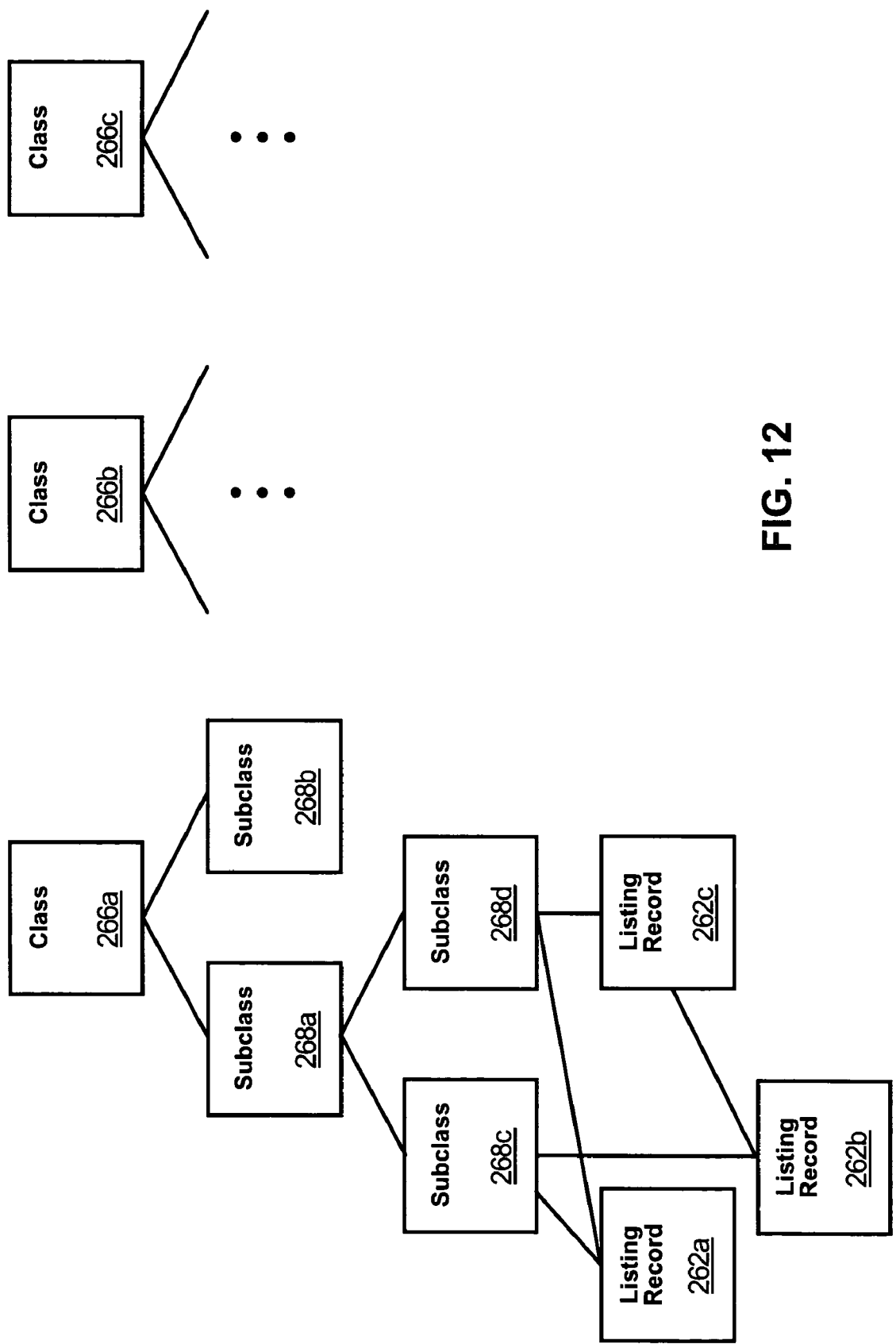
FIG. 12 is a schematic block diagram of one embodiment of a hierarchical listing database, in accordance with the invention.

Referring to FIG. 12, while still referring to FIG. 11, a classification module 254 may organize the listing records 262 into a hierarchy 264 that facilitates searching by buyers and sellers seeking to buy or sell a particular product. When an instance of a species of product is first offered for sale using the system 92, or when a unique item is offered for sale using the system 92, the classification module 254 may create a listing record 262. The system 92 may associate the listing record 262 with one of a plurality of classes, shown here as exemplary classes 266a-266c. The listing record 262 may be associated with a plurality of subclasses 268a-268d, each associated with the classes 266a-266c. The subclasses may be organized into a hierarchy having multiple levels of subclasses 268a-268d.

The classification module 254 may rearrange the classification of classes 266, subclasses 268, and listings 262, in response to the volume of purchase request records 132 and product records 134. Thus, a product, or class of products that is rarely sold may be placed in a subclass 268 rather than a class 266. The product, or class of products, may be placed in a subclass 268 lower in the hierarchy than a product that sells in greater volumes.

A listing record 262, such as a listing record 262a, may be associated with multiple subclasses 228a-268d. In particular, listing records of unique items may be associated with multiple subclasses 268a-268d. A listing 262a, particularly a listing 262b representing a unique item, may be associated with another listing 262c. Associating a unique listing 262b with other listings 262a, 262c will enable the listing to be viewed along with the other listings 262a, 262c when a user is searching for a product. Thus, for example, a user who attempts to find information relating to a product belonging to a species of products may be presented with information for the product requested as well as information for related unique items that are associated with that product.

Referring again to FIG. 11, a posting module 256 may allow users at remote workstations 80, 82 to create a product record 134, or purchase request record 132 and associate the record 132, 134 with a listing record 262. The posting module 256 may offer a form or like mechanism to prompt a user to enter information contained in a record 132, 134. A posting module 256 may also automatically fill in information generic to a listing 262 into a record 132, 134. Alternatively, such generic information may not be stored with a record 132, 134, but rather accessed by referring to the listing record 262 with which a record 132, 134 is associated.

In some situations, a user may wish to buy a digital camera, without regard to the specific model. For example, a user may wish to buy either Brand X or Brand Y, both of which are of comparable quality, but also wishes to get a good deal. Accordingly, the user may post multiple purchase request records 132. Where one of the multiple purchase request records 132 is matched, the transaction system 92 may automatically remove the others of the multiple purchase request records 132 as soon as any one of them is matched.

In some embodiments the posting module 256 may facilitate the posting of multiple purchase request records 132. For example, a user may be enabled to post a purchase request record 132 for all listings within an entire subclass 268 or class 266 of products. Accordingly, the purchase request record 132 would be matched with any product record 134 within that class 266 or subclass 268. In some embodiments the posting module 256 may create a purchase request record 132 for each listing within the chosen class 266 or subclass 268. Alternatively, the purchase request record may simply identify the class 266 or subclass 268 in lieu of a listing identifier 182.

A linking module 260 may link a listing record 262 with information relevant to a seller or purchaser of a product. For example, a consumer protection organization, critic, or other reviewer may have published an opinion concerning a product. A manufacturer of a product may provide technical information, or the like. Accordingly, a linking module may provide a mechanism for users viewing the information contained in a listing record 262 to view such relevant information.

The linking module 260 may create links to such information using automated web crawling, or other search techniques. The linking module 260 may simply allow a user, whether at a workstation 80, 82, at the server 86, or other computer connected to the server 100, to enter sufficient information to allow ready access to the helpful information. The linking module 260 may store the information on the server 86 or provide a hyperlink or like mechanism allowing ready access to the information.

Figure 13:
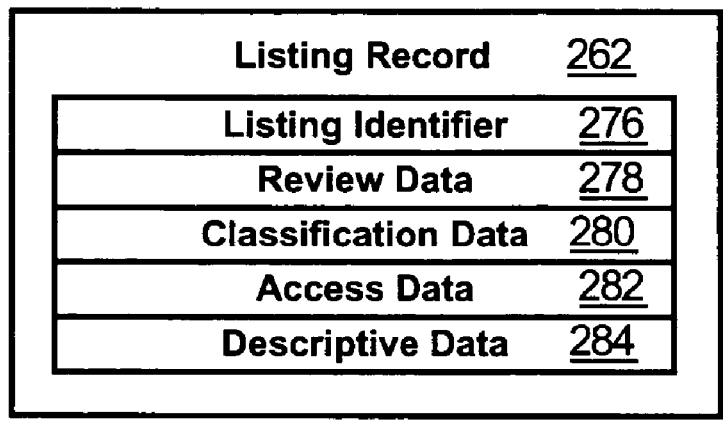
FIG. 13 is a schematic block diagram of one embodiment of a listing record, in accordance with the invention.

Referring to FIG. 13, a listing record 262 may include a listing identifier 276 uniquely identifying the listing record 262. The listing record 262 may include review data 278. The review data 278 may include information such as opinions, test results, survey results, technical information provided by a manufacturer, or the like. The review data 278 may include the information itself or simply a link, or other mechanism, allowing ready access to the information.

As a practical matter, review data 278 may be provided as a part of a reciprocal arrangement between a host associated with an system 92 and the provider of the review data 278. A host may allow access to review data 278 to users of the system 92 along with a link to the provider of the review data. Review data 278 may include an advertisement promoting the provider of the review data 278, or a hyperlink to the provider's website. Likewise, a host of the system 92 may insist that the provider of the review data 278 provide a link to the system 92, an advertisement promoting the system 92, or both. These may be included on a website hosted by the provider of the information in exchange for the host providing the review data 278 from the provider to users of the system 92.

A listing record 262 may also include classification data 280. The classification data 280 may identify the class 266, and subclass 268, or subclasses 268, to which the listing record 262 belongs. A listing record 262 may include access data 282. The access data 282 may indicate that the listing record 262 may only be accessed by a certain class of users or by users with specified privileges. The listing record 262 may include descriptive data 284 describing the product associated with the listing record 262. Descriptive data 284 may have all or some of the attributes attributed to the descriptive data 214 of a product record.

Figure 14:
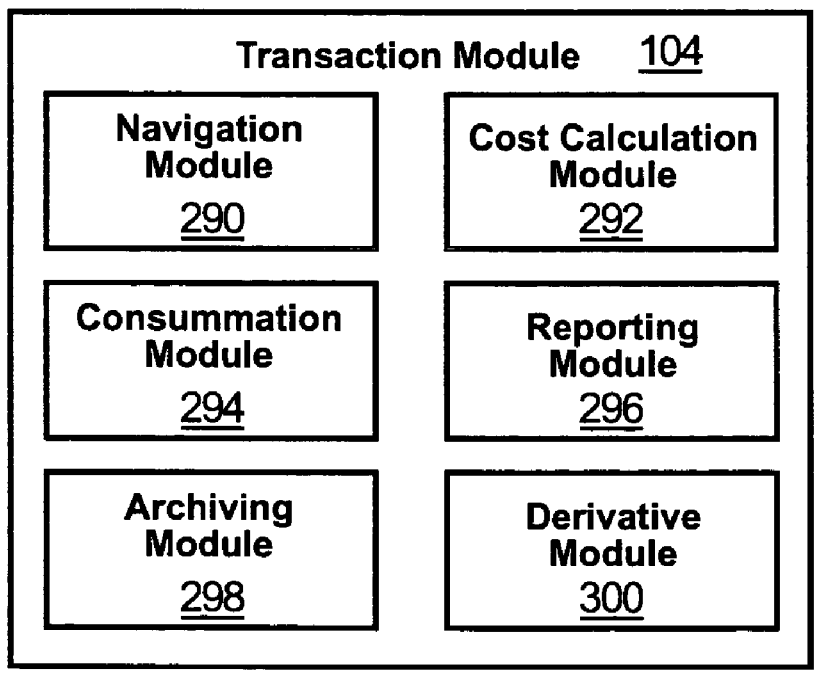
FIG. 14 is a schematic block diagram of one embodiment of a transaction module, in accordance with the invention.

Referring to FIG. 14, a transaction module 104 may perform processing necessary to conduct a sale of a product using the transaction system 92. The transaction module 104 may include a navigation module 290, a cost calculation module 292, a consummation module 294, a reporting module 296, an archiving module 298, and a derivative module 300.

Figure 15:
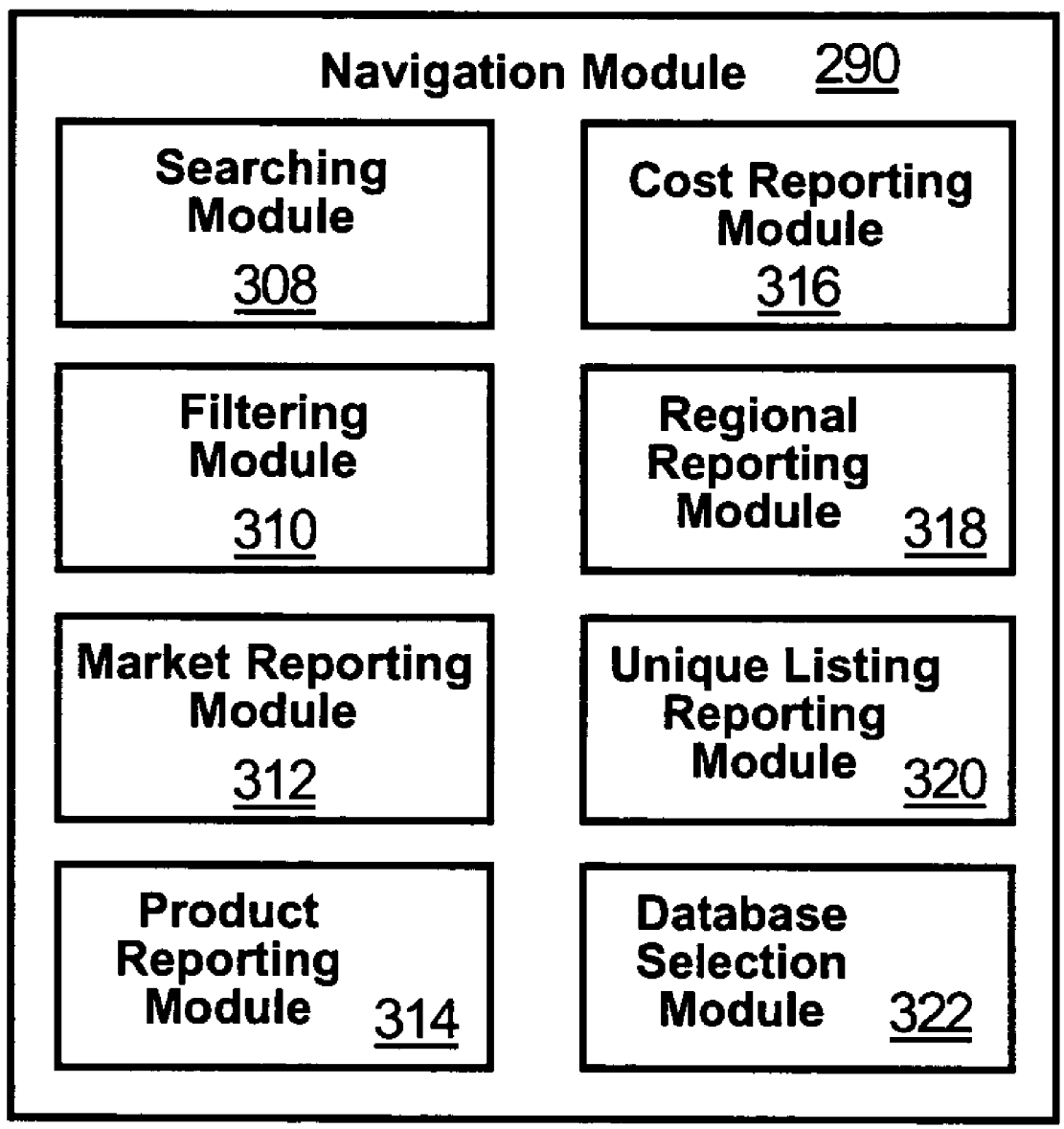
FIG. 15 is a schematic block diagram of one embodiment of a navigation module, in accordance with the invention.

Referring to FIG. 15, a navigation module 290 may include a searching module 308. The searching module 308 may enable a user at a remote workstation 80, 82 to find a listing record 262. Thus, a seller wishing to sell a product may use the searching module 308 to locate the correct listing record 262 under which to post the product for sale. Likewise a buyer may use the searching module 308 to locate a product to buy and post a purchase request record 132 under the listing 262 for that product. The searching module 308 may perform any searching method or may include or be any searching application known in the art, such as a web browser, or other type of browser.

A navigation module 290 may include a filtering module 310. The filtering module 310 may enable a user interacting with the system 92, or a host operating an system 92, to restrict the listings 262 that a user views when searching the listing database 252. The filtering module 310 may filter listings 262 based on the geographic location of the seller or buyer who posted the product record 134 or purchase request record 132, the access data 224 of the user who is searching the listing database 252, the pricing data 184, 220 of a purchase request record 132 or product record 134, the quantity of a product being offered for sale or offered to buy, or like criteria.

A navigation module 290 may include a market reporting module 312. The market reporting module 312 may display information relating to the market for a particular product. In certain embodiments, a user who views information about a particular listing record 262 may also be presented with a sales history of the product associated with that listing record 262. The information reported by the reporting module 312 may be assembled from the market records 136 of past transactions stored in the transaction database 106.

For example, a user may be presented with the sale price that the last unit of the product associated with the listing 262 sold for. A user may also be presented with a graph indicating the sale price of the product over time. A user may also be presented with the pricing data 184 of the purchase request record 132 having the highest price and the pricing data 220 of the product record 134 having the lowest price.

The reporting module 312 may determine which of the purchase request records 132 has the highest price and which product record 134 has the highest price based on the total cost of the transaction to the users who caused the records 132, 134 to be created. Thus, a prospective buyer may be presented with the product record 134 that will have the lowest cost to that particular prospective buyer, which may include evaluating one or more of the following: the offer price, shipping costs, funds transfer costs, sales taxes, and other transaction costs. Classes of buyers may receive different pricing based on status or rights. Thus, a single seller may wholesale and retail products on the same listing.

The product reporting module 314 may present information helpful to a user deciding whether or not to buy a product. The product reporting module may present the descriptive data 284, review data 278, or like information from the listing record 262 or other source of information.

The cost reporting module 292 may report the costs of a particular transaction. For example the cost reporting module 292 may report the cost of shipping an article. The cost reporting module 292 may also report other fees or costs associated with a transaction.

The regional reporting module 318 may allow users to view purchase request records 132 and product records 134 that are being offered by other users within a particular geographic region. In some embodiments, products being offered for sale to users within a specific region may be stored in a separate regional database, or separate regional databases. The regional reporting module 318 may then provide an interface between users at remote workstations 80, 82 and a regional database. A regional database may be useful to market products that are not shipped easily, or cost effectively such as large appliances or vehicles.

A navigation module 290 may include a unique listing reporting module 320 to handle the presentation of uncommonly sold products to users. The unique listing reporting module 320 may allow users to search unique listings by key words or like criteria or allow users to search unique listings organized by classes and subclasses. In some embodiments, the unique listing reporting module 320 may display listings 262 for unique products along with information regarding listings 262 for commonly sold products. Thus, a user who has requested information about a generic product X may also be presented information about unique products Y and Z, that bear some relation to product X.

A navigation module 290 may include a database selection module 322. The database selection module 322 may enable a user to choose which sub database 138a-138h to search. Accordingly, a user could search a database 138g representing all records 132, 134 selling bulk quantities of products.

Figure 16:
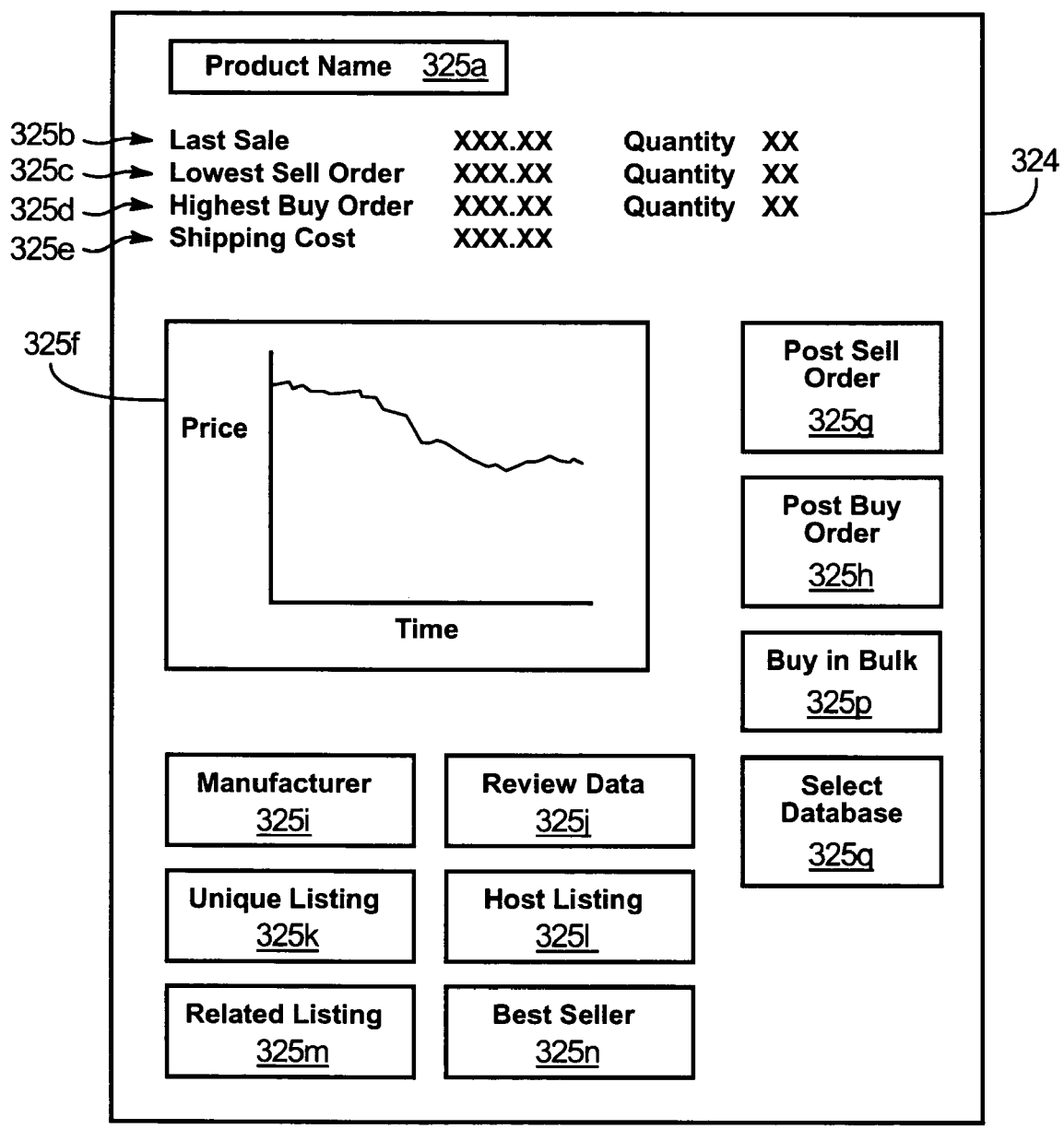
FIG. 16 is one embodiment of an illustration of one embodiment of a user interface, in accordance with the invention.

Referring to FIG. 16, the navigation module 290 may display information relating to a particular product. For example, information such as the highest priced offer to buy, lowest priced offer to sell, and sale price history may be displayed for related products. A user may also be shown information relating to the best selling product in a particular class 266 or sub class 268 according to selected criteria. For example, a user searching for digital cameras may be informed that camera X made by manufacturer Y has sold the highest number of units in the previous week, or other time period.

In some embodiments a user at a workstation 80, 82 may be presented a user interface 324 as illustrated. The interface 324 may include a plurality of user interface elements 325a-325q. For example, the interface 324 may include the product name

325*a*, or other identifying information 325*a* indicating the product, or listing 262, to which information in displayed in the interface 324 relates. The interface 324 may include a last sale price 325*b* indicating the price and quantity most recently sold, a lowest sell order 325*c* indicating the price and quantity of the lowest priced product record 134, a highest buy order price 325*c* indicating the price and quantity of the highest priced purchase request record 132, and shipping cost 325*d* indicating how much buying a unit of the product of the lowest priced product record 134 will cost for shipping. The interface 324 may include a graph 325*e* indicating the sales price history.

The interface 324 may include a post sell order button 325*f* enabling a user to initiate the process of creating a product record 134. The interface 324 may include a post buy order button enabling a user to initiate the process of creating a purchase request record 132.

The interface 324 may also include the display of information, or of links to information, that would be relevant to a buyer or seller of a product. For example a manufacturer element 325*g* may contain information, or a link to information, provided by the manufacturer of the product identified by the product name 325*a* (hereinafter the product 325*a*).

Other elements 325*h* may include a link to a listing 262 for a unique product that is related to the product 325*a*. An element 325*i* may include a link to a listing 262 for a related listing 262 for a commonly sold product. Element 325*j* may include information, or links to information, by critics, consumer protection organizations, prior buyers, or the like reviewing the product 325*a*. Element 325*k* may include information, or a link to information, relating to the best selling product within the class 266 or subclass 268 to which the product 325*a* belongs. Element 325*l* may include information, or a link to information, concerning products being offered for sale by the host of the transaction system 92.

For example, a host may buy and sell products in accordance with the execution of the transaction system 92. In some instances, a host may adopt a policy of selling products at peak seasonal times, when the host is unlikely to disrupt the marketing of products by users of the transaction system 92. A host may also identify itself as the seller when marketing products using the system 92 to avoid claims of manipulation or deception.

The interface 324 may include an element 325*p* enabling a user to change databases to a database containing product records 134 offering large quantities of the product. The interface element 325*q* may provide a link to another database, such as a regional database, containing product records 134 created by sellers in the buyer's vicinity, or by buyers in the seller's vicinity.

Figure 17:
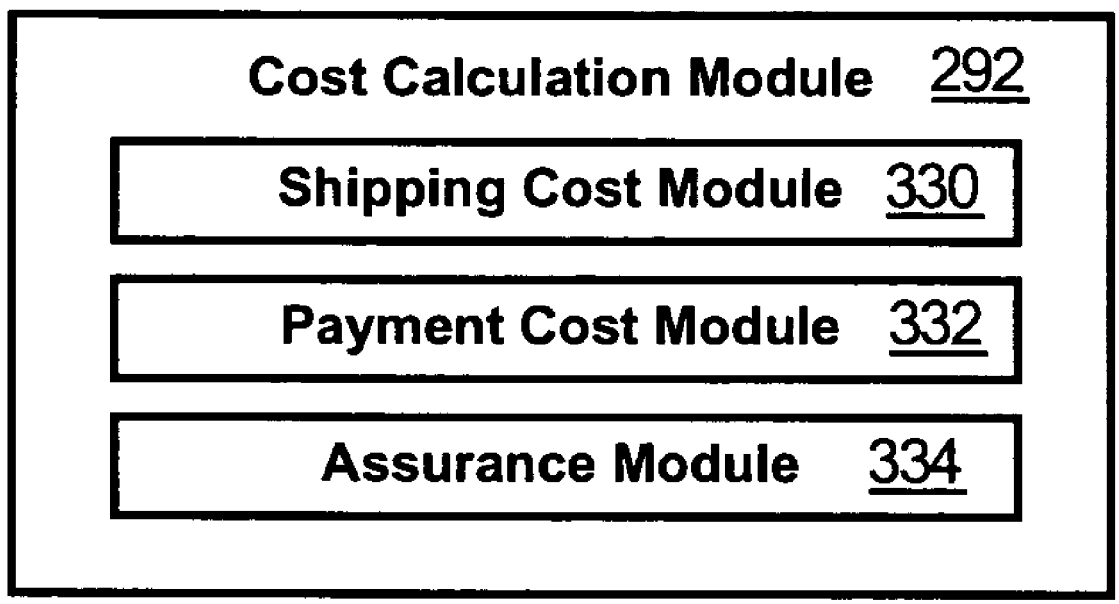
FIG. 17 is one embodiment of a cost calculation module, in accordance with the invention.

Referring to FIG. 17, a cost calculation module 290 may calculate the costs associated with a transaction between a seller at a seller workstation 80 and a buyer at a buyer workstation 82. The cost calculation module 290 may include a shipping cost module 330. The shipping cost module 330 may calculate the cost of shipping a product from the user associated with a product record 134 to a user associated with a purchase request record 132. The shipping cost module 330 may calculate the shipping cost based on the weight and size of the product being shipped as well as on the addresses and carrier options stored in the shipment data 158 of the user records 130 associated with the buyer and the seller. In some embodiments of the present invention, the process of calculating shipping costs may be streamlined by charging a flat shipping charge to every transaction involving a product. Thus, the shipping cost module 330 may simply calculate a shipping cost based on the weight and size or other description of a product rather than on the locations of the buyer and seller.

In some embodiments, the transaction application may facilitate the provision of service by the host to facilitate international shipment. For example, some users may be reluctant to deal with foreign shipment of products and input requirements reflecting extra care in this matter. Accordingly the host may invite users to send products to the host, the host may then inspect the product to ensure that it has been shipped in good order, and then forward the product to its foreign destination. A host may charge a fee for such service. Accordingly, the shipping cost module 330 may calculate the fee for such a service when calculating the shipping costs for a transaction.

The payment cost module 332 may calculate the cost of transferring funds from the buyer to the seller. The payment cost module 332 may take into account the fees charged by third parties to transfer funds, the cost of collecting delinquent accounts using a particular method of payment, and other such factors. In some embodiments of a system 92 in accordance with the present invention, transactions may be simplified by insisting that parties to a transaction use a limited number of funds transfer mechanisms.

For example, a host may require that all users pay by credit card, or other payment method. In some embodiments, a host associated with a transaction system 92 may also allow users to have an account containing funds directly accessible by the host to cover costs associated with a transaction. The payment cost module 332 may then calculate a cost of funds transfer that is lower for users providing a funded account accessible by the host inasmuch as the cost of collecting funds is much lower.

The cost calculation module 290 may include an assurance module 334. The assurance module may calculate fees and insurance costs for a transaction based on the risk associated with the parties to a transaction. The assurance module 334 may charge insurance costs to users whose user record 130 contain risk data 162 indicating that the user is a high risk, as discussed below in conjunction with the risk calculation module 454.

In some embodiments, insurance costs will be charged in every transaction where anticipated risk requires insurance. Insurance costs may be incorporated as part of the fee charged for a transaction. The costs of insuring a transaction may be charged to the matched buyer, the matched seller, or both. For example, to make buying more buyer friendly, a seller may be charged the cost of insuring. In some embodiments, sellers only may be charged a fee corresponding to insurance costs under normal circumstances, with buyers being charged a fee as insurance only when the risk calculation module 454 determines that the buyer exceeds some threshold level of risk.

In some embodiments, users who wish to reduce the inconvenience of handling disputes may also purchase insurance payable without the necessity of arbitration or investigation of a disputed transaction. Likewise a buyer wishing to insure against disputes involving receipt of damaged products, or the like, may purchase insurance. Voluntarily assumed insurance costs may also be calculated based on the prior dealings of the party requesting insurance.

For example, if a buyer has a history of claiming to have received damaged products, the assurance module 334 may charge higher insurance costs to that buyer. In another example, if a seller has a history of shipping defective products, the assurance module 334 may charge the seller more for insurance.

Figure 18:
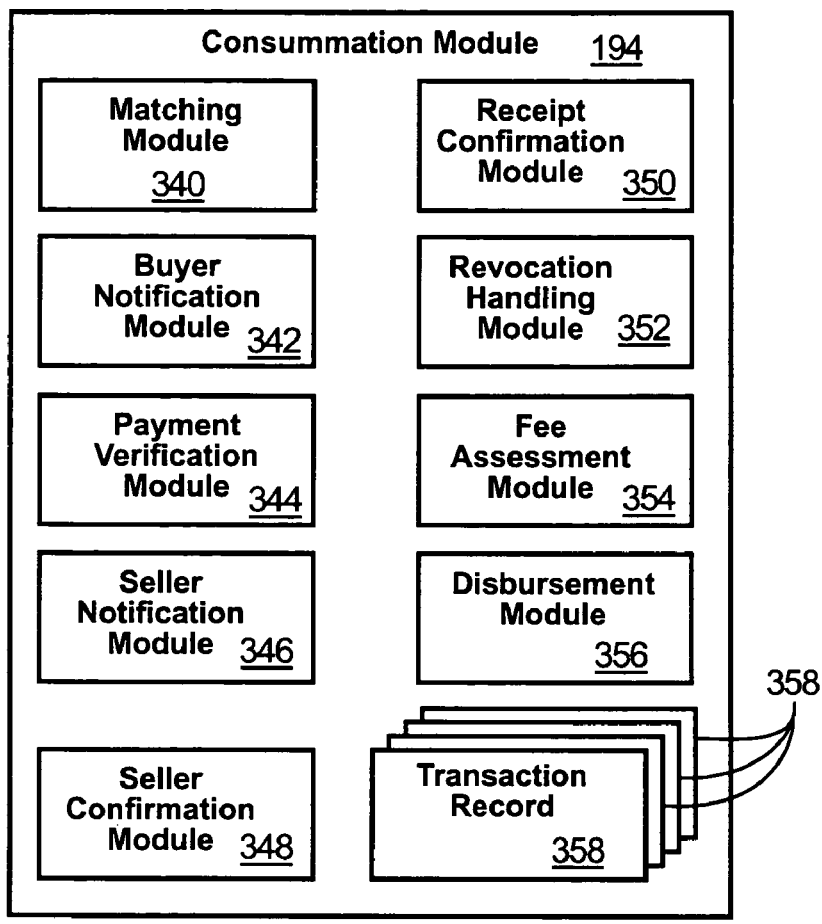
FIG. 18 is one embodiment of a consummation module, in accordance with the invention.

Referring to FIG. 18, a consummation module 294 may handle processing necessary to complete a transaction between a buyer at a buyer workstation 82 and a seller at a seller workstation 80. The consummation module 294 may include a matching module 340. The matching module 340 may search through purchase request records 132 and product records 134 and identify purchase request records 132 that have met criteria specified in a product record 134. For example, the matching module 340 may match a purchase request record 132 with a product record 134 based on the pricing data 184 of the purchase request 130 and the pricing data 220 of the product record 134.

The matching module 340 may match records 130,134 with one another only where the pricing data 189, 220 is identical, or may match records 130, 134 when the pricing data 189, 220 are within a certain tolerance of one another. In some embodiments, where the pricing data is matched within a certain tolerance, the difference in price may be assessed against one party to a transaction. For example, if the pricing data 184 is less than the pricing data 220 and yet within a specified tolerance, the seller may be required to sell at the lower price. In some embodiments, the host may simply absorb the price difference, charging the buyer the price specified in the pricing data 184 and disbursing to the seller the price specified in the pricing data 220, subject to the host's standard rules for fees and account disbursements.

In some instances the quantity 186 of a purchase request record 132 and the quantity data 218 of a product record 134 may not match. For example, a seller may want to sell more than a buyer wants to buy, or the buyer may want to buy more than a seller has. Accordingly, a single purchase request record 132 or product record 134 may be matched with multiple product records 134 or purchase request records 132, respectively.

In some instances it may occur that a seller's selling price is lower, rather than identical to the buyer's offering price. In such instances, the product record 134 of the seller and the purchase request record 132 of the buyer will be matched regardless of how large the difference in price.

The matching module 340 may take into account factors besides the pricing data 184, 220 in deciding which records 132, 134 to match with one another. For example, the matching module 340 may take into account the cost of shipping. Thus, a purchase request record 132 may be matched with a product record 134 whose price and shipping costs match the pricing data 184 of the purchase request record 132. In some embodiments of the system 92, all buyers will be charged identical shipping costs to allow ready cost comparison and to streamline transactions. Nevertheless, the matching module 340 may still take into account shipping costs when matching records 132, 134 to improve the efficiency of the market and avoid unnecessary shipping costs.

In some embodiments, the matching module 340 may take into account shipping costs only when deciding between product records 134 with substantially identical pricing data 220. Thus, the product record 134 whose pricing data 220 matches the pricing data 184 and which will have the lowest shipping costs will be matched with a purchase request record 132.

In instances where multiple product records 134 have substantially identical pricing data 220, the matching module 340 may use a number of other methods to identify a single product record 134 to match with a purchase request record 132. In some embodiments, the matching module 340 may examine the priority data 230 of the product records 134. Priority data 230 may be such that product records 134 may be ranked thereby.

For example, priority data may include a time stamp that may easily be examined to see which product record 134 has priority. Priority data 230 may represent when a product record 134 was created, modified, or may simply be assigned based on a calculation or by an arbitrary decision by a host associated with the transaction system 92.

In some embodiments, priority data 230 may reflect which purchase request record 134 has had the lowest price for the longest time. For example, if a first seller has only recently reduced the price of a product, he or she may be passed over in favor of a second seller who has offered the product for the lower price since before the first seller reduced his or her price. This may favor those who routinely sell at a lower prices over those who simply adjust downward like a bid.

Other criteria may also be used to choose among identically priced product records 134. For example, a product record 134 may be chosen at random. A hierarchy of criteria may also be used. For example, the product records 134 having the lowest shipping costs may be culled from other identically priced product records 134. Among these product records 134, the first in priority may be identified. If product records 134 have identical priority, then one may be chosen at random, or some other criterion may be used. Of course, various different orderings of criteria within the hierarchy may be used.

It will be noted that the matching module 240 may follow a like procedure as described hereinabove when dealing with multiple purchase request records 132 that match a single product record 134. These may include examining the priority data 198 of the purchase request records.

A consummation module 294 may include a buyer notification module 342. The buyer notification module 342 may notify a buyer that the matching module has matched a purchase request record 132 created by the buyer with a product record 134. The notification may be sent via email to the buyer workstation 82, or by any other suitable or requested mechanism of communication. For example, the email may be sent to an email service provider who will then forward the message to the buyer. Likewise a facsimile may go out It will also be noted that the buyer workstation 82 associated with a user need not be identical at every stage of the transaction. For example, a user may interact with the transaction system 92 using various different workstations 82. "Workstation 82" refers to any and all workstations accessed by an individual buyer to communicate or otherwise interact with the transaction system 92. This same principle applies with respect to the seller workstation 80. The term "seller workstation 80" should be interpreted to refer to any and all workstations accessed by an individual seller to communicate or otherwise interact with the transaction system 92.

Notification sent to a buyer workstation 82 may notify the buyer that payment is due to pay the purchase price of the product identified in the matched product record 134. The notification module 342 may also notify the buyer of a deadline for submitting the purchase price to the host associated with the transaction module 92. The notification module 342 may also notify a buyer of a deadline for a buyer to send notification to the transaction system 92 that the buyer does not intend to purchase the product.

A consummation module 294 may include a payment verification module 344. The payment verification module 344 may receive an input from the host, or the host's agent, associated with the transaction system 92 indicating that payment has been received from the buyer associated with a matched purchase request record 132. Payment may include the purchase price of a product as well as any fees assessed against a buyer, as calculated by the cost calculation module 292.

In some embodiments, a buyer may pay the seller directly. Accordingly, the payment verification module 344 may receive an input from a seller workstation 80 indicating that payment has been received by the seller. In such embodiments, the payment verification module 344 may also forward to the buyer computer 82, prior to payment, sufficient information to enable the buyer to transfer funds to the seller. In some embodiments, the payment verification module 344 may examine the user record 130 or the matched product record 134 to determine what information to send the matched buyer. For example, transmitted information may include what payment method to use, what account is to receive the funds, a list of potential payment methods ordered according to seller preference, or other like information.

For example, a buyer may pose some risk and may be charged the cost of insuring a transaction. In other instances, a buyer may voluntarily purchase insurance. Fees assessed may include a transaction fee that is either fixed or a function of the purchase price. For example, a transaction fee charged by a host may be a log(X)/X function where X is the purchase price.

In some embodiments, the payment verification module 344 may detect the transfer of funds or transfer the funds without human intervention. For example, a purchase request record 132, or the user record 130 of the buyer who created the purchase request record 132, may store a credit card number that may be used to automatically transfer funds. In some embodiments, a user may have an account accessible directly by the transaction system 92, in which case the payment verification module 344 may simply debit the account.

In some embodiments, the host may also host the account. In some embodiments, the purchase request record 132, or the user record 130 of the buyer who created the purchase request record 132, may include information expressing the buyer's wishes or requirements in terms of payment source and whether the funds automatically transfer, either for the particular purchase request record 132 or in general. Accordingly, the payment verification module 344 may access the sources of funds according to information provided by the buyer, including trying alternative methods of payments in the order specified by the buyer until a successful transfer of funds is made.

Where a buyer fails to provide fluids to a host within a specified period after receiving notification (e.g. 1 day, 3 days, 1 week, or other suitable period) the payment verification module 344 may stop the transaction from proceeding further and invoke the revocation handling module 352 discussed further below. In some embodiments, where a buyer fails to provide fluids, the payment verification module may terminate the transaction, and make the matched product record 134 with another purchase request record 132. In some embodiments, the buyer who fails to provide funds may be subject to sanctions. In some embodiments, the matched purchase request record 132 of the user who fails to provide funds when matched may be deleted such that it will not be subject to matching by the matching module 340. In other embodiments, the priority data 198 of the record 132 may be changed to place the record 132 later in priority to other records 132, for example, its priority may be set equal to a purchase request record 132 created at the time the matched purchase request record 132 was matched, or when the time for providing funds has expired.

A consummation module 394 may include a seller notification module 346. The seller notification module 346 may transmit notification to a seller workstation 82 that a product record created, or caused to be created, by the seller has been matched with a product record 134 and that payment has been received from the buyer associated with the matched product record 132. The notification module 346 may also notify a seller of a deadline to ship the product identified in the product record 134.

The notification module 346 may also indicate a deadline for the seller to transmit to the transaction system 92, or to the host associated with the transaction system 92, confirmation of the seller's intent to ship the product. A seller may also be notified of a deadline to transmit to the transaction system 92, or the host, confirmation that the seller has shipped the product. Confirmation of shipment may simply be an affirmation made by the seller or may be a code or other data provided by a courier that provides proof of shipment.

A consummation module 294 may include a seller confirmation module 348. The seller confirmation module 294 may receive confirmation from a seller that the seller intends to ship a product. The seller confirmation module 294 may, upon notification that a seller is not going to ship a product, or upon expiration of a waiting period in which no notification has been received, stop the transaction from proceeding any further towards consummation. The seller confirmation module 294 may then invoke the revocation handling module 352 discussed below.

The seller confirmation module 348 may receive confirmation from a seller by interaction of the seller with a web page associated with the seller confirmation module, by email, or the like. The seller confirmation module 348 may automatically receive and interpret messages sent by a seller to the seller confirmation module 348, or may simply receive an input from the host or an agent of the host, indicating that confirmation has, or has not, been received by the host.

A consummation module 294 may include a receipt confirmation module 350. The receipt confirmation module 350 may receive notification from a buyer workstation 82 that the buyer has received a product associated with a matched product record 134. The receipt confirmation module 350 may also receive a buyer's input regarding the condition of a product upon arrival. In some embodiments, the receipt confirmation module 350 may transmit to a buyer workstation 82 a message soliciting input regarding whether the product was received and the condition of that product. The message transmitted by the receipt confirmation module 350 to a buyer workstation 82 may be in the form of a questionnaire with standardized questions answerable either with a yes or no, selection from a list of possible responses, by filling a blank with a short response, or the like.

A consummation module 294 may include a revocation handling module 353. The revocation module 353 may handle transactions in which the seller fails to ship a product offered for sale with a product record 134 that has been matched with a purchase request record 132. The revocation handling module 353 may also handle situations where a buyer fails to pay for a product. The revocation handling module 353 is discussed in greater detail below.

A consummation module 294 may include a fee assessment module 354. The fee assessment may deduct fees from payments received from a buyer. A fee may include funds provided to a host in exchange for hosting the system 92. The fee charged to a buyer may also include insurance costs based on the risk that the buyer poses, as calculated by the cost calculation module 292. The fee to a buyer may simply be added to the purchase price a buyer is required to pay in a transaction.

Likewise, the fee to a seller may include insurance costs based on the risk that the seller poses. In some embodiments fees may only be assessed against a seller in order to make a transaction simpler for the buyer. In others, both sellers and buyers may be charged a fee for a transaction. In some embodiments, the fee assessment module may not charge fees to new users for a period of time or for a fixed number of transactions to serve as an inducement to transact business using the transaction system 92.

A consummation module 294 may include a disbursement module 356. The disbursement module 356 may either automatically transfer funds to a seller, or direct the host associated with a transaction system 92 to transfer funds to a seller, as soon as the buyer has acknowledged receipt of the product sold. In some embodiments, a disbursement module 356 may also refrain from disbursing funds until the buyer has acknowledged the good condition of the product received.

In some cases, the disbursement module 396 may be programmed to refrain from disbursing funds until the expiration of a time period or acknowledgment of receipt and good condition have been received from a buyer workstation 82. In this manner, a buyer who fails to timely acknowledge receipt may waive the buyer's right to claims against the seller in the case that the buyer does not receive the product in good condition.

In some embodiments, the disbursement module 396 may refrain from disbursing funds until the host has provided an input to the transaction system 92 indicating, or by some automatic process it is determined, that funds for the purchase price have been properly transferred to the host. For example, in credit card transactions, a buyer may submit a credit card number and the provider of the credit card may be notified of the buyer's intentions. However, the credit card provider may not immediately provide the funds to the host. Accordingly, the time when a host receives money and the time the payment verification module 344 acknowledges payment by a buyer may not be the same.

In instances where a seller has purchased insurance in case a buyer alleges not to have received a product or to have received a defective product, the disbursement module 356 may release, or direct release of, funds to a seller immediately upon the host's receipt of funds from a buyer. If the buyer then alleges to have received a defective product or none at all, the insurance will then be used to refund the purchase price to the buyer. Collection processes may then seek to recover such payments from the party failing to perform.

In some embodiments, the disbursement module 356 may examine the risk data 162 of the user record 130 associated with a seller. If the risk data 162 indicates that the seller poses very little risk of fraud, the disbursement module 356 may notify the host that the funds advanced by a buyer should be transferred to the seller, or automatically transferred to the seller, regardless of whether the buyer has acknowledged receipt.

In some embodiments, the disbursement module may release funds to the matched seller at an alternative time. For example, immediately upon receipt of the funds without regard to receipt of goods by the buyer, upon receipt of funds from a credit card company, or other criterion. It will also be noted that in embodiments where the buyer pays the seller directly, the operation of the disbursement module 356 may be reduced or eliminated.

Figure 19:
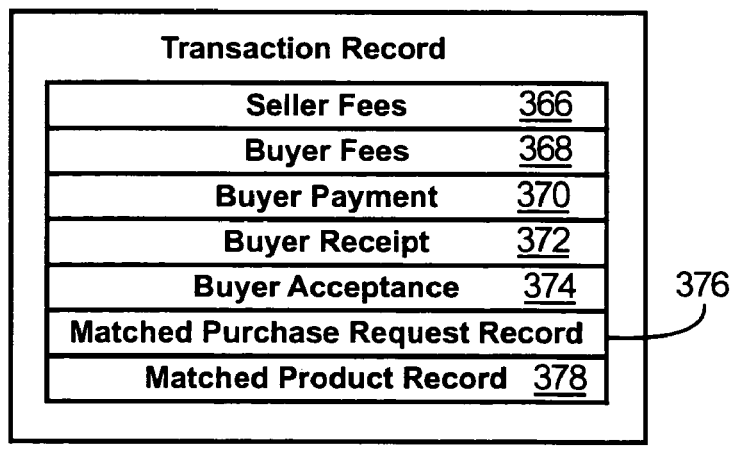
FIG. 19 is one embodiment of a transaction record, in accordance with the invention.

Referring to FIG. 19, while still referring to FIG. 18, a transaction record 358 may store data relating to the status of a transaction during consummation. Accordingly, the transaction record may record: seller fees 366 indicating fees owed by the seller, buyer fees 368 indicating fees owed by the buyer, buyer payment 370 indicating the amount of funds transferred from the buyer to the host, buyer acceptance 374 indicating receipt of an acceptance by the buyer and any feedback as to the condition of a product, a matched purchase request record identifier 378 indicating the identity of the purchase request 132 involved in the transaction, and a matched product record identifier 378 indicating the identity of the product record 134 involved in a transaction.

Figure 20:
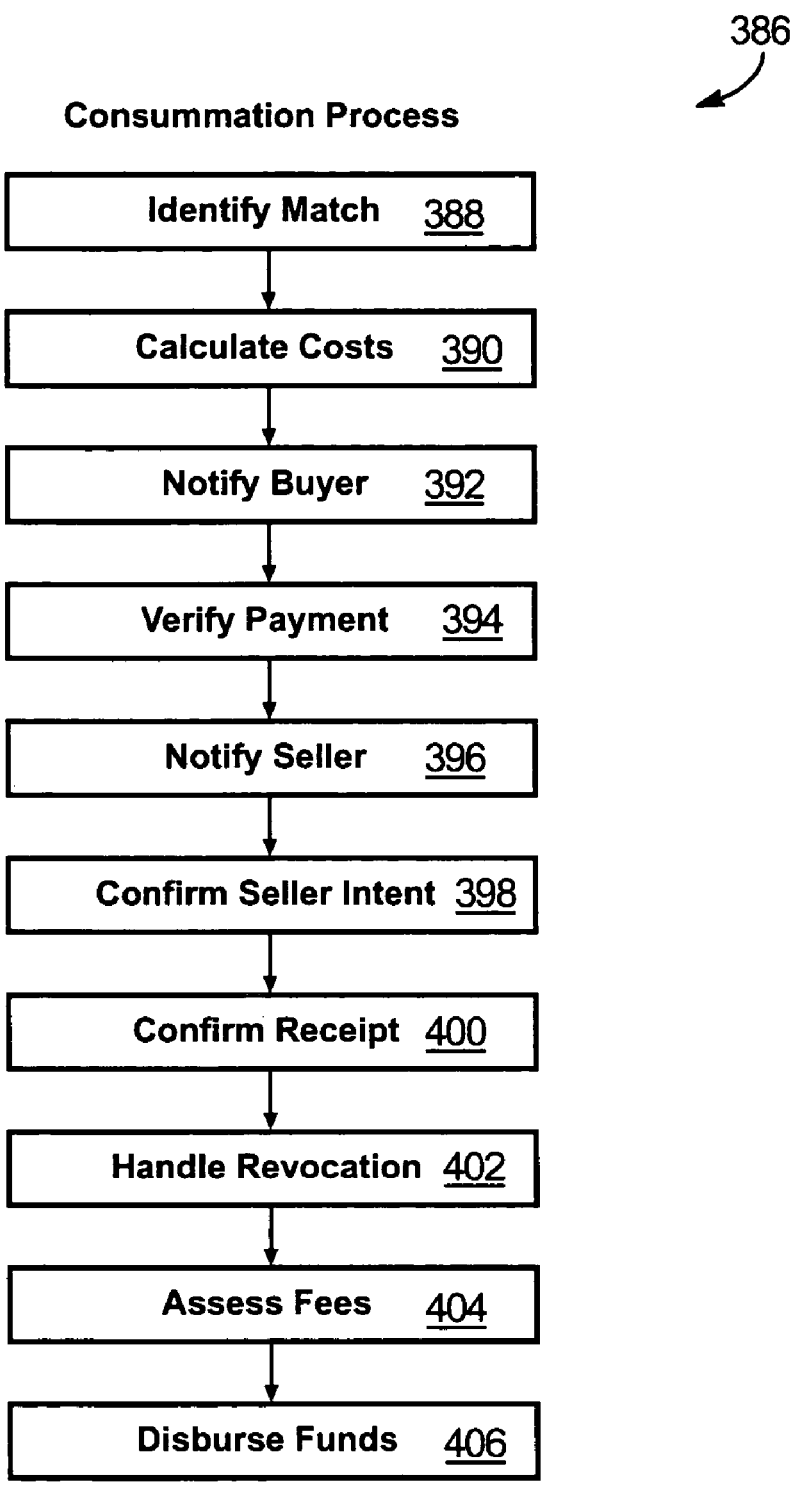
FIG. 20 is one embodiment of a process flow diagram of a consummation process, in accordance with the invention.

Referring to FIG. 20, the consummation module 294 may execute the consummation process 386. The consummation process 386 may include identifying a match 388 as described in conjunction with the matching module 340. The process 386 may include calculating costs 390, as described in conjunction with the cost calculation module 292. The process 386 may include notifying 392 a buyer that a match has occurred as described in conjunction with the buyer notification module 342. Payment may be verified 394 as described in conjunction with the payment verification module 344.

A seller may be notified 396 as described in conjunction with the seller notification module 346. The consummation process 386 may include confirming 398 seller intent to ship a product as described in conjunction with the seller confirmation module 348. The consummation process 386 may include confirming 400 buyer receipt of a product as described in conjunction with the receipt confirmation module 350.

The consummation process 386 may include handling 402 revocation as described in conjunction with the revocation handling module 352. The consummation process 386 may include assessing fees 404 as described in conjunction with the fee assessment module 354. The consummation process 386 may include disbursing 406 funds as described in conjunction with the disbursement module 356.

Figure 21:
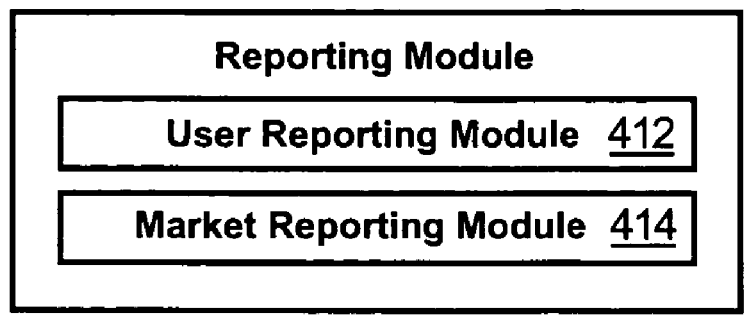
FIG. 21 is a schematic block diagram of one embodiment of a reporting module, in accordance with the invention.

Referring to FIG. 21, the transaction module 104 may include a reporting module 296. The reporting module 296 may include a user reporting module 412. The user reporting module 412 may record details of a transaction relating to the behavior of the parties to the transaction. For example, if a transaction is successful and the buyer provides the purchase price and acknowledges receipt of the product in good condition, the user reporting module 412 may update the risk data 162 of the user record 130 associated with the buyer to reflect that the buyer has fulfilled his or her obligations in the past. In subsequent transactions, the cost calculation module 292 may then calculate a cost of insuring transactions involving the buyer that is less than in the previous transaction. In another example, if the seller ships a product promptly and the buyer receives the product in the expected condition, the reporting module 296 may alter the risk data 162 of the user record 130 associated with the seller.

The user reporting module 412 may also report negative actions of the parties. For example if a buyer denies receipt of a product or claims the product received was defective, the user reporting module 412 may note these actions in the risk data 162 of the user record 130 corresponding to that user. Denying receipt or claiming a defective product may be ignored by the cost calculating module 292, provided a particular user has not done so more than a specific number of times, or more than a specific number of times in a particular time period, or for products over a certain price value. However, the risk data 162 of a buyer who has repeatedly claimed not to have received a product or to have received a defective product, or failed to acknowledge receipt in good order of a high priced product, may be interpreted to indicate that the user poses a risk of fraud.

The user reporting module 412 may also record detail about one user's actions in the user record of another user. For example, the user reporting module 412 may record in the user record 130 of a buyer that the buyer alleged not to have received a product. The user reporting module 412 may also record that the seller in the transaction involving the buyer had a history of failing to ship, or of shipping defective products. On the other hand, the user reporting module 412 may record that the seller had no history of failing to ship or of shipping defective products.

In later transactions, the cost calculation module 292 may give the buyer's failure to acknowledge receipt more weight if the seller in the transaction had a history of successful transactions. On the other hand, the cost calculation module 292 may give little weight to the buyer's failure to acknowledge receipt in a past transaction if the seller in the past transaction had a history of failing to ship or of shipping defective products.

The reporting module 296 may include a market reporting module 414. The market reporting module 414 may report the details of a transaction that may be used by subsequent buyers and sellers to decide at what price to offer to sell or offer to buy a product. The reporting module 296 may record details of the transaction in a market record 136 stored in the transaction database 106. The market reporting module 414 may record such things as: the price a product sold for, the length of time the product was on the market, any modifications to the asking price that a seller made before the product sold, any modification to the buyer's offering price before the buyer's offer was met, and the like.

In conjunction with the market reporting module 414, a host may offer a service allowing a user to deal in futures, options, and other derivatives of consumer products, in much the same manner as derivatives of securities and commodities. It will be noted that the transaction system 92 may also be used to deal in securities in the same manner as described for consumer products.

Figure 22:
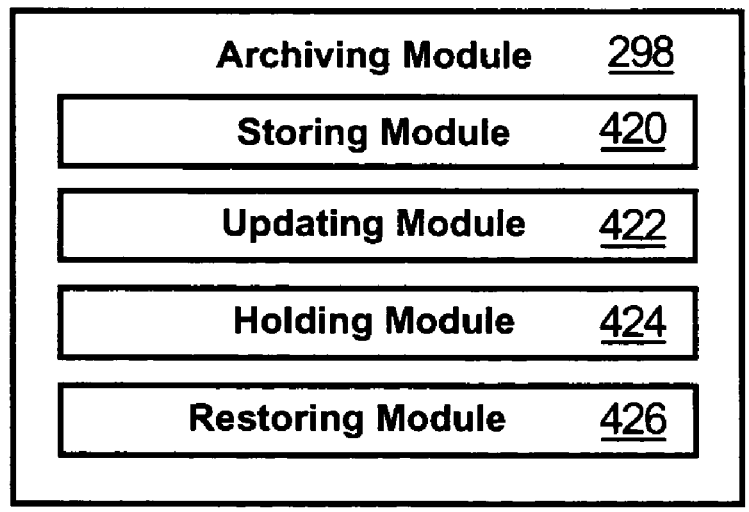
FIG. 22 is a schematic block diagram of one embodiment of an archiving module, in accordance with the invention.

Referring to FIG. 22, the transaction module 104 may include an archiving module 298. The archiving module 298 may be responsible for storing purchase request records 132 and product records 134 before transactions occur, holding records 132, 134 during transactions, deleting records 132, 134 after a transaction is completed, and restoring records 132, 134 if a transaction fails.

Accordingly, the archiving module 298 may include a storing module 420. The storing module 420 may create a purchase request record 132 or product record 134 upon request from a user at a buyer workstation 82 or a seller workstation 80. The storing module 420 may store the record 132, 134 in the transaction database 106.

The archiving module 298 may include an updating module 422. The updating module 422 may update the transaction database 106 once the matching module 340 has identified a purchase request record 132 and a product record 134 that match. The updating module 422 may remove the matched records 132, 134 from the transaction database 106, so the matching module 340 will not subsequently match one of the matched record 132,134 with another record 134, 132. In some embodiments, the updating module 422 may simply mark or otherwise indicate that a record 132, 134 is no longer available to be matched while leaving the record 132, 134 stored in the transaction database 106.

The archiving module 298 may include a holding module 424 and a restoring module 426. The holding module 424 may store purchase request records 132 and product records 134 that have been matched by the matching module 340 during the consummation process 386. The restoring module 426 may restore a purchase request record 132 or product record 134 that has been matched by the matching module 340 to the transaction database 106 in instances where a transaction is not properly consummated so that the record 132, 134 is again available to be matched by the matching module 340.

Figure 23:
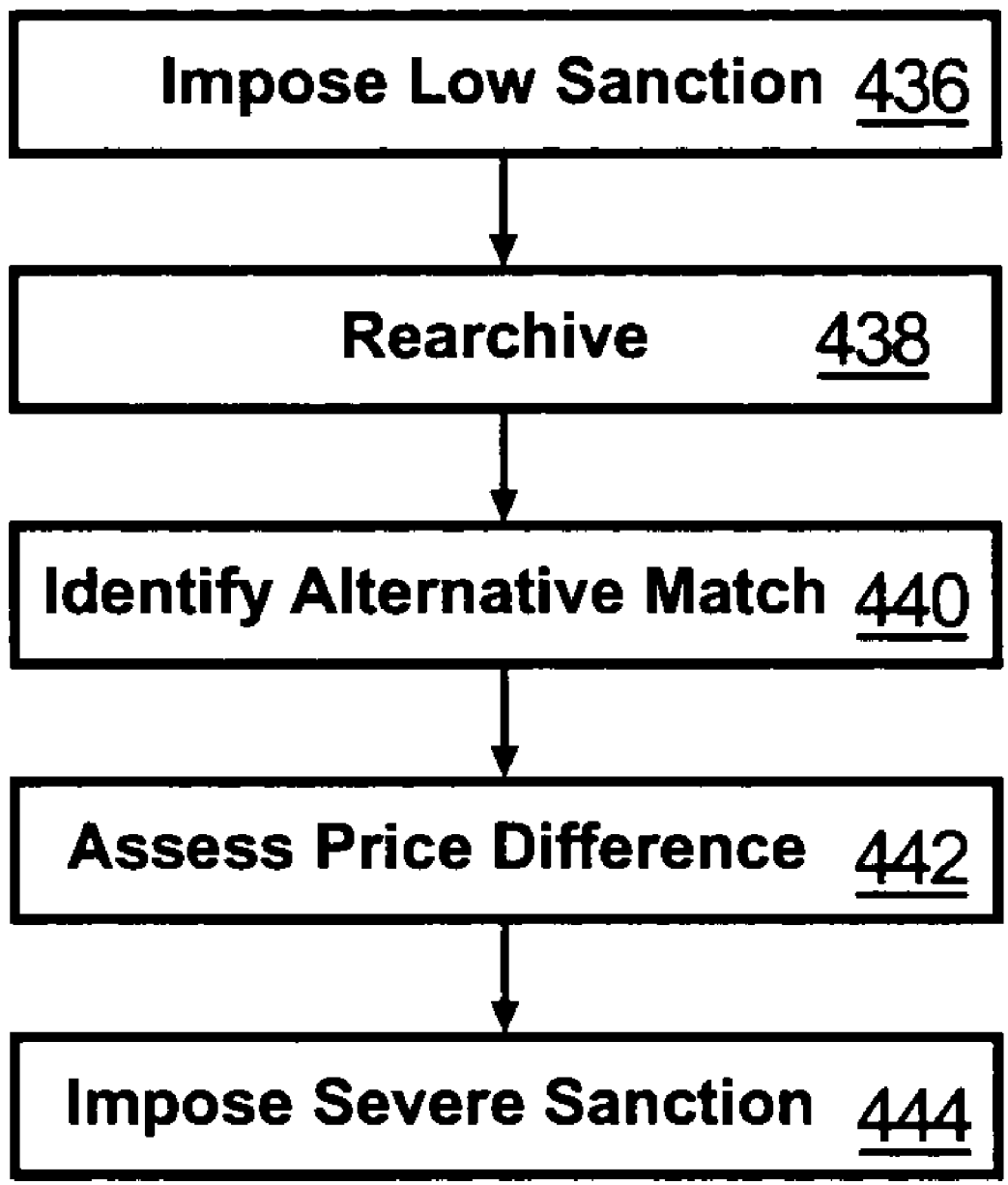
FIG. 23 is a process flow diagram of one embodiment of a revocation handling process, in accordance with the invention.

Referring to FIG. 23, the archiving module 298 and revocation handling module 353 may carry out the process 402 of handling revocation by the seller. If either the seller or a buyer in a transaction fails to fulfill an obligation, the revocation handling process 402 may take steps to discourage future revocation and to ameliorate harm that may be caused by revocation. The revocation handling process 402 may include imposing a modest sanction 436, rearchiving 438, assessing 442 a price difference, identifying 440 an alternative match, verifying 444 final revocation, and imposing 446 a severe sanction.

Imposing 436 a low or modest sanction may include indicating in the sanction data 146 of the user record 130 associated with the buyer or seller that the buyer or seller is subject to a low sanction. A low sanction may indicate that a less severe of possible penalties will be imposed on the user in subsequent transactions. For example, penalties may include a small added fee or a shorter period of higher fees or limited access.

The cost calculation module 292 may interpret the sanction data 146 when calculating the fees a user must pay in a subsequent transaction. For example, if the sanction data 146 reflects that a user has been sanctioned, the cost calculation module 292 may impose a higher fee for a subsequent transaction, a number of subsequent transactions, or transactions that occur within some specified time period. The size of the fee charged, the length of time larger fees are charged, or the number of transactions subject to higher fees, may vary depending on the severity of the sanction. A user may even be completely barred if conduct is actually deemed dishonest and not simply due to a lack of alternatives or care. Sanction data 146 may also be interpreted by the login module 118. This may prevent a user from interacting with the transaction system 92, or to limit a user's access to a transaction system 92. This may be for a specified period, with the duration of the limitation or prohibition of access depending on the severity of the sanction.

Rearchiving 438 may include changing the status, storage location, or other attribute of a purchase request record 132 or product record 134 such that the record 132, 134 is available to be matched by the matching module 340. For example, if the seller revokes, then the purchase request record 132 that was matched with the seller's product record 134 will be rearchived 438 such that it will be subsequently matched by the matching module 340 with another product record 134. Rearchiving 438 may be accomplished by the restoring module 426 of the archiving module 298.

Identifying 440 an alternative match may include identifying another record 132,134 to be matched with the record 134, 132 associated with the party to a failed transaction that did not revoke. For example, if the seller revokes, the purchase request record 132 that was matched with the seller's product record 134 will be matched with a different product record 134. In some embodiments, identifying 440 an alternative match may include identifying the record 132, 134 that is the best match even though it does not satisfy criteria normally satisfied when identifying a match.

For example, if the seller revokes, identifying 440 an alternative match may include identifying the product record 134 having the lowest price, or lowest combination of price and shipping costs. This may occur regardless of whether the price, or combination of price and shipping costs, is the same as, or within some tolerance of, the price specified in the buyer's purchase request record 132. Thus, in this example, if a buyer is a matched with a first seller who revokes, the buyer will be matched with a second seller who has the lowest price of all sellers. This occurs regardless of whether the price at which the seller is selling a product is the same or within some tolerance of the price a buyer has offered to buy the product.

Assessing 442 a price difference (e.g. penalty) may include charging a late revoking (breaching) seller the price difference between the price at which the seller offered to sell a product and the price ultimately paid to the seller of a replacement product. Thus, if the product record 134 of seller A is matched with the purchase request record 132 of buyer B, and A subsequently and improperly (e.g. untimely) revokes (actually breaches), the purchase request record 132 of buyer B will matched with the product record 134 of seller C, and any increase in price between costs of buying from seller C and the costs of buying from seller A will be charged to seller A.

Imposing 444 severe sanctions may include indicating the fact in the sanction data 146 of the user record 130. This data is associated with a buyer or seller who fails to perform (breaches) an obligation for which the buyer or seller is subject to a severe (high) sanction. A high sanction may indicate that any fine or increase in fees will be the larger of a range of fines or increased fees. A high sanction may indicate that a user is subject to elevated fees for a longer time or for a greater number of transactions. A high sanction may indicate that a user is to have a longer period of no access or limited access.

A step 444 may be executed wherein a party to a transaction revoked an offer to buy or sell late in a transaction (e.g. breached). Thus, for example, if a seller confirms an intent to sell in step 398 of the consummation process 386 and subsequently fails to ship a product to a buyer, a severe sanction may be imposed 444.

Figure 24:
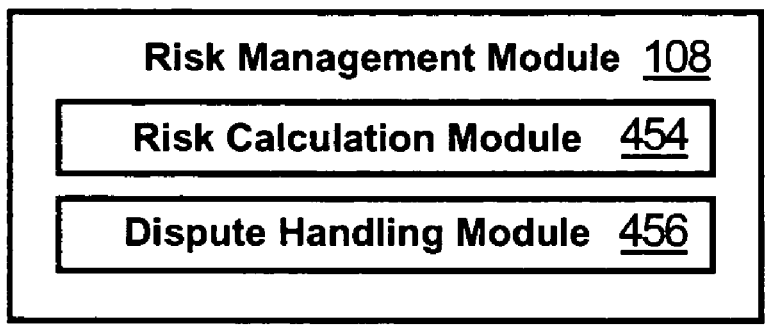
FIG. 24 is a schematic block diagram of one embodiment of a risk management module, in accordance with the invention.

Referring to FIG. 24, a risk management module 108 may include a risk calculation module 454 and a dispute handling (e.g. resoloution) module 456. The risk calculation module 454 may calculate the risk associated with a particular user. The results of the execution of the risk calculation module 454 may be used by the assurance module 334 to calculate a fee for a particular user or to calculate the cost of voluntarily purchased insurance for a particular user.

The risk calculation module 454 may calculate the risk associated with a user by evaluating the risk data 162 of the user record 130 associated with a user. The risk data 162 may include: the number of successful transactions completed by a user, the price of the products involved in past transactions, the number of unsuccessfully completed transactions involving a user, the number of times the user has shipped defective products, or the number of times a user has claimed not to have received a product. These may also be done as a fraction or percentage of the users transactions. Risk data 162 may also include reference to second parties in transactions involving the user. For example, for transactions in which a second party alleges to have received defective products, the risk data 162 may so indicate. The risk data 162 may also indicate that the second party had repeatedly alleged not to have received products. Risk data 162 may also indicate the category of products involved in past transactions completed by the user. For example, a seller who works for a small business that routinely sells expensive cameras through the transaction system 92 may not be judged a high risk for a transaction involving an expensive camera, due to the expertise that the seller has in shipping cameras, while a seller who has never sold cameras before may be judged a high risk for the same transaction, even though the seller may have sold other expensive items in the past. Thus measurable, identifiable parameters may be tracked and considered in such calculations.

The risk calculation module 454 may evaluate the risk data 162 according to any statistical method known in the art of statistics, actuarial science, numerical methods, modeling, or like art. The risk calculation module 454 may analyze the risk data 162 and user history 170 of all, or a broad segment of, user records 130, to determine the correspondence between risk data 162 and the likelihood that a user will fail to perform in a transaction. The risk calculation module 454 may use this correspondence to calculate the risk associated with a particular set of risk data 162.

Figure 25:
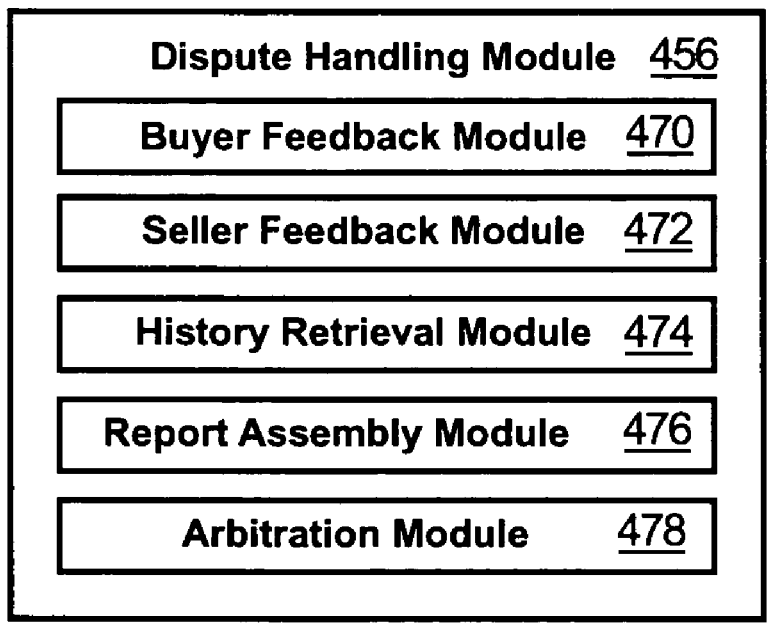
FIG. 25 is a schematic block diagram of one embodiment of a dispute handling module, in accordance with the invention.

Referring to FIG. 25, a dispute handling module 456 may handle disputes that may arise between parties to a transaction. Accordingly, a dispute handling module may include a buyer feedback module 470, a seller feedback module 472, a history retrieval module 474, a report assembly module 476, and an arbitration module 478. It will be noted, that in some embodiments, a buyer or seller may purchase insurance against various problems with a transaction. Accordingly, a buyer who has purchased insurance may be immediately refunded a lost purchase price, or a portion of the purchase price less fees. Similarly, a seller who has purchased insurance may be released funds despite buyer complaints of non-receipt or defectiveness. Accordingly, the functionality of the dispute handling module 456 may not be executed in such instances. The complaint may be left with only other remedies.

A buyer feedback module 470 may receive input from a buyer workstation 82 regarding a buyer's claims of fraud or product defects. The buyer feedback module may also receive input from the host associated with the transaction system 92 or an agent of the host. The buyer feedback module 470 may also solicit input from a buyer. In some embodiments the buyer feedback module 470 may solicit feedback in the form of a questionnaire containing questions with standardized responses, such as yes, no, and common descriptors of condition or a blank for a free form text description.

In some embodiments, the buyer feedback module 470 may customize a solicitation for feedback to the product involved in a transaction (e.g. asking questions about commonly occurring problems). In some embodiments, within a certain period after, or concurrent with, a transaction, the transaction system 92 may send to the buyer workstation 82 an email inviting the buyer to comment on the condition of goods. The buyer feedback module 470 may be programmed to ignore feedback from a buyer workstation 82 received after the expiration of a specified period of time after a transaction is completed or after solicitation of feedback has been sent. Thus, a buyer's claims may be waived if not received promptly.

A seller feedback module 472 may receive feedback from a seller workstation 80. The seller feedback module 472 may transmit a solicitation for feedback to a seller workstation 80. In some embodiments, the seller feedback module 472 may be programmed to solicit feedback from a seller only when triggered. This may occur where the buyer feedback module 470 has received a communication from a buyer workstation 82 indicating that a buyer claims to have received a defective product, or not to have received the product at all. The seller feedback module 472 may be programmed to ignore feedback received from a seller workstation 80 received after the expiration of a specified time period after the solicitation of feedback. Thus, a seller who fails to respond may be deemed to have admitted a buyer's claims that a product is defective, or was not sent.

A history retrieval module 474 may retrieve information that is relevant to evaluate the credibility of buyer and seller assertions. The history retrieval module may retrieve the risk data 162 and user history 170 from the user record 130 of both buyer and seller as well as the transaction record 358 of the disputed transaction.

A report assembly module 476 may assemble a report readily interpreted by a human being. The report assembly module 476 may assemble a report that arranges data from the user histories 170, risk data 162, and the transaction record 358. This may allow for ready comparison between the buyer's and the seller's claims. For example, a table may be provided listing side by side for the buyer and seller the following information: the number of successfully completed transactions, the number of failed transactions, and the number of disputes handled by the dispute handling module 456 and decided contrary to the user. A summary of failed transactions and disputes may be provided. A summary of a failed transaction or dispute may include any one of several options, including the following: the date of the transaction, the product involved, and information relating to the other party to the transaction or dispute such as: the number of successful transactions the other party had completed, the number of failed transactions in which the other party has been involved, and the number of disputes decided contrary to the other party.

In some embodiments, the report assembly module 476 may automatically analyze the user histories 170 and transaction record 358. For example, the report assembly module may be programmed to provide a rating for a user, such as on a scale of one to ten. The report assembly module 476 may simply count the number of failed transactions for which a user is to blame and determine a rating based on a mapping or schedule of ratings to number of failed transactions. This may be normalized such as by calculating a percentage and a total number.

In some embodiments, the report assembly module 476 may assign a weight to each failed transaction for which a user is to blame based on the user history 170 of the other party to a past failed transaction. For example, a past failed transaction taken from the user's transaction record 358 involving another party with a user history 170 indicating an otherwise perfect record of fulfilling obligations may be assigned a greater number, for example, than five. A past failed transaction taken from the user's transaction record 358 involving another party with a history of failing to fulfill obligations may be assigned a different number, for example, less than five.

The weighting number assigned to a failed transaction may be proportional, or otherwise related, to the number of failed transactions with which the other party to the past failed transaction had been involved prior to the past failed transaction, or with which the other party has been involved up to the currently disputed transaction. In some embodiments, the report assembly module 476 may weight a user's failed transactions according to the time when the failed transaction occurred. For example, more recent failed transactions may be given greater weight than earlier (more remote) failed transactions. The weighted past failed transactions may then be added or otherwise combined together to arrive at a final number that may be compared to a mapping or schedule to determine a rating for a user. Any weighting formula found effective may be used.

An arbitration module 478 may receive an input from the host or an agent of the host indicating a decision regarding the dispute. The arbitration module 478 may also present to the host or agent the results of the report assembly module 476. An arbitration module 478 may allow for standardized responses with automatically determined consequences. For example, the arbitration module 478 may present a host or agent with buttons, or like interface elements, that may read "buyer at fault," "seller at fault," "buyer likely fraudulent," "seller likely fraudulent," "buyer grossly fraudulent," "seller grossly fraudulent," "courier at fault," "other cause at fault," or like responses. By clicking on a button, the host or agent may cause the arbitration module 478 to take standardized actions.

For example, if the host or agent clicks "buyer at fault," the user history 170 of the buyer will be changed to indicate that the buyer was found at fault in a dispute. The arbitration module 478 may also modify the risk data 162 of the buyer to reflect that the user poses a risk.

In another example, if the host or agent selects "buyer likely fraudulent" the risk data 162 may be modified such that a buyer may continue interacting with the transaction system 92, only with higher required fees to insure the buyer's transactions. On the other hand, if the host selects "buyer grossly fraudulent," the risk data 162 may be modified to indicate that a user is completely barred from interacting with the transaction system 92. The result may simply be a probability, with a threshold for taking action to impose sanctions. A like procedure may be followed for a seller. Where no party is found to be to blame, the risk data 162 of neither may be changed.

The arbitration module 478 may also direct a host or an agent of the host to transfer funds to a party pursuant to any insurance purchased or to a general policy of the host insuring transactions. The arbitration module 478 may also automatically transfer such funds to a party. For example, if the seller is found at fault, or fraudulent, the arbitration module 478 may automatically refund the purchase price to the buyer, or communicate to a host that the purchase price should be refunded to the buyer. If the buyer is found to be at fault, or fraudulent, the arbitration module 478 may indicate to the host that the purchase price provided by the buyer should be disbursed to the seller. Alternatively, the arbitration module 478 may automatically disburse funds to the seller.

In some embodiments, the host, or the host's agent, may consider other factors in deciding how to arbitrate a dispute. For example, if a buyer claims to have received defective goods, the host, or the host's agent, may insist that the buyer surrender the goods to the host, or the host's agent, who may either inspect them for actual defectiveness or simply retain them to ensure that the buyer is not unfairly benefitted by receiving a refund and retaining possession of the goods.

In some embodiments, the arbitration module 478 may be programmed to receive, and in some embodiments solicit, an input indicating that the buyer has surrendered the allegedly defective product to the host, or the host's agent. The arbitration module 478 may be programmed not to refund the purchase price, or not to direct the host to refund the purchase price, until the host has input that the allegedly defective product has been surrendered.

Figure 26:
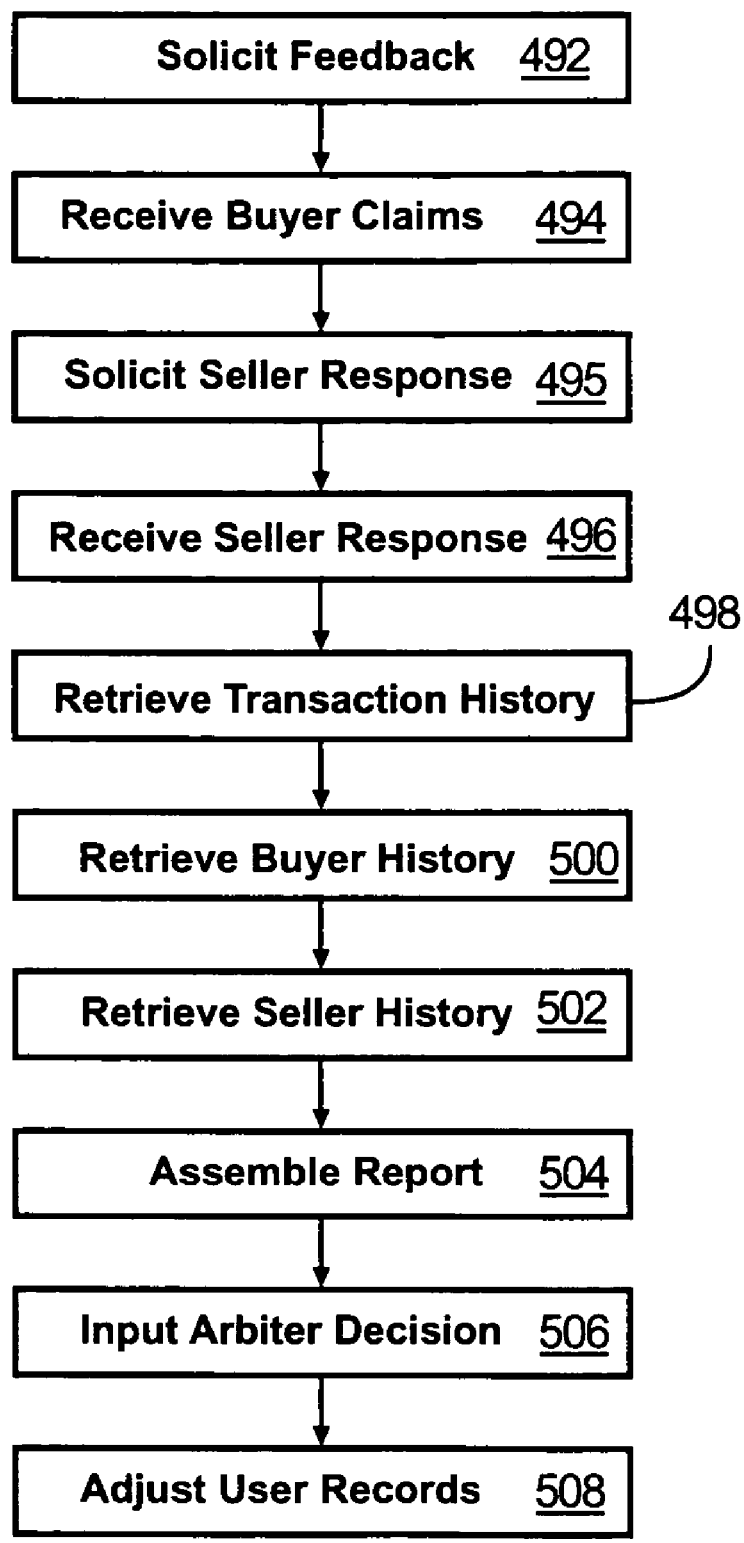
FIG. 26 is a process flow diagram of one embodiment of a dispute handling process, in accordance with the invention.

Referring to FIG. 26, the dispute handling module 456 may carry out the dispute handling process 490. The process 490 may include soliciting 492 feedback. Soliciting 492 may include sending an email to a buyer workstation 82 inviting feedback. Alternatively, soliciting 492 feedback may include a general policy made known by the system 92 to all users of the system 92 that feedback is desired or permitted after each transaction. In still other embodiments, the soliciting step 492 maybe omitted, and complaints sent from a buyer workstation 82 may simply be accepted if sent.

The process 490 may include receiving 494 buyer claims. Receiving buyer feedback 494 may include receiving an email message from a buyer workstation, data obtained from a buyer's interaction with a website, or a message sent by any other mechanism of communication. Buyer feedback may include claims that a buyer has not received a product, has received the wrong product, has received a defective product, or other complaint regarding a transaction. Buyer claims may also include a buyer's suggested remedy for the problem, such as a full or partial refund, or a replacement of the damaged or defective product.

The process 490 may include receiving 496 a seller response. Receiving a seller response may include receiving an email message from a seller workstation 80, data obtained from a seller's interaction with a website, or a message sent by any other communication. A seller's response may be standardized responses to a questionnaire sent to the seller. For example, a seller may simply click a box in a questionnaire to assert such things as: "yes, I shipped the product" or "The product was in good condition upon shipment."

A seller may provide feedback during a step 496 indicating a desire to simply concede to the buyer's complaints and suggested remedy whether for the sake of simplicity, good public relations, or good relations with the host, in which case, the process 490 may end. The seller may also suggest a remedy for the problem, such as shipping a replacement product or issuing a full or partial refund.

The process 490 may include retrieving 498 the history of a disputed transaction. In some embodiments retrieving 498 may simply include retrieving the transaction record 358 corresponding to the disputed transaction. Retrieving 498 may include the execution of any of the functionality attributed to the history retrieval module 474.

The process 490 may include retrieving 500 the user history 170 of the buyer in a disputed transaction. In some embodiments, retrieving 500 the buyer history may include retrieving the user history 170 from the user record 130 of the buyer. The user history 170 may include records past transactions involving the buyer. Retrieving 500 may also include the execution of the functionality attributed to the history retrieval module 474 relating to the retrieval of the buyer's history.

The process 490 may include retrieving 502 the user history 170 of the seller in a disputed transaction. In some embodiments, retrieving 502 the seller history may include retrieving the user history 170 from the user record 130 of the seller. The user history 170 may include records past transactions involving the seller. Retrieving 500 may also include the execution of functionality attributed to the history retrieval module 474 relating to the retrieval of the seller's history.

The process 490 may include assembling 504 a report. Assembling 504 a report may include execution of all or part of the functionality attributed to the report assembly module 476. The process 490 may likewise include inputting 506 an arbiter decision. Inputting 506 an arbiter decision may include executing all or part of the functionality attributed to the arbitration module 478.

The process 490 may include adjusting 508 user records. Adjusting 508 user records may include adjusting one or more of the sanction data 146, risk data 162, and user history 170 of the user records 130 of the buyer and seller involved in a dispute to reflect the buyer or seller's blameworthiness (or probability thereof) for a failed transaction. Adjusting 508 may be automatic in response to an input from the host, or the host's agent. For example, adjusting 508 may include selecting from a number of standard arbiter decisions that cause the sanction data 146, risk data 162, and user history 170 to be modified in a standard manner. Alternatively, the sanction data 146, risk data 162, and user history 170 may be modified or augmented directly by the host, or the host's agent. For example, an arbiter may input comments or the like.

Figure 27:
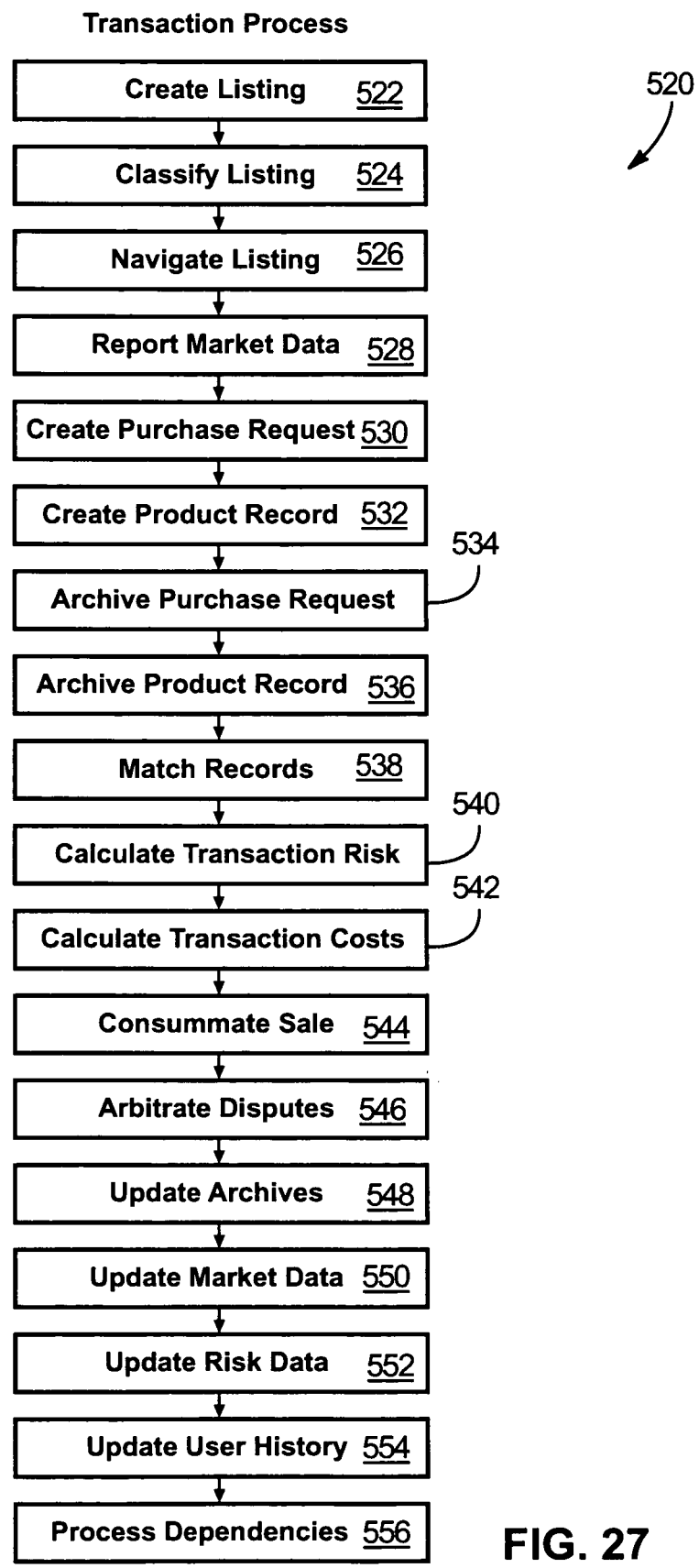
FIG. 27 is a process flow diagram of one embodiment of a transaction process, in accordance with the invention.

Referring to FIG. 27, the transaction system 92 may carry out a transaction process 520. The transaction process 520 may include creating 522 a listing. A listing may be characterized as a class or category under which products offered for sale are grouped. Creating 522 a listing may include creating a listing record 262 stored on the server 86. A listing may be created by a user operating the server 86. Alternatively, a listing may be created by a user at a workstation 80, 82 sending a request or instruction causing the transaction system 92 to create 522 a listing record 262.

A process 520 may include classifying 524 listings. Classifying 524 listings may include organizing listing records 262 in a manner that the listing records 262 may be readily searched. In some embodiments, classifying 524 may include sorting the listing records 262 into classes 266 and subclasses 268. Classifying listing records 262 may include the execution of all or part of the functionality associated with the classification module 254. Classifying 254 may be done by a user operating the server 86 or by users working remotely from a workstation 80, 82.

The process 520 may include navigating 528 listings. Navigation 528 may be done remotely from a workstation 80, 82. Navigating 528 the listing records 262 may include searching or exploring the listing records 262 in order to find a listing. For example, a seller at a seller workstation 80 may navigate 528 the listings 262 to find under which category to post a product record 134 and in order to find out market data concerning a product.

Likewise, a buyer at a buyer workstation 80 may navigate the listings 262 in order to view products offered for sale and to post a purchase request record 132 under a listing 262. Navigation 258 may include the use of any method, now known or later developed, for searching or exploring data Navigating 528 may include the execution of all or part of the functions attributed to the navigation module 290.

The process 520 may include reporting 528 market data. Reporting 528 market data may include reporting details concerning the sale of products represented by a listing record 262. Details reported may include the date and sales price;of past sales, the price of the highest priced purchase request record 132, and the price of the lowest priced product record 134. Reporting 528 may include reporting similar information for related listing records 262, such as listing records 262 within the same low-level subclass 268. Reporting 528 may include executing all or part of the functionality attributed to the market reporting module 312.

The process 520 may include creating 530 purchase requests. Creating 530 purchase requests may include creating purchase request records 132 stored on the server 86. A purchase request 132 may be created 530 by transmitting a request or instruction from a buyer workstation 82 to the server 86 instructing the transaction system 92 to create a purchase request 132 and store the purchase request 132 in the transaction database 106. Creating 530 a purchase request may include executing all or part of the functionality attributed to the posting module 256.

The process 520 may include creating 532 product records 134. A product record 134 may be created 532 by transmitting a request or instruction from a seller workstation 80 to the server 86 instructing the transaction system 92 to create a product record 134. Creating 532 a product record 134 may include executing all or part of the functionality attributed to the posting module 256.

The process 520 may include archiving 534 purchase requests and archiving 536 product records. Archiving 534 may include storing a purchase request record 132 in the transaction database 106 and associating or linking the purchase request record 132 to a listing 262. Archiving 536 may include storing a product record 134 in the transaction database 106 and associating or linking the product record 134 to a listing 262. Archiving 534, 536 may include executing all or part of the functionality associated with the archiving module 298.

The process 520 may include matching 538 a purchase request record 132 with a product record 134 based on selected criteria. One criterion may be price. For example, the purchase request record 132 with the highest offering price may be matched with the product 134 with the lowest asking price. This may require that the purchase request record 132 have an offering price equal to or higher than the asking price of the product record 134. The criteria may include transaction costs such as shipping or funds transfer fees.

Thus a purchase request record 132 may be matched with a product record 134 where the asking price of the product record 134 added to the transaction costs of actually consummating a sale between the buyer associated with the purchase request record 134 and the seller associated with the product record 134 is less than that for other product records 134 and equal to or less than the offering price of the purchase request record 132. Matching 538 may include executing all or part of the functionality associated with the matching module 340.

A party's past activities may be used to predict the party's actions in the future. The process 520 may include calculating 540 a transaction risk associated with a transaction between the buyer associated with the purchase request record 132 identified in the matching step 438 (hereinafter the "matched buyer" and "matched purchase request record 132") and the seller associated with the product record 134 identified in the matching step 438 (hereinafter the "matched seller" and the "matched product record 134"). Calculating 540 may include calculating the risk that the matched seller will commit fraud or otherwise fail to perform in a transaction.

Calculating 540 may also include calculating the risk that the matched buyer will commit fraud or otherwise fail to perform in a transaction. Calculating 540 transaction risk may include evaluating the risk data 162 and user history 170 stored in the user records 130 associated with the matched seller and the matched buyer. Calculating 540 transaction risk may include executing all or part of the functionality attributed to the risk calculation module 454.

The process 520 may include calculating 542 transaction costs. Calculating 542 transaction costs may include calculating the cost of shipping the product, the fee charged to the matched buyer including a fee based on the risk. A fee for the risk the matched buyer poses may likewise be included, and a fee charged by the host for providing access to the transaction system 92. Calculating 542 transaction costs may include calculating the fee charged to a matched seller including a fee based on the risk the matched seller poses and a fee charged by a host for providing access to the transaction system 92. Calculating 542 transaction costs may include executing all or part of functionality attributed to the cost calculation module 292.

Consummating 544 a sale may include executing the consummation process 386 on the matched purchase request 132 and matched product record 134. Consummating 544 a sale may include executing all or part of the functionality attributed to the consummation module 294 on the matched purchase request 132 and matched product record 134.

The process 520 may include arbitrating 546 disputes that may arise between the matched seller and the matched buyer if one or both of them fail to perform obligations. Breaches may involve failure in shipping a product, shipping a product in good condition, acknowledging receipt, or acknowledging receipt in good condition. Arbitrating 546 disputes may include executing all or part of the functionality attributed to the arbitration module 478 on the matched seller and the matched buyer.

Updating 550 archives may include expunging from the transaction database 106 the matched purchase request record 132 and matched product record 134. Alternatively, updating 550 may simply include marking, changing the status of, or changing the storage location of, the matched purchase request record 132 and matched product record 134. Updating 550 archives may include executing all or part of the functionality attributed to the updating module 422 on the matched purchase request record 132 and matched product record 134.

Updating 550 market data may include recording the details of the transaction between the matched seller and the matched buyer for display in subsequent transactions. Details may include, for example, the date a transaction was consummated, the price a product sold for, how long the product was offered for sale, and the like. Updating 550 market data may include executing all or part of the functionality of the market reporting module 414 with respect to the transaction between the matched seller and the matched buyer.

Updating 552 risk data 162 may include updating the risk data 162 of the user records 130 of the matched buyer and matched seller to reflect the transaction between the matched buyer and the matched seller. For example, the risk data 162 may be updated to indicate that the transaction proceeded properly and that both the matched buyer and matched seller apparently pose little risk of breach or fraud.

Where one or both parties fail to perform obligations, risk data 162 may be updated 552 to indicate that either the matched buyer, the matched seller, or both pose a risk of fraud. Updating 552 risk data may include executing all or part of the functionality attributed to the user reporting module 412 on the user records 130 of the matched seller and matched buyer.

Updating 554 user histories may include updating the user histories 170 of the user records 130 associated with the matched seller and matched buyer to reflect the transaction between them. The user histories 170 may store various details of the transaction. In some embodiments, concerns for privacy may mandate that user histories store only general details of a transaction such as the price of the article and whether the transaction proceeded properly with both parties performing their obligations. Concerns for privacy may mandate that the user histories 170 not store the identity of the product purchased.

Processing dependencies 556 may include altering or deleting purchase request records 132 and product records 134 that have dependencies or interrelationships relating to the matched purchase request record 132 or matched product record 134 as discussed hereinabove. For example, a purchase request record 132 may be created along with other purchase request records 132 with the instruction that when any one of the purchase request records 132 is matched, the others are to be deleted. Accordingly, processing dependencies 556 may include deleting the related purchase request records 132. Other potential actions that may be taken in response to the matching of a purchase request record 132 or product record 134 having a dependency or relationship, as discussed hereinabove, may be taken as part of the dependency processing step 556.

Figure 28:
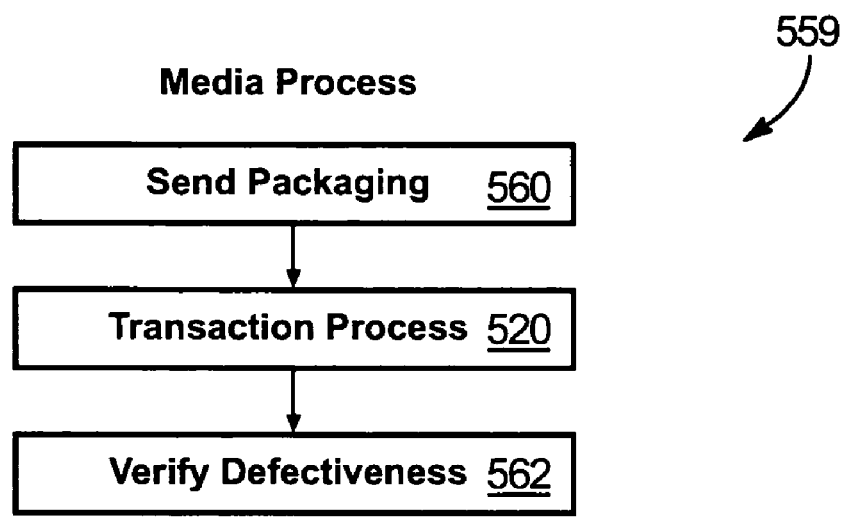
FIG. 28 is a schematic block diagram of one embodiment of a media process, in accordance with the invention.

Referring to FIG. 28, the transaction process 520 may be modified to resell items that have a limited period of use by any one user. For example, a buyer may buy a video cassette or DVD and only watch it once or twice and have no further need for it. Accordingly, the transaction process 520 may be modified to facilitate the rapid resale of such products.

The transaction process 520 may be modified to include the step of distributing 560 packaging. For example, to facilitate the rapid resale of DVD's, users may be sent a quantity of envelopes suitable for mailing DVD's, or other media. Sellers of DVD's would then use the envelopes to send DVD's, or other media, to subsequent buyers.

The process of arbitrating disputes 546 may also be coupled with the step of verifying 562 receipt of a defective product by the host. Verifying 562 may include requiring an input from the host indicating that a product has been sent to the host before refunding money or taking other action as discussed in conjunction with the arbitrating process 546. Requiring sending 562 of a product for inspection may facilitate the prevention of fraud by verifying a buyer's allegation of defectiveness.

The transaction process 520 may be further modified to charge lower fees to those dealing in media using the transaction application. It will be further noted, that a special case may exist in transactions involving media. Those involved in disputed transactions, as described in conjunction with the dispute handling module 456, may receive only the price paid for a product as a refund in a failed transaction, rather than the cost of replacing a product.

It will be noted that the process of mailing packaging to buyers and sellers and providing a commonly accessed system 92 facilitating the sale of media between the buyers and sellers may be performed using other online-sales applications or methods.

Figure 29:
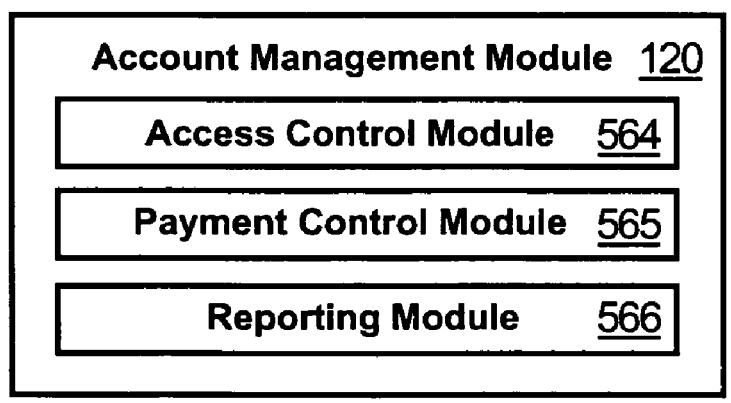
FIG. 29 is a schematic block diagram of one embodiment of an account management module, in accordance with the invention.

Referring to FIG. 29, an account management module 120 may limit and manage the actions of an individual user interacting with the transaction system 92. For example, the account management module 120 may include an access control module 564. An access control module 564 may limit the listings 262 to which a user may have access whether to post purchase requests 132 or to post product records 134 under the listing 262. The access control module 564 may interpret the access data 152 of the user record 130 of a particular user to determine which classes 266, subclasses 268, and listings 262 a user may access.

Access may be limited by some third party who exerts authority over the user, such as a parent or an employer. For example, a parent may cause the access data 152 of a child to indicate to the access control module 564 that the child is not to access listings 262 inappropriate for children. Likewise an employer may cause the access data 152 of an employee to indicate that the employee may only access listings 262 for products that the employee is authorized by the employer to buy or sell. The access data 152 need not be restricted to controlling only the user's access to listings. It may also determine, for example, the user's choice of shipping addresses or the number of transactions permitted in some time period. It may also place a limitation on access to funding.

The payment control module 565 may control where notification of obligations to pay should be sent. The payment control module may control where notification of the receipt of funds is to be transmitted and where funds owed to a user by the host are to be sent.

For example, the user who buys or sells a product may not be identical to the user who is to pay or who is to receive the proceeds of a sale. Likewise, a first employee may be authorized by an employer to buy or sell products for the employer, however, a second employee may be designated by the employer to make or receive payments. The payment control module 565 may interpret the billing data 156 and payment data 160 of a user record 130 to determine who is to be paid and receive notice of payment, and who is to pay and receive notice of obligations to pay.

The reporting module 566 may report to a third party the actions of a user interacting with the system 92. For example, the reporting module 566 may transmit to the employer of a user a report of what the user has bought or sold using the transaction system 92.

Figure 30:
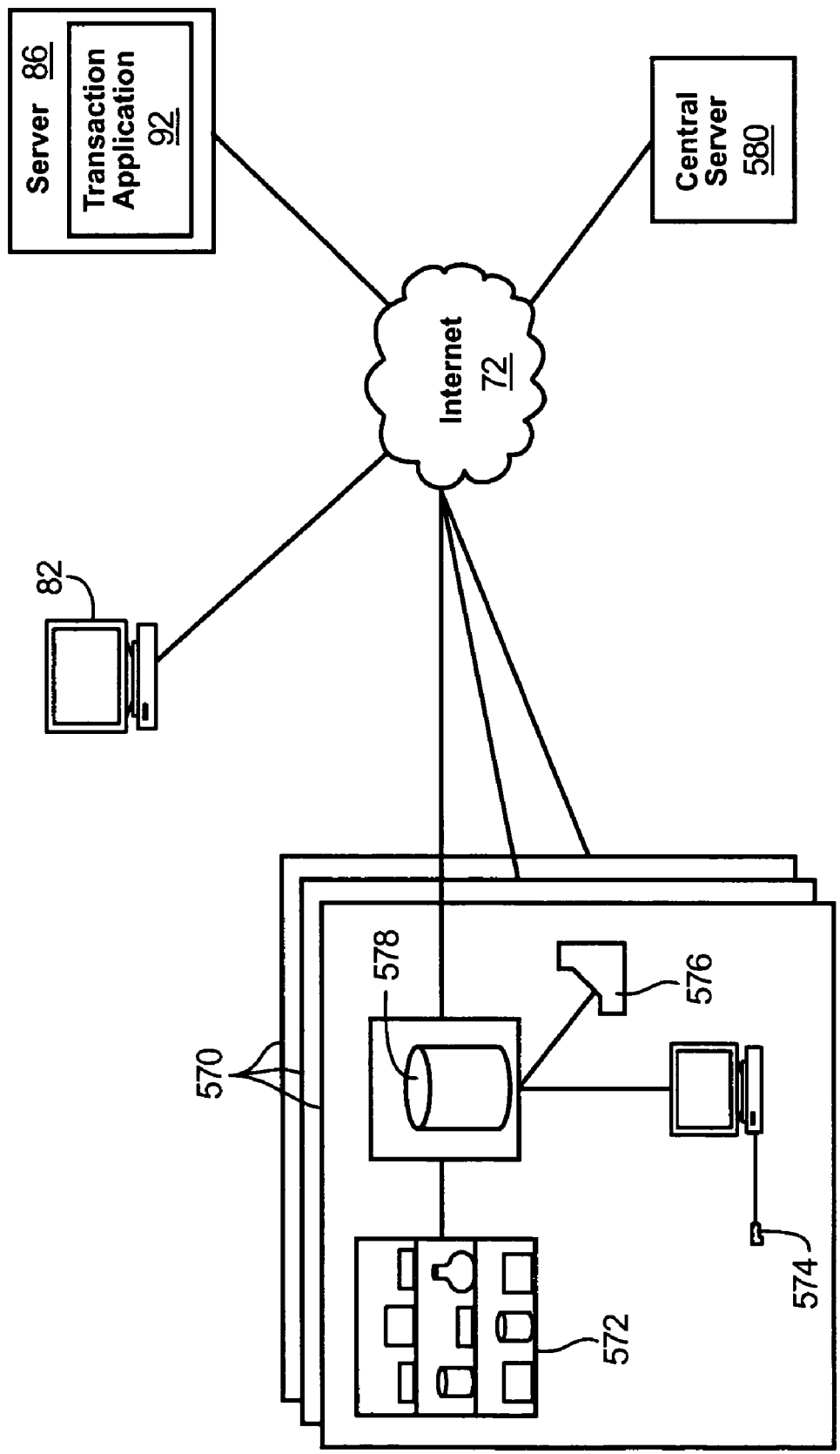
FIG. 30 is schematic block diagram of one embodiment of an architecture for implementing an integration module, in accordance with the invention.

Referring to FIG. 30, in some embodiments, a seller workstation 80 may be operated by the owner of a store who sells products using the transaction system 92 as well as in face-to-face transactions at a store 570. The inventory 572 of the store will typically be traced by mechanism of a UPC reader 574, or like input device 574. The product code is "read" upon receipt by the seller and by a point-of-sale cash register 576, or like device, upon sale.

An inventory database 578 may record what items are available for sale in the inventory 572, with additions to the inventory 572 read in by the UPC reader 574 and noted in the database 578. Reductions in inventory from sale will be perceived by the cash register 576, likewise noted. In some embodiments a remote central server 580 may host the inventory database. For example, a chain of stores may have a central server 580 to track inventories of multiple stores 570 in the chain.

Figure 31:
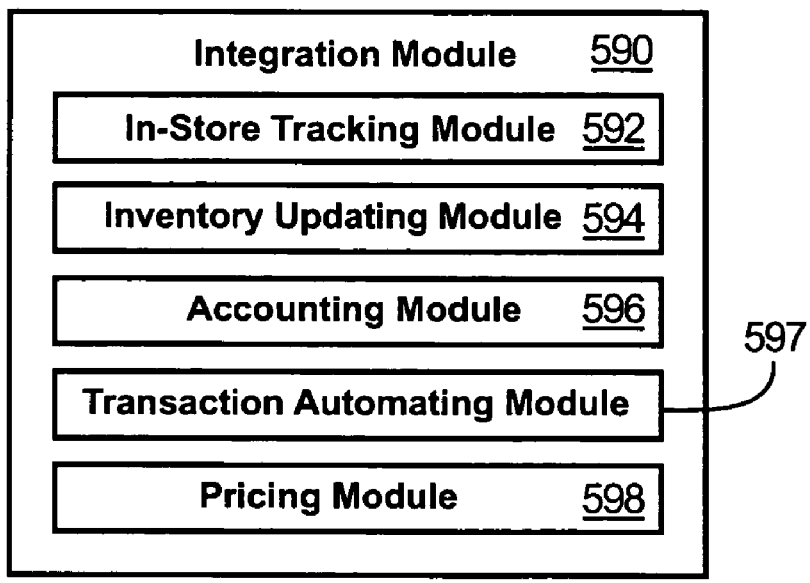
FIG. 31 is a schematic block diagram of one embodiment of an integration module, in accordance with the invention.

Referring to FIG. 31, in some embodiments, the memory 14 of a seller workstation 80 or central server 580 may store an integration module 588. An integration module 588 may integrate the sales within the store 570 with sales using the transaction system 92. Thus, the inventory database 578 and transaction database 106 are maintained in a consistent or synchronized state. Accordingly, the integration module 588 may include an in-store tracking module 592, an inventory updating module 594, an accounting module 596, a transaction automating module 597, and a pricing module 598.

Figure 32:
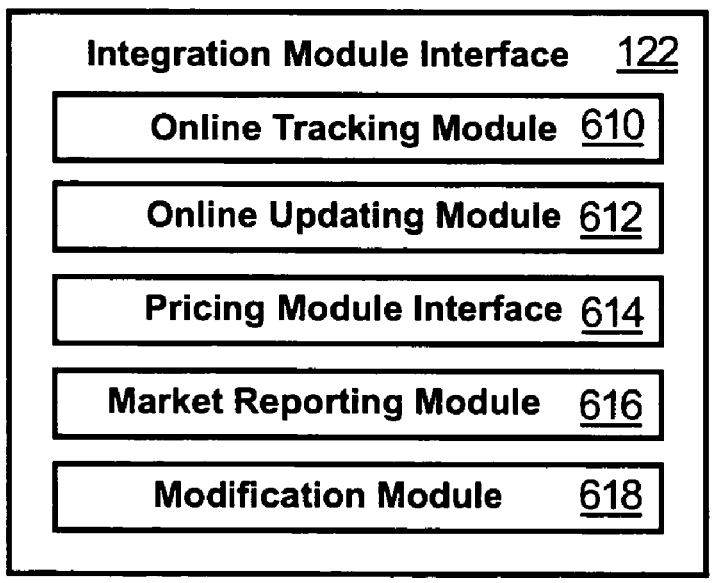
FIG. 32 is a schematic block diagram of one embodiment of an integration module interface, in accordance with the invention.

Referring to FIG. 32, the transaction system 92 may include an integration module interface 122 to communicate with the integration module 588. The integration module interface 122 may include an online tracking module 610, an online updating module 612, a pricing module interface 614, a market reporting module 616, and a modification module 618.

The inventory updating module 594 and online updating module 612 may maintain consistency between the transaction database 106 and the inventory database 578. That is, when a product is sold online, the transaction database 106 will be updated, independent of the operation of the integration module 588 and integration module interface 122. However, the inventory database 578 should be promptly notified that a product has been sold. The online tracking module 610 may detect all online sale of a product listed in the inventory database 578.

The online updating module 612 may then transmit a notification to the inventory updating module 594, informing the inventory updating module 594 of the identity, quantity, or other information, concerning the product sold. The inventory updating module 594 may use the information sent by the online updating module 612 to update the inventory database 578. The inventory database 578 may be updated by making changes indicating that a product is no longer available for sale. For example, at this point an agent of the store may remove the product purchased online from the store's inventory and make the product ready for shipment to the online.

In like manner, the inventory updating module 594 may transmit a notification to the online updating module 612 when a product is sold in the store 570. For example, the cash register 576 may be programmed to update the inventory database 578 when an in-store sale occurs. The in-store tracking module 592 may detect when a sale of a product offered for sale using the transaction system 92 is sold in the store 570. The inventory updating module 594 may transmit notice of the sale to the online updating module 612 indicating the identity, quantity, or like information, concerning a product sold in the store 570.

Upon receipt of notification, the online updating module 612 may take steps necessary to remove the product record 134 corresponding to the product sold in the store. The in-store tracking module 592 may also detect additions to the inventory 572. For example, a UPC reader 574 may scan new inventory 578. The UPC reader 574 may transmit information to the inventory database 578 such that the inventory database 578 reflects that an item has been added to the inventory.

The updating module 594 may then transmit information such as may be included in a product record 134, such as the identity and quantity of the added item or items, to the online updating module 612. Upon receipt of notification, the online updating module 612 may create a product record 134 corresponding to the product that has been added to the inventory 572.

The accounting module 596 may manage the tracking of funds involving online transactions. The accounting module 596 may also manage tracking of funds involving in-store transactions. In some embodiments, the accounting module may automatically make an accounting entry in an accounting program indicating the amount of proceeds from an online sale. In some embodiments of the integration module 590 may be used to purchase products using the transaction system 92 as well as sell items. Accordingly, the accounting module may also track the funds transmitted to the host of the transaction system 92 to pay for purchases. In some embodiments the accounting module 596 may be configured to transfer and receive funds automatically.

The pricing module 598 may manage the setting of the price at which products are offered for sale using the transaction system 92. The pricing module 598 may manage the setting of the price at which products are offered for sale in the store 570. In some embodiments, the pricing module 598 may be programmed, automatically or by a user, to set the price at which a product is offered for sale. The transaction system 92 may use the same price, or automatically determined price, at which the product is offered for sale in the store 570.

The pricing module interface 614 of the integration module interface 609 may receive instructions transmitted from the pricing module 598 regarding the modification of the price of a product record 134. The pricing module interface 614 may execute instructions of the pricing module 598 to modify the price of the product record 134.

In some embodiments, the pricing module 598 may be programmed to adjust the price of the product records 134 corresponding to products offered for sale both in the store 570 and using the transaction system 92. For example, the pricing module 598 may automatically adjust the price of a product to be equal to the offering price of the highest priced purchase request order 132.

The market tracking module 624 may be configured to automatically, or upon user instruction, set the price of a product record 134 equal to the price at which a product identical, or similar, to that associated with the product record 134 has most recently sold. The market reporting module 616 of the integration module interface 609 may transmit market information to the pricing module 598. The market reporting module may transmit the price of the highest priced purchase request record 134, the price for which a particular product most recently sold, or the like.

In some embodiments, the actions of the pricing module 598 may vary depending on the product. For example, the owner may wish or need to quickly sell some products and be able to wait to sell others. Accordingly, the owner may instruct the pricing module 598 that one product will be priced based on the current market price for the product and that another product will have a fixed price.

In some embodiments the pricing module 598 may be instructed to automatically begin to price a product based on the market price after a specified period of a time. For example, a product may be offered for sale for a fixed price for a set (or calculated) period of time, after which the pricing module 598, having detected the expiration of the time, will price the product based on the then current market price.

In some embodiments, the pricing module 598 may set the price at which a product is offered for sale according to both how long the product has been offered for sale and the market price. For example, a product may be offered for sale initially with a price set equal to the price at which an identical or similar product has recently sold plus an additional amount. The additional amount may be a fixed amount or some percentage of the wholesale price of the product, a percentage of the price at which the product is offered for sale in the store 570, or other formula based on the cost or price of the product.

In another example, a product may be offered for sale initially with a price set equal to the offering price of the highest purchase request order 132 corresponding to the product. If the pricing module is programmed to add an additional amount to some set amount, it may automatically decrease that additional amount with the passage of time or according to some formula. For example, initially the additional amount may be a five percent increase. After a week the additional amount may be a four percent increase. A percentage of some other market variable or price maybe used instead.

A purchasing module 600 may automate the process of purchasing from the transaction system 92. In some embodiments, a store owner may buy the inventory 572 using the transaction system 92. For example, a store owner may buy large lots of a product and sell the product in smaller quantities in the store 570 or using the system 92.

The purchasing module 600 may automate this process. For example, a purchasing module may monitor changes to the inventory database 578. The purchasing module 600 may be programmed to purchase more of a product automatically using the system 92 when the inventory database 578 indicates that the amount of the product in the inventory 572 has fallen below a limiting value or in accordance with a predictive equation.

In some embodiments, the purchasing module 600 may instruct the transaction system 92 to create a purchase request record 132 identifying the product and the quantity needed. The purchasing module 600 may set the offering price of the purchase request record 132 equal to the product record 134 having the lowest price or the price at which an identical or similar product has most recently sold.

The price of a purchase request record 132 created by the purchasing module 600 may be managed by the pricing module 598. The pricing module 598 may adjust the offering price of the purchase request record 132 to ensure that it will be promptly met. For example, the market tracking module 624 may raise the offering price of the purchase request record 132 as time passes to increase the likelihood that the purchase request record 132 will be matched.

In some embodiments, the market tracking module 624 may initially set the offering price equal to some percentage of either the product record 134 having the lowest price or the price at which an identical or similar product has most recently sold. As time passes the market tracking module 624 may recalculate the price as additional product records 134 are posted or as additional sales are consummated. The offering price of the purchase request record may thus continue to be tied to the current state of the market.

As time passes, the market tracking module 624 may also increase the multiplier percentage. This is the amount by which the price of the product record 134 having the lowest price (or the price at which an identical or similar product has most recently sold) is multiplied when calculating a new offering price.

The transaction handling module 602 may automatically perform actions required by a seller in a transaction using the transaction system 92. The transaction handling module 602 may also perform actions required by a buyer in transactions using the transaction system 92. Accordingly, all or some of the actions executed by the seller or buyer as described hereinabove may be performed by the transaction handling module 602.

Thus, for example, in the transaction process 520, users may be required to navigate a listing 526, create 530 a purchase request, create 532 a product record, or the like. In another example, during the consummation process 386, a seller may be requested to confirm seller intent. A buyer must also forward funds to the host and acknowledge receipt.

The transaction handling module 602 may automatically transmit confirmation of intent to sell a product to the transaction system 92. The transaction handling module 602 may analyze the inventory database 578 to determine whether the store 570 has a product before sending confirmation. Thus, if the inventory 572 happens to not have the product associated with a matched product record 134, the transaction handling module 602 may be programmed not to confirm an intent to sell. A transaction handling module 602 may also be configured to automatically interface with the transaction system 92 to create a purchase request record 132 and product record 134.

A transaction handling module 602 may be configured to transfer or receive funds automatically. For example, the transaction handling module 602 may interface with the transaction system 92 to forward credit card payment information to the transaction system 92.

Figure 33:
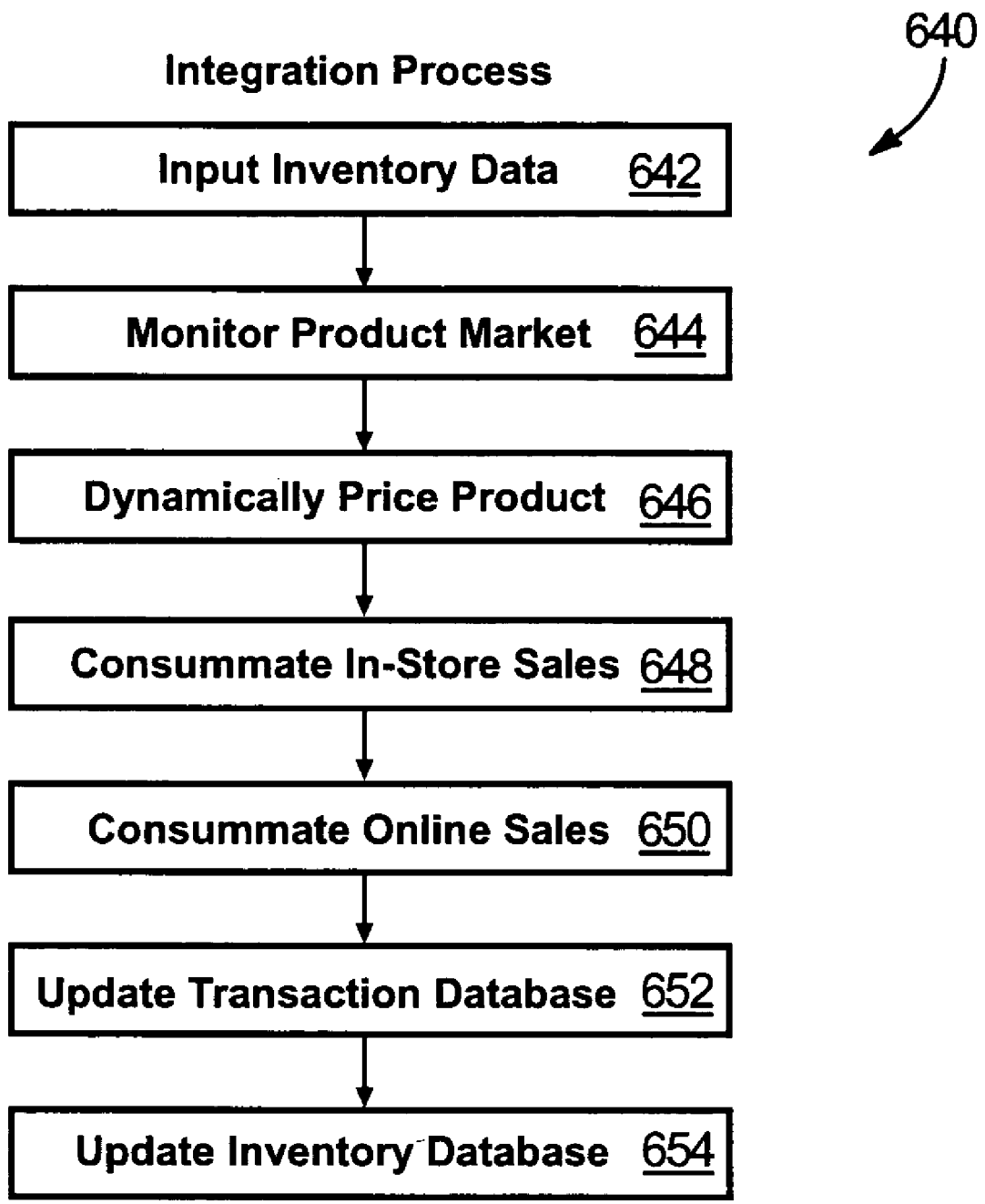
FIG. 33 is a process flow diagram of one embodiment of an integration process, in accordance with the invention.

Referring to FIG. 33, the integration module 588 may execute the integration process 640. The integration process 640 may include inputting 642 inventory data, monitoring 644 the market for a product, dynamically pricing 646 a product, consummating 648 an in-store sale, consummating 650 an online sale, updating 652 a transaction database 106, and updating 654 an inventory database 578.

Inputting 642 inventory data may include recording the contents of an inventory 572. For example, a UPC reader may scan an article as it is shelved to indicate that a product has been received into the inventory. Inputting 642 inventory data may also include noting when a product is sold. For example, a UPC reader of a cash register 576 may scan a product during the process of sale or shipment. Inputting 642 inventory data may include executing all or part of the functionality attributed to the inventory updating module 594.

Monitoring 644 a product market may include evaluating recent transactions and recent postings of purchase request records 132 and product records 134 to determine the market price of a product. Monitoring 644 a product market may include executing all or part of the functionality attributed to the pricing module 598 with respect to market tracking processing.

Dynamically pricing 646 products may include assigning a price to a purchase request record 132 or product record 134 based on the state of the market and the length of time a product has been offered for sale. Dynamically pricing 646 a product may include executing all or part of the functionality of the pricing module 598.

Consummating 648 an in-store sale may include selling a product forming part of the inventory to a purchaser in a store 570. Consummating 648 an in-store sale may include automatically detecting, as with a cash register 576, the identity of products sold. Consummating 650 online sales may include executing the transaction process 520 to effect the online sale of a product forming part of the inventory 570.

Updating 652 a transaction database 106 may include removing a product record 134 from the transaction database 106 after the product associated with the product record 134 has been sold in an in-store transaction. Updating 652 a transaction database 106 may include executing all or part of the functionality attributed to the inventory updating module 594 relating to the updating of the transaction database 106.

Updating 654 an inventory database 578 may include changing the contents of the inventory database 578 to reflect the sale of a product using the transaction system 92. For example, records in the inventory database 578 relating to a product sold using the transaction system 92 will be updated to indicate that the product is no longer part of the inventory 572. Updating 654 an inventory database 578 may include executing all or part of the functionality attributed to the inventory updating module 594 relating to the updating of the inventory database 578.

Figure 34:
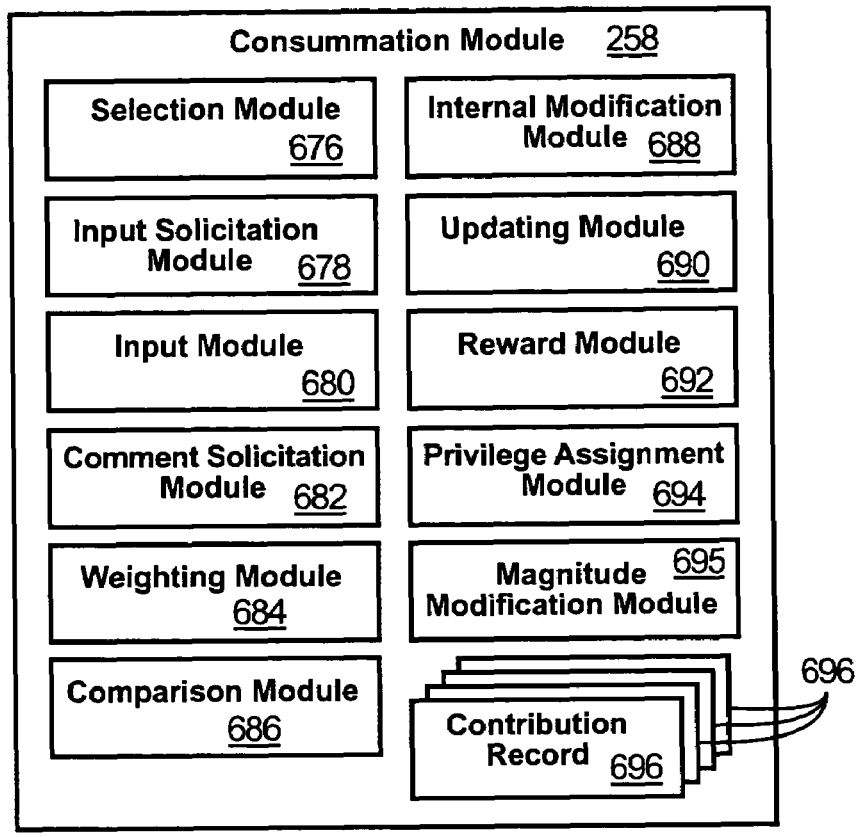
FIG. 34 is a schematic block diagram of one embodiment of a contribution module, in accordance with the invention.
Figure 35:
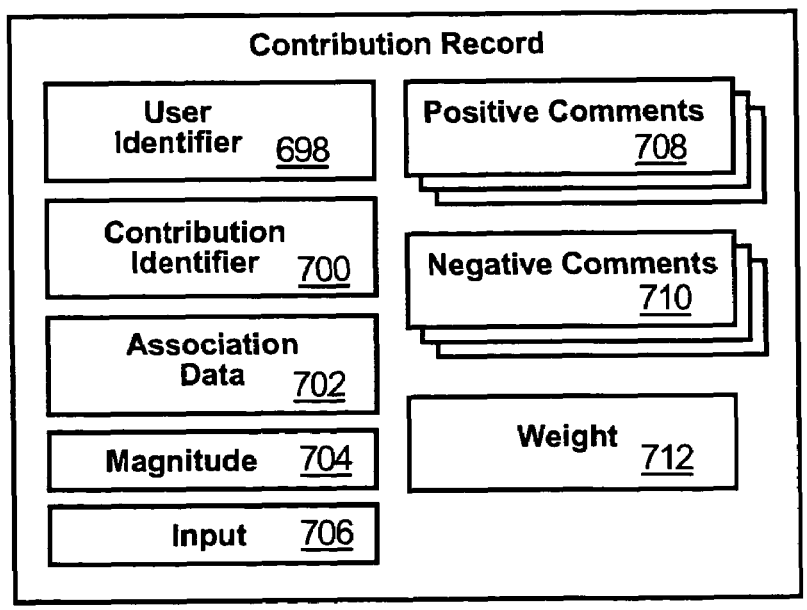
FIG. 35 is a schematic block diagram of one embodiment of a contribution record, in accordance with the invention.
Figure 36:
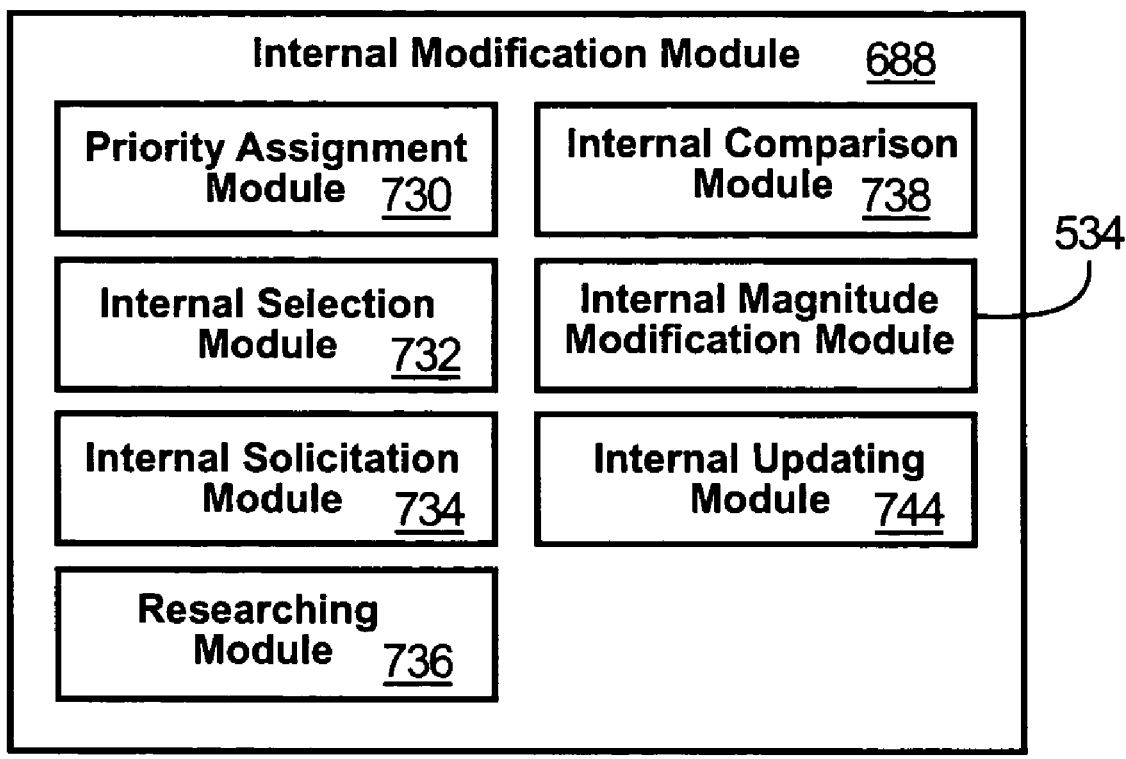
FIG. 36 is a schematic block diagram of one embodiment of an internal modification module, in accordance with the invention.

Referring to FIG. 34, a contribution module 258 may enable users to contribute to and correct information contained in a listing database 252. It will also be noted that the contribution module 258 may be used to manage user contributions and corrections to any database, not just one including information concerning products offered for sale.

A contribution module 258 may enable users to contribute to the accuracy of information by supplying information, commenting on information, or both. Information and comments maybe weighted based on who provides the information. Thus, contributions of a user providing reliable information in the past are given more weight. Information may be assigned a magnitude indicating how difficult the information is to change. That is, how many comments, how great a consensus, or some other measure of reliability of a contribution must exist before information may be changed.

The contribution module 258 may include a selection module 676, an input solicitation module 678, an input module 680, a comment solicitation module 682, a weighting module 684, a comparison module 686, an internal modification module 688, an updating module 690, a reward module 692, a privilege assignment module 694, a magnitude modification module 695, and contribution records 696.

A selection module 676 may select which information within the listing database 252 for which contribution or correction will be solicited. Information that may be contributed to or corrected may include information stored in the listing records 262 and the class 266 or sub class 268 to which a listing record 262 belongs. For example, a user may add a class 266 or sub class 268 to the set of classes and subclasses, or change the class 266 or subclass 268 to which a listing record 262 belongs. A selection module 676 may also select information related to a user's activities involving the transaction system 92. For example, the selection module 676 may select information relating to a listing record 262 under which a user has posted, is about to post, or is in the process of posting, a purchase request record 132, or product record 134.

A selection module 676 may select what information needs contribution or collection based on various criteria such as: the absence of the information in a listing record 262, a small number of contributions or comments relating to a piece of information, or conflicting contributions or comments regarding a piece of information.

In some embodiments, a user may be able to correct and contribute to all information accessed by users of the transaction application user identification, security, filters, and the like may resist "spamming". The selection module 676 may simply select which information will be actively solicited for comment, input, or correction and may filter users likewise.

The input solicitation module 678 may present solicitations for the input of information to users interacting with a transaction system 92. The input solicitation module 678 may solicit information identified by the selection module 676 as in need of contribution. In some embodiments a viewer will be presented with a questionnaire soliciting information relating to a particular category of information, such as the features a product has, the class 266 or subclass 268 to which a listing 262 should belong, whether an additional class 266 or sub class 268 should be added, or the like. Inputs maybe filtered or overweighted for use to resist manipulation.

It will be noted that the solicitation module 678 may simply choose information for which input is sought based on random selection or some other method, rather than a predefined set of priorities.

The input module 680 may receive a user's inputs in response to the solicitations of the solicitation module 678. User inputs may be in the form of typewritten text, images, mouse clicks on buttons, or other interaction. The input module 680 may handle the receipt of input and comments transmitted from the seller workstation 80 or buyer workstation 82.

The comment solicitation module 682 may transmit solicitations for comments to buyer workstations 82 and seller workstations 80 regarding the accuracy of information already stored by the transaction system 92. The comment solicitation module 682 may solicit comments on information identified by the selection module 676 as in need of confirmation.

For example, a user viewing information contained in a listing record 262 may be presented with a button or other input mechanism next to or otherwise identified with an item of information, or a number of alternative items of information. A prompt may read, for example, "is this information accurate?" "change this information?" or "which of the following is correct?" In some embodiments a viewer will be presented with a questionnaire asking a user to confirm the accuracy of a number of items of information.

User inputs and comments maybe stored in contribution records 696. A contribution record 696 may include a user identifier 698, a contribution identifier 700, association data 702, magnitude data 704, the input 706, positive comments 708, negative comments 710, and a weight 712. User identity may be kept confidential, but benefits greatly from not being actually anonymous. It may be virtually anonymous, but such an arrangement is a security risk.

The user identifier 698 may identify the user who provided the input 706. The user identifier 698 may be the user identifier 142 of the user record 130 associated with the user who provided the input. Identifying the user providing an input may be useful to determine the weight to be given the information entered by this user. In some instances, a contribution record 696 may be created in response to a comment on information already stored within the listing database 252. Accordingly, the user identifier 698 may identify the host, be left blank, or ignored in subsequent analysis of the contribution record 696.

A contribution identifier 700 may uniquely identify each contribution record 696. Positive comments 708 may include the user identifier 142 of any users who have confirmed the accuracy of the input 706. Negative comments 710 may include the user identifiers 142 of any users who have disagreed with the accuracy of the input 706. The weight 712 may be data used to compare one contribution record 696 with another when deciding which will be recognized as the more accurate.

Association data 702 may identify the category of information to which the input 706 relates. For example, the input may relate to the descriptive data 284 of a particular listing record 262. Accordingly association data 702 may store the listing identifier 276 of the listing record 262, indicate that the input 706 relates to the descriptive data 284, and any other information necessary to identify the subset of information within the descriptive data 284 to which a contribution record 696 relates.

Magnitude data 704 may indicate the importance of the information to which an input 706 relates. Magnitude data 704 may also indicate that the information should not readily be changed. For example, if a piece of information has been the subject of many contribution records 696 that have shown a clear consensus, the magnitude data 704 for that information may be high, given its apparent reliability. In some instances, it may be undesirable to add, remove, or change too readily the position or identity, of a class 266 or high level subclass 268 within the transaction database 252.

Accordingly, an input 706 relating to such important information may have magnitude data 704 indicating a high magnitude. In some embodiments the magnitude data 704 may not be stored as part of the contribution record 696. Rather, the magnitude 704 of information may be stored as a table mapping a magnitude to an individual piece of information. It may alternatively be stored as metadata stored with each individual item of information, or determined based on rules or standards. These may be rules followed by the contribution module 258 when evaluating whether to change certain classes of information within the listing database 252 based on user contributions or comments.

The weighting module 684 may calculate the weight 712 of each contribution record 696. The weighting module 685 may calculate the weight 712 of a contribution record based on at least one of the following factors: the contribution data 164 and/or risk data of the user record 130 identified by the user identifier 698, the number of positive comments 708, the number of negative comments 710, the contribution data 164 of the user records 130 identified by the positive comments 708 and negative comments 710, the risk data 162 of the user records 130 identified by the positive comments 708 and negative comments 710

In some embodiments, the contribution data 164 of a user record 130 may include a number representing a ranking or the like. A ranking may represent the reliability of information provided in the past by the user associated with the user record 130. For example, a user who has made many accurate contributions may have a higher ranking than a user who has made few, or inaccurate, contributions.

In some embodiments the weighting module may calculate the weight 712 by calculating a first sum. This may occur by summing the ranking of the user providing the input 706 and the rankings of all users who made positive comments 708. Calculating a second sum may include summing the rankings of all users who have made negative comments 710. Subtracting the second sum from the first sum may provide and store and storing the difference as the weight 712.

The comparison module 686 may determine which contribution record 696 will be incorporated into the listing database 252. The comparison module 686 may do so by comparing contribution records 696 having identical, or substantially identical, association data 702. For example, contribution records 696 that both purport to answer the same question, or describe the same thing, may be conflicting candidates to fill the same "blank" in the listing database 252. The comparison module 686 may simply compare the weights 712, with the input 706 of the contribution record 696 having the highest weight 712 being incorporated into the listing database 252.

Alternatively, the comparison module 686 may add these for a weighted average, or use other, more complex, criteria. For example, where a contribution record 696 has less than a threshold number of comments 708, 710, whether positive or negative, the contribution record 696 may be ignored by the comparison module 686 when determining which of conflicting contribution record 696 to incorporate into the listing database 252. Conflicting contribution records 696 may be records 696 that offer conflicting versions of information stored in a listing database 252.

In some instances, only one contribution record 696 may exist with respect to a particular item of information. In such a case, the comparison module 686 may simply determine whether the weight 712 is above a threshold weight. If so the comparison module 686 may determine that the contribution record 696 will be incorporated into the listing database 252. Where only one contribution record 696 exists, the comparison module 686 may not determine that the contribution record 696 will be incorporated into the listing database 252 unless the contribution record 696 has received more than a specific minimum number of comments 708, 710.

In some embodiments, the comparison module 686 may require a first minimum number of comments 708, 710 in instances where there is not a clear majority of positive comments 708. It may require a second minimum number of comments 708, 710, substantially smaller than the first minimum, where there is a clear majority of positive comments 708.

For example, where 51% of the comments 708, 710 are positive and 49% are negative, the comparison module 686 may not determine that the contribution record 696 is to be incorporated in the listing database 252 unless a sufficiently large number of comments 708, 710 have been received. Alternatively, if 75% of the comments 708, 710 are positive and only 25% are negative, the comparison module 686 may determine that the contribution record 696 is to be incorporated into the listing database 252 even though few comments 708, 710 have been received.

The comparison module 686 may also evaluate the magnitude data 704 when determining whether a contribution record 696 is to be incorporated into the listing database 252. For example, the comparison module 686 may require a greater weight 712 for data having a higher magnitude 714. In some embodiments, the comparison module 686 may require a larger number of comments 708, 710 for a contribution record 696 having a larger magnitude 714 than for contribution records 696 having a smaller magnitude 714.

Where the comparison module 686 determines that a contribution record 696 is to be incorporated into the listing database 252, the updating module 690 may do so. The updating module 690 may evaluate the association data 702 to determine which portion of the listing database 252 is to be changed, removed, or added to. The updating module 690 may then store the input 706 within the listing database 252.

The internal modification module 688 may provide a specialized interface for trusted individuals to change the listing database 252. Individuals interacting with the internal modification module 688 may include the host associated with the transaction system 92, employees of the host, or highly privileged users of the transaction system 92. The functionality of the internal modification module 688 will be discussed in greater detail in FIG. 36.

The reward module 692 may reward users who provide useful contributions to the listing database. Rewards may be in the form of reduced fees, monetary remuneration, or other incentives. The reward module 692 may store the results of its execution in the reward data 165 of the user records 130 of users who have provided useful contributions. In some embodiments, the reward data 165 may be a number of points. For any one contribution, a user may be given a first higher number of points being added to the reward data 165 if a user makes an accurate contribution, and a second lower number of points, which may be zero, being added for a contribution that is shown to be inaccurate.

Whether a contribution is accurate may be evaluated by determining whether a user's contribution was incorporated into the listing database 252. Thus, a user who provides the input 706 of a contribution record 696 ultimately incorporated into the listing database 252 may be given the first number of points. A user who provides a positive comment 708 to a contribution record 696 incorporated maybe assigned the first number of points. Likewise a user who provides a negative comment 710 to a contribution record 696 that is not incorporated may also receive the first number of points. A user who provides an input 706 or positive comment 708 to a contribution record 696 that is not incorporated may be given the second number of points.

A user who provides a negative comment 710 to a contribution record 696 incorporated may be given the second number of points. In some embodiments, different amounts of points may be provided to those who provide an input 706 and to those who simply provide a comment 708, 710, with those providing inputs given a larger number of points than those providing comments 708, 710.

The privilege assignment module 694 may adjust the contribution data 164 of the user records 130 identified by the user identifier 698 of a contribution record 696 and the positive comments 708 and negative comments 710. For example, a user who provided the input 706 or a positive comment 708 to a contribution record 696 that is incorporated into the listing database 252 will have his or her contribution data 164 indicated to indicate that the user has a higher reliability ranking. A user who provides a negative comment 710 to a contribution record 696 that is not incorporated may likewise have his or her contribution data 164 incremented to indicate that the user has a higher reliability ranking than before the incrementation. A user who provides inaccurate information, e.g. an input 706 that is not incorporated or a comment 708, 710 that is incorrect, may have his or her contribution data 164 decremented to indicate that the user has a lower reliability ranking than before the decrementation.

The magnitude modification module 695 may adjust the magnitude 714 of information changed using the contribution module 258. Magnitude data 714 may have various levels.

For example, some information may have magnitude data 714 that will instruct the comparison module 686 that the information cannot be changed except by the host, or users having special privileges. In other cases, magnitude data 714 may specify to the comparison module 686, for example, either how many comments 708, 710 a contribution record 696 must receive, how high of weight 712 a contribution record 696 must have, or a combination of the two, or the like, before the contribution record 696 is incorporated into the listing database 252.

After a particular item of information has been modified, the magnitude modification module 695 may automatically increase the magnitude 714 of the information. For example, if a large number of comments 708, 710 and inputs 706 have been provided, the magnitude data 714 of the information will indicate that the information shall not be as readily changed in the future. Alternatively, if a small number of comments 708, 710 or inputs 706 have been received, or if no input 706 has a clear majority of users agreeing therewith, the information to which the input 706 ultimately adopted relates may be assigned a low magnitude 714. Such a magnitude indicates that the information is still somewhat tentative and can be more readily changed.

Referring to FIG. 30, an internal modification module 688 may enable a host, which may include authorized employees or agents of the host, to change information within the listing database 252 without requiring extensive evaluation of the host's changes. Accordingly, the internal modification module 688 may include a priority assignment module 730, an internal selection module 732, an internal solicitation module 734, a researching module 736, an internal magnitude modification module 738, and an internal updating module 740.

The priority assignment module 730 may enable a host to assign a priority to certain classes or categories of information within a listing database 252. For example, a class 266 or subclass 268 of products may have little information available, or have a greater likelihood of appealing to potential users of the transaction system 92. Accordingly, a host may wish to focus information gathering efforts on that particular class 266 or subclass 268. The priority assignment module 730 may therefore allow a host to specify a priority of a class 266, subclass 268, a listing record 262 or a portion of a listing record 262, a class or category of information, or a specific piece of information, that is in particular need of host intervention to correct or supply information.

The priority assignment module 730 may assign priority to information automatically, based on objectively determined criteria such as, for example, the number of users posting purchase request records 132, product records 134 listed under a listing record 252 (e.g. a high traffic listing record 262 may profit more from more, or more accurate, information); the number of contribution records 296 associated with an item of information (e.g. information that is lacking or has not been the subject of many contributions may require intervention by a host in order to supply the information or to verify the information); the presence of conflicting contributions (e.g. if positive comments 708 for a contribution record 696 closely match negative comments 710, intervention may be needed to resolve the conflict).

The internal selection module 734 may select which items of information will be solicited for the listing database 252 or which information will be solicited for confirmation or correction. The internal selection module 734 may take into account priority assigned to information, or classes or categories of information, by the priority assignment module 730.

For example, information, or classes or categories of information, assigned a high priority by the priority assignment module 730 will more frequently be selected by the internal selection module 734. In some embodiments both the selection module 676 and the internal selection module 734 will both select information, or categories of information, from within a larger class of information specified by the priority assignment module 730.

The internal solicitation module 734 may present queries or solicitations for information, or classes or categories of information, as selected by the internal selection module 732. The internal solicitation module 734 may accommodate the employee or agent of a host who may be assigned the task of contributing original or received inputs to the listing database 252. Accordingly, the internal solicitation module 734 may repeatedly present solicitations for information one after another, enabling the employee to respond to each one. The solicitation module may present questions, display classes or categories of information in need of contribution, display inputs 706 from users and ask for confirmation, or perform other such querying functions.

A researching module 736 may provide research aids to a host, or host's employee, to aid the host, or employee, in responding to queries from the internal solicitation module 734. For example, the researching module 736 may extract key words or the like from the queries of the solicitation module. The researching module 736 may automatically conduct internet searches using the key words and present the results to the host. The researching module 736 may categorize, or otherwise organize or format, the search results to aid the host, agent, or employee.

An internal comparison module 738 may allow the host, or employee, to determine which information within the listing database 252 will be added or modified and the magnitude 714 of the information within the listing database 252. In some embodiments the internal modification module 738 may allow the host, or employee, to manually modify the listing database 252. In some instances the internal modification module 729 may interact with a plurality of agents or employees.

Accordingly, the internal modification module may require that a certain number of employees agree to a change or that a majority, or super majority of employee contributors agree to a change. In this respect, the internal modification module may incorporate the functionality of the comparison module 686, operating instead on contribution records 696 created by the employees of the host. Accordingly, the internal comparison module 738 may, as does the comparison module 686, determine whether additional information is to be added to the listing database 252 or whether information in the listing database 252 is to be corrected.

The internal magnitude modification module 740 may assign a magnitude 714 to information that has been changed by the internal modification module 729. The internal magnitude modification module 740 may assign a magnitude 706 to information so modified that indicates that the information is not changeable by users, but rather only by the host. Alternatively, the magnitude 706 may simply indicate that the information is only changeable where contributing users have manifested a clear consensus.

The internal updating module 740 may make changes to the listing database 252 when the internal comparison module 738, whether automatically or according to explicit instructions from the host, determines that information is to be added the listing database 252 or that information is to be modified within the listing database 252. In some embodiments the internal updating module 740 may be programmed to execute periodically. For example, the listing database 252 may be updated by the internal updating module 740 once a day at a set time. Alternatively, the internal updating module 740 may wait until a specific number of corrections or additions to the listing database are to be made and then make the changes at substantially the same time. In either case, changes may be postponed until a convenient time when access to the listing database 252 by users will not be disrupted.

Referring to FIG. 31, the contribution module 258 may execute the contribution process 256. The contribution process 756 may include all or some of the illustrated steps. The focus selecting step 758 may simply select any information, or category of information, stored in, or relevant to the listing database 252. Accordingly, the focus selecting step 758 may include executing all or part of the functionality of the selection module 676.

Soliciting information 760 may include transmitting to a buyer workstation 82 or seller workstation 80 a solicitation for the information, or category or class of information, selected in the focus selection step 758. Accordingly, the soliciting step 760 may include executing all or part of the functionality attributed to the input solicitation module 678. Soliciting 762 comments may include transmitting a solicitation for comment on information stored, or proposed or suggested to be stored, in the listing database 252. The solicitation may be transmitted to both the buyer workstation 82 and the seller workstation 80.

Accordingly, soliciting 762 comments may include executing all or part of the functionality attributed to the comment solicitation module 682. The contribution weighing step 764 may include assigning a weight 712 to each contribution, whether input information, or comment on information. Accordingly, the weighting step 764 may include executing all or part of the functionality attributed to the weighting module 684.

Comparing 766 contributions may include comparing the weight of a contribution to the weight of a conflicting contribution or to some standard weight, to determine whether a contribution is to be incorporated into the listing database 252. Accordingly, the comparing step 766 may include executing all or part of the functionality attributed to the comparison module 686.

Assigning 768 magnitudes may include assigning a magnitude to a contribution that is determined in the comparing step 766 to be suitable for incorporation into the listing database 252. Accordingly, the magnitude assigning step 768 may include executing all or part of the magnitude modification module 695.

Updating 770 a database may include incorporating contributions into the listing database 252. Accordingly, updating 770 the listing database 252 may include executing all or part of the functionality attributed to the updating module 303. Assigning 758 privileges may include assigning privileges to users making contributions to the listing database, with those making contributions incorporated into the listing database 252 gaining increased privileges. In some instances, users who make contributions that are not incorporated into the listing database 252 may have their privileges reduced. Accordingly, assigning 758 privileges may include executing all or part of the functionality attributed to the privilege assignment module 694.

Figure 37:
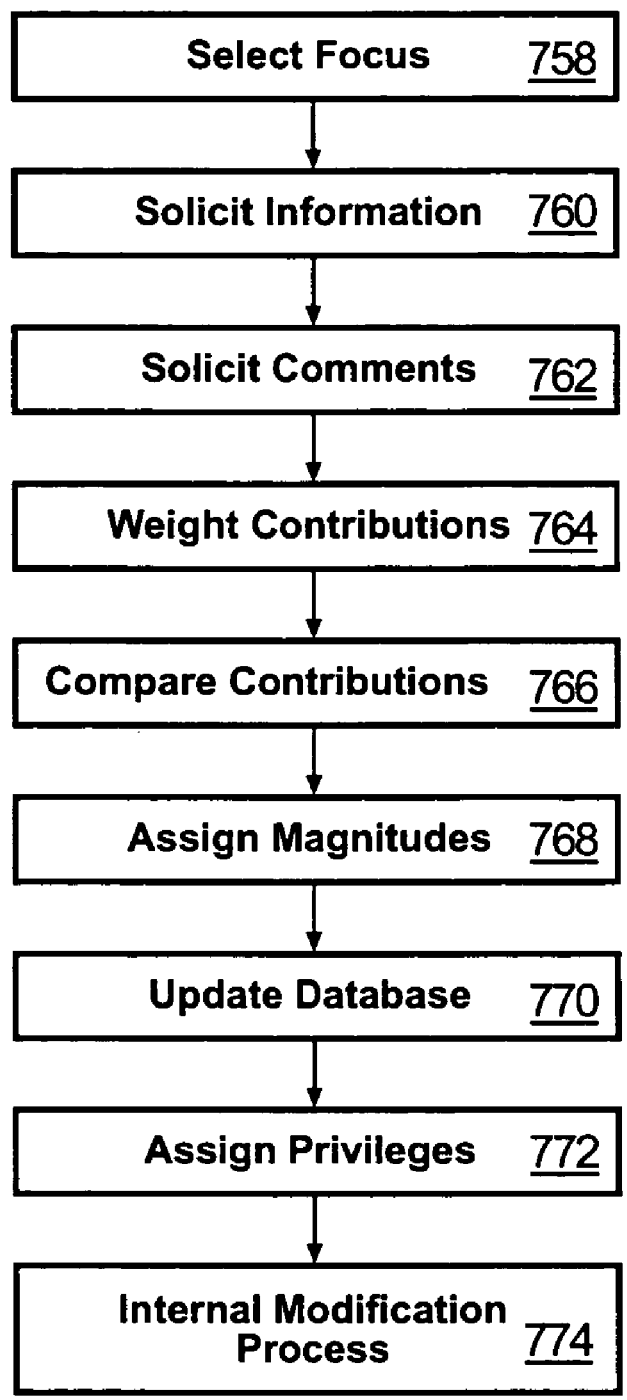
FIG. 37 is a process flow diagram of one embodiment of a contribution process, in accordance with the invention.
Figure 38:
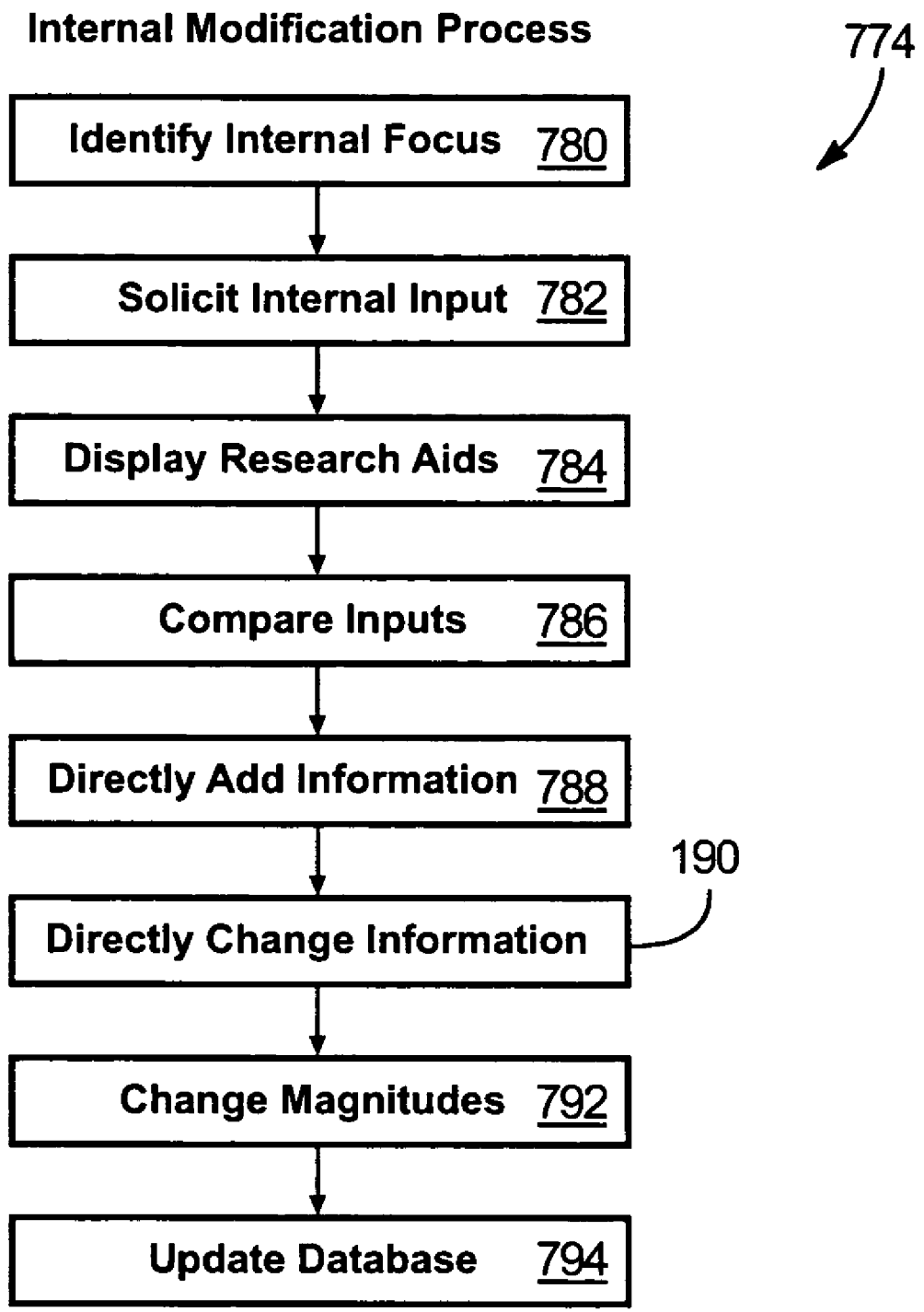
FIG. 38 is a process flow diagram of one embodiment of an internal modification process, in accordance with the invention.

Referring to FIG. 38, while still referring to FIG. 37, the contribution process 754 may include executing an internal modification process 774. The internal modification process 774 may include executing all or part of the functionality attributed to the internal modification module 688. Accordingly, the internal modification process 774 may include identifying an internal focus 780. Identifying an internal focus may include determining what class, category, or specific items, of information will be the focus of solicitations for contribution or comment.

Identifying 780 internal focus may include executing all or part of the functionality attributed to the priority assignment module 730. Soliciting 760 information may include submitting questionnaires to the host or the host's agents. Soliciting 760 information may include executing all or part of the functionality attributed to the input solicitation module 734. Displaying 784 research aids may include providing information to aid a host, or the host's agents in obtaining information or verifying the accuracy of information. Accordingly, displaying 784 research aids may include executing all or part of the functionality attributed to the researching module 736.

Directly adding 788 information may include executing instructions by a host, or the host's agent, to change information within the listing database 252 without comparison, weighting, or the like. Directly changing 790 information may include executing instructions by a host, or the host's agent, to change information stored within the listing database 252, without comparison, weighting, or the like. Changing 792 magnitudes may include changing the magnitude of information within the listing database 792 to reflect the criticality, importance, or reliability of the information. Accordingly, changing 792 magnitudes may include executing all or part of the functionality attributed to the internal magnitude modification module 740. Updating 794 the database may include incorporating changes made to information during the internal modification process 774. Accordingly, updating 794 the database may include executing all or part of the functionality attributed to the internal updating module 742.

Figure 39:
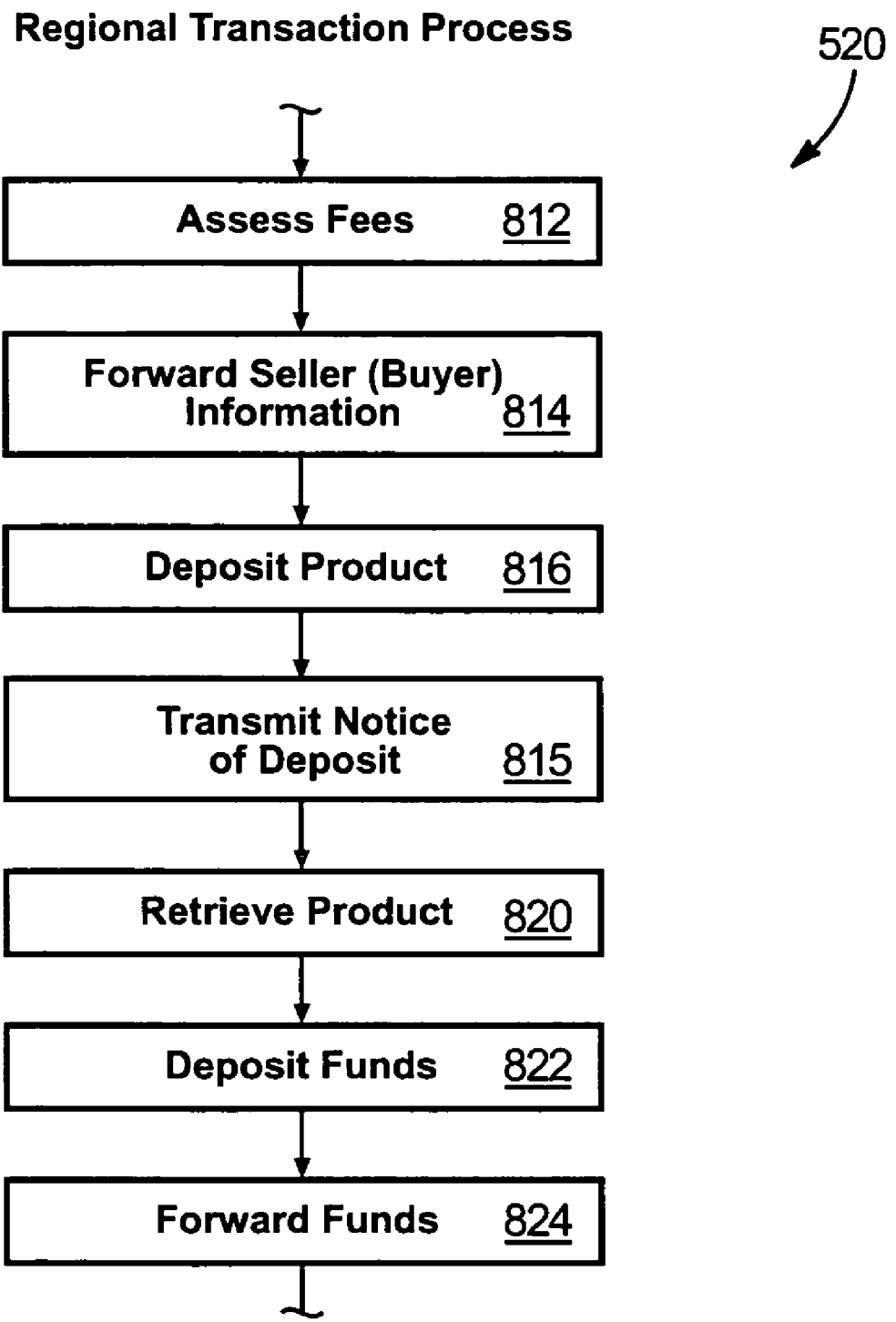
FIG. 39 is a process flow diagram of one embodiment of a regional transaction process, in accordance with the invention.

Referring to FIG. 39, a transaction process 520 may be modified to conduct transactions between parties located geographically close to one another. Such a process 520 may be useful for selling large items that are not readily shipped by courier. The transaction process 520 may be modified to substitute the illustrated steps for the consummation process 544.

Fees may be assessed 812 before the process of consummating a transaction begins. In some embodiments, the fees assessed may be lower than for other non-regional transactions to reflect the lower risk involved. A step 814 may include forwarding seller information from the server 86 to the buyer workstation 82. Seller information may include contact information enabling the buyer to retrieve a product directly from the seller without further involvement of the host or the transaction system 92. Seller information may include the address of a location where the buyer may go to retrieve the product.

Depositing 816 may include depositing a product with a third party known to both the buyer and seller. For example, the host providing access to the transaction system 92 may also provide a "storefront" where sellers may deposit products sold using the transaction system 92 and buyers may retrieve them. Alternatively, some trusted party not identical to the host may provide this service. Transmitting 818 notice of deposit may include sending notice to the buyer workstation 82 that the seller has deposited the product. Notice may be transmitted 818 by the host or third party providing the storefront. A buyer may then retrieve 820 the product from the storefront. The host or third party providing the storefront may then transmit 822 notice to the seller that the buyer has retrieved the product.

In some instances the provider of the storefront may receive funds from the buyer for remittance to the seller. Accordingly, transmitting 822 notice may also inform the seller of the need to retrieve funds from the seller. Alternatively, the provider of the storefront may electronically transfer funds from the buyer to the seller without the need for intervention by the seller. Arbitrating disputes 824 may include executing the functionality attributed to the arbitration module 478.

Figure 40:
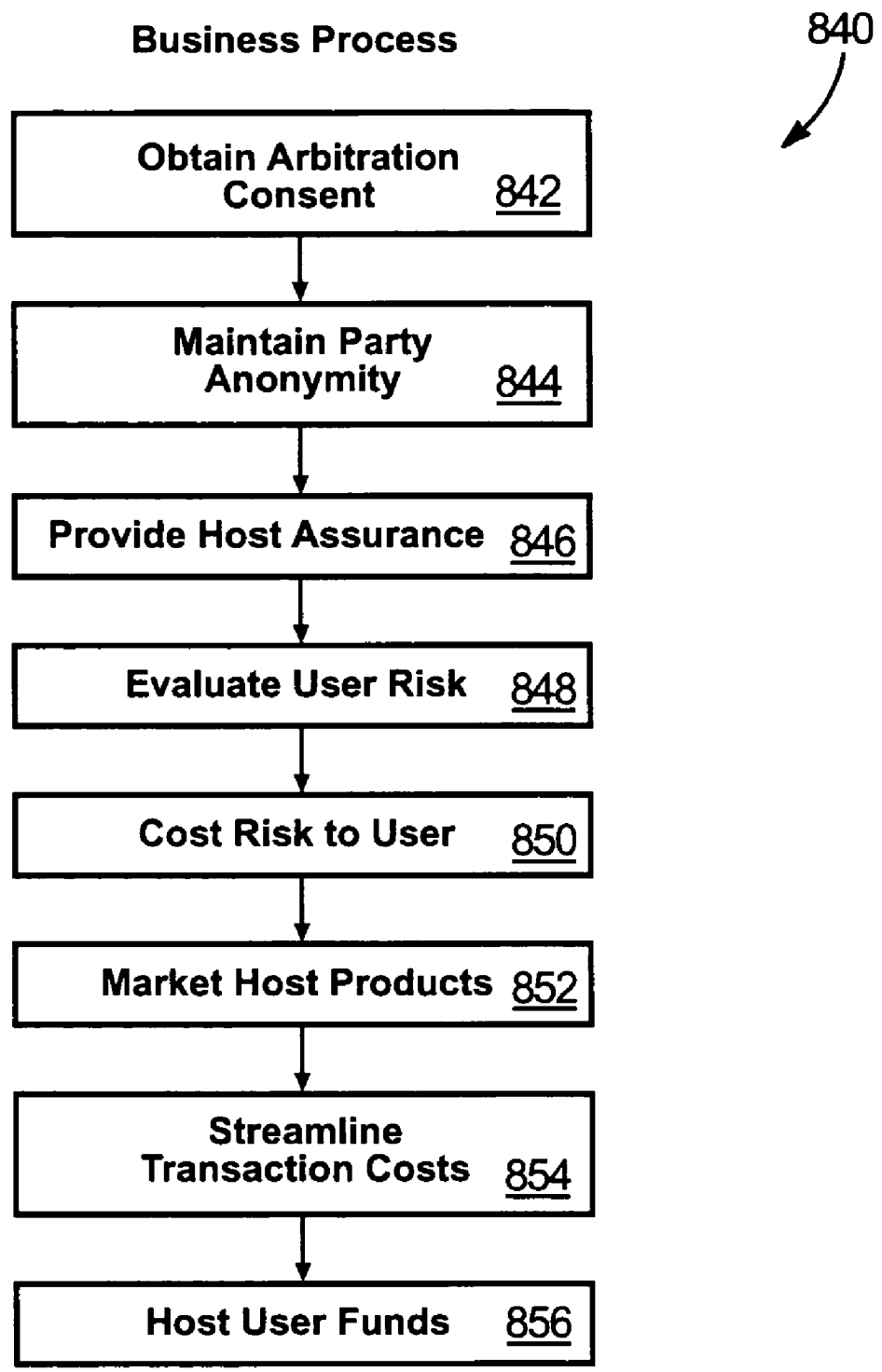
FIG. 40 is process flow diagram of one embodiment of a process suitable for implementation using the transaction application, in accordance with the invention.

Referring to FIG. 40, the transaction system 92 may be used as part of the business of a host. Accordingly, the utility of an system 92 may be enhanced through the business practice 840 of FIG. 34, although the system 92 can function without the illustrated policies. It will be noted that the business practice 840 may include performing all or part of the functions attributed to the host in the operation of the transaction system 92 described hereinabove.

In some embodiments, the business practice 840 may include obtaining 842 from every user of the transaction system 92 consent to the arbitration by the host, or a selected agent of the host, of all disputes arising from transactions involving the use of the transaction system 92. Alternatively, obtaining 842 consent may include obtaining consent to arbitration only for comparatively lower priced products or only for comparatively higher priced products.

The practice 840 may include maintaining 844 party anonymity. That is, a party to the transaction will not know the identity of the second party to the transaction. Maintaining anonymity may ensure that each offer to sell is given the same weight. Thus each seller is on equal footing, and each buyer knows that each sale has a like guarantee of success. In some embodiments, the identify of the parties may be disclosed nonetheless. The practice 840 may include providing 846 host assurances. Assurances provided 846 may be provided to sellers, buyers, solely to buyers, or solely to sellers. Assurances may include a guarantee that the host will make good to a party losses caused by the fraud or failure to perform properly of a second party to a transaction.

The practice 840 may include evaluating 848 user risk. In order to provide 846 assurances, the host may evaluate 848 the risk that each user poses. The host may then cost 850 the risk a user poses to the user in a transaction, allowing a user to reap the rewards of reliability or the burden of unreliability.

The practice 840 may include marketing 852 of host products to users of the transaction system 92. In some embodiments marketing 852 host products may include indicating to users that the host is the seller of a product, rather than marketing the product anonymously as may other users not affiliated with the host.

The practice 840 may include streamlining 854 transactions costs. Users buying products may be assured of the terms of a sale at the time of selection of the product. Terms that may be streamlined 854 may include the cost of shipping, the method of payment, and the like. Streamlining 854 may include applying the same costs, regardless of the buyer and seller to all transactions. In some embodiments 854, streamlining 854 will not include applying uniform transaction costs independent from the product sold in a transaction.

The practice may include hosting 856 user funds. Reduced funds transfer costs and collection costs may be realized by maintaining an account for a user having funds directly accessible by the host. The account may be maintained by the host or by an organization affiliated with the host. The host may engage in offering other financial services with regard to funds kept on hand for satisfying obligations with respect to transactions using the transaction system 92. For example, investment, checking, brokerage, currency conversion or the like.

Figure 41:
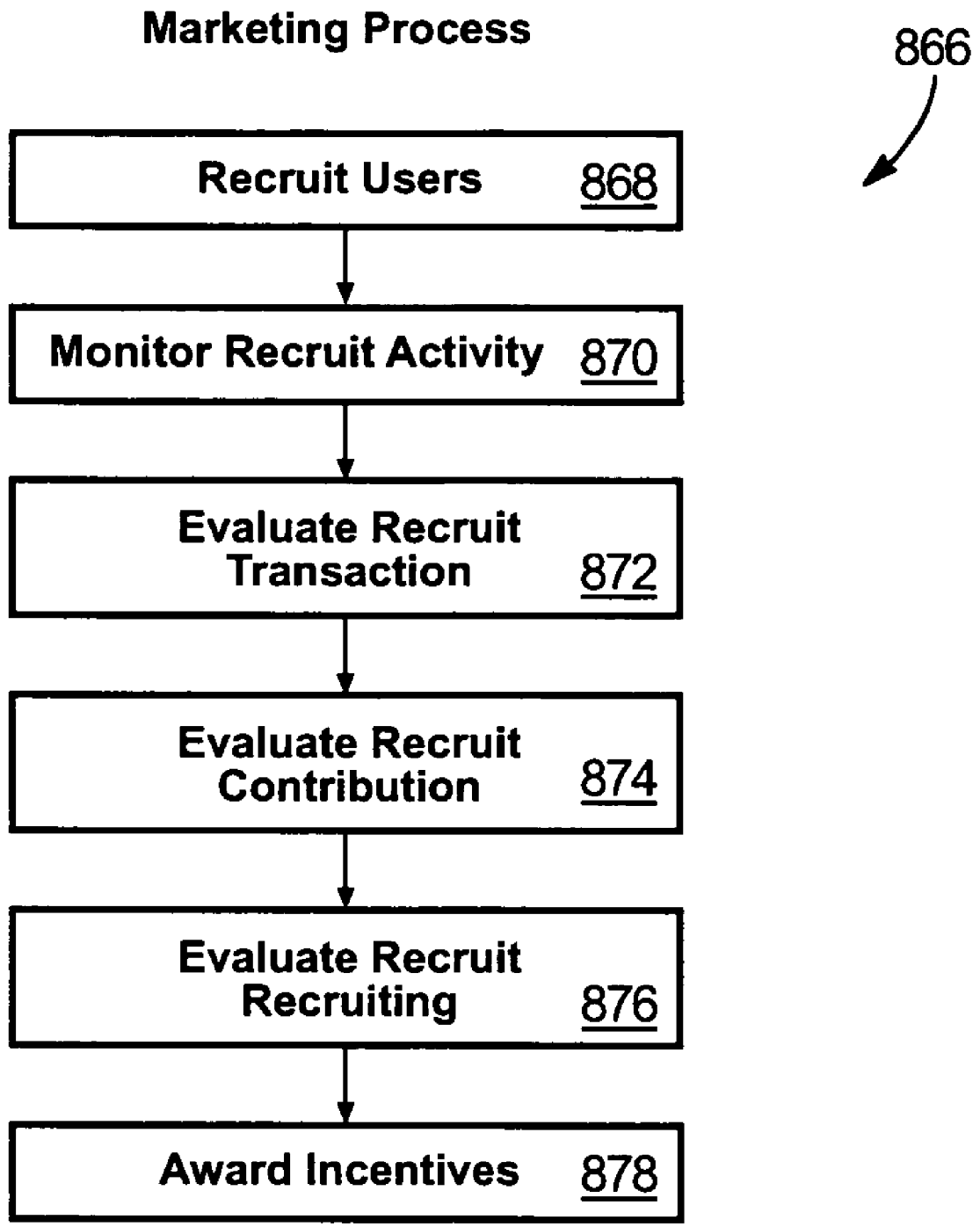
FIG. 41 is a process flow diagram of one embodiment of a marketing process, in accordance with the invention.

Referring to FIG. 41, a marketing process 866 may be used in conjunction with the business practice 840, with the transaction system 92, or both. The marketing process 866 may include recruiting users 868, monitoring 870 recruit activity, evaluating 872 recruit transactions, evaluating 874 recruit contributions, evaluating 876 recruiting, or awarding 878 incentives, or any combination thereof.

Recruiting 868 users may include the activities of current users to promote use of the transaction system 92, or other service. Monitoring 870 recruit activity may include monitoring the use of a new user invited to use the system 92 by a current user. Monitoring 870 may include tracking fees paid by the new user, contributions to the listing database 252, or other database, made by the user, or any other activity a host may seek to promote.

Evaluating recruit transactions 872 may include assessing the value of a new user's activities to the host. A new user who sells expensive items successfully, timely fulfills his or her obligations, or the like may be of great utility to a host. Accordingly, evaluations of such a new user will be given greater weight when awarding incentives to the current user who invited that particular new user to use the transaction system 92 than if the new user had not done so.

Evaluating 874 recruit contributions may include evaluating the value of a new user's contributions to a host. Thus a new user who contributes accurate information and makes numerous contributions will be given greater weight when awarding incentives to the current user who invited that particular new user to use the transaction system 92 than if the new user had not done so. Evaluating 876 recruiting may include determining how many new users a particular new user has successfully solicited to use the transaction system 92. Thus, a new user who brings many new users will be given greater weight when awarding incentives to the current user who invited that new user to use the transaction application than had the new user not done so. Awarding 878 may award incentives to a current user based on evaluations made in steps 872, 874, and 876. Awards may be in the form of money, reduced fees, or other consideration.

The present invention may be embodied in other specific forms without departing from its basic functions or essential characteristics. The described embodiments are to be considered in all respects only as illustrative, and not restrictive. The scope of the invention is, therefore, indicated by the appended claims, rather than by the foregoing description. All changes come within the meaning and range of equivalency of the claims are to be embraced within their scope.

What is claimed and desired to be secured by United States Letters Patent is:

1. An apparatus for coordinating data exchanged in a product sale transaction, the apparatus comprising:
   a network for carrying data;
   a server, corresponding to a host and operably connected to the network to host data corresponding to online transactions,
   a plurality of buyer computers connecting to the network and each corresponding to a buyer having a buyer identifier;
   a plurality of seller computers connecting to the network and each corresponding to a seller having a seller identifier;
   each buyer computer of the plurality of buyer computers further programmed to communicate to the server purchase requests, each comprising a product identifier, a price, funding information, shipping information, and a buyer identifier;
   each seller computer of the plurality of seller computers further programmed to communicate to the server product records, each comprising a product identifier, a price, shipping information, and a seller identifier;

the server further programmed to receive, from a buyer computer of the plurality of buyer computers, data linking a first purchase request of the purchase requests to a second purchase request of the purchase requests;

and the server, further programmed to receive the first and second purchase request, both the first and second purchase requests corresponding to products identifiable as being of a type, but the product having distinct differences selected from manufacturer, brand name, and model;

the server, further programmed to access a plurality of product records, wherein at least two products records correspond to a product the type, but each respective one of the at least two product records corresponds to a product of a different designation, selected from brand, manufacturer, and model, the different designations reflecting distinctive products, not objectively equal, but subjectively comparable by the first buyer with respect to a cost-to-value relationship perceived buy the buyer;

the server, further programmed to remove for the first buyer the risk of making multiple matches for the first and second purchase requests by removing automatically one of the first and second purchase requests immediately upon matching the other thereof.

2. The apparatus of claim 1, wherein the server is programmed to record a net amount owed to a seller corresponding to the price of the product record less a transaction fee charged by the host.

3. The apparatus of claim 1, wherein the server is further programmed to record a net amount owed to a seller corresponding to the price of the product record less a transaction fee charged by the host and an insurance cost charged by the host.

4. The apparatus of claim 3, wherein the server is further programmed to calculate the insurance cost based on risk originating with a seller corresponding to the first product record.

5. A computer network comprising:

a server associated with an entity;

a plurality of purchase requests, each comprising a product identifier, a price, and a buyer identifier, the plurality of purchase requests being stored on the server;

the server storing data linking a first purchase request of the plurality of purchase requests to a second purchase request of the plurality of purchase requests;

a plurality of product records, each comprising a product identifier, a price, and a seller identifier, the plurality of product records being stored on the server;

the plurality of purchase requests, wherein at least two of the purchase requests thereof correspond to a single buyer, seeking a single instance of a product of a single type, and are linked to reflect that only one instance of product of the type is to be purchased based on the at least two purchase requests;

the server, further programmed to receive the first and second purchase requests corresponding to products having distinct differences selected from a manufacturer, brand name, and model;

the plurality of product records, wherein at least two product records correspond to the type of product, but each respective one of the at least two product records corresponds to a product of a different designation, selected from brand, manufacturer, and model, the different designations reflecting products corresponding to the at least two product records as distinct products, not objectively equal, but subjectively selected to be comparable by the first buyer; and the server programmed to match a first product record of the plurality of product records with one of the at least two purchase requests based on matching criteria; and the server further programmed to, after matching the first purchase request with the first product record and as a direct, immediate, causal effect thereof, remove the second purchase request from future matching consideration, thereby ensuring the second purchase request will not be matched with any product record of the plurality of product records.

6. The computer network of claim 5, wherein:

the matching criteria require that the product identifier of the first purchase request match the product identifier of the first product record;

the matching criteria mandate a match when the price of the first purchase request is less than the price of the first product record and the price of the first purchase request is within a specified tolerance of the price of the first product record; and the server is programmed to account to the entity the loss associated with the difference between the price of the first purchase request and the price of the first product record.

7. The computer network of claim 5, wherein:

each purchase request of the plurality of purchase requests comprises shipping information corresponding to a buyer;

each product record of the plurality of product records comprises shipping information corresponding to a seller; and the matching criteria require that the product identifier of the first purchase request match the product identifier of the first product record and that the price of the first purchase request be equal to or greater than the price of the first product record added to a shipping cost calculated from the shipping information of the purchase request and the shipping information of the product record.

8. An apparatus coordinating a product sale transaction, the apparatus comprising:

a network carrying data;

a server, corresponding to a host and operably connected to the network to host data corresponding to online transactions, a plurality of buyer computers connecting to the network, each buyer computer thereof corresponding to a buyer having a buyer identifier;

a plurality of seller computers connecting to the network, each seller computer thereof corresponding to a seller having a seller identifier;

each buyer computer further programmed to communicate to the server purchase requests, each comprising a product identifier, a price, shipping information, and corresponding buyer identifier;

each seller computer of the plurality of seller computers further programmed to communicate to the server product records, each comprising a product identifier, a price, shipping information, and corresponding seller identifier;

the server further programmed to receive, from a first buyer computer of the plurality of buyer computers, data linking a first purchase request of the purchase requests to a second purchase request of the purchase requests, both of the first and second purchase requests corresponding to the first buyer, for products subjectively comparative by the first buyer, and corresponding to a single purchase for which only one of the first and second purchase requests is to be satisfied;

the server, further programmed to receive and link the first and second purchase requests, both the first and second purchase requests corresponding to products of a same type, the products having distinct differences selected from a manufacturer, brand name, and model;

the server further programmed to identify a first product record of the product records, matching the first purchase request based on matching criteria; and the server, further programmed to remove for the first buyer the risk of making multiple matches for the first and second purchase requests by barring completion of all but one of the first and second purchase requests by removing automatically one of the first and second purchase requests immediately upon matching the other thereof.

9. The apparatus of claim 8, where the server is further programmed to execute:

receiving instructions from the first buyer:

making a multiple purchase requests, based on the instructions, for one instance of a product of the type, by posting multiple purchase requests for the type of product, the multiple purchase requests corresponding to multiple products of the type, each of which products is a candidate to be the one instance purchased;

selecting a match by comparing the plurality of purchase requests with the plurality of product records; and responding to the selecting by rendering all the remaining purchase requests of the multiple purchase requests barred against further consummation of a sale in response thereto.

10. The apparatus of claim 8, wherein the server is programmed to record a net amount owed to a seller corresponding to the price of the product record less a commission and transaction costs charged by the host for hosting the product records and the purchase request records.

11. The apparatus of claim 8, wherein the server is further programmed to:

reduce a commission due to the host in order to consummate a sale; and record a net amount owed to a seller corresponding to the price of the product record less a reduced commission to the host charged by the host.

12. The apparatus of claim 3, wherein the server is further programmed to calculate the insurance cost based on risk reflecting at least one of the lack of information about the seller and negative information about the seller, corresponding to the first product record.

* * * * *